United States Patent
Cooper et al.

(10) Patent No.: US 9,156,477 B2
(45) Date of Patent: Oct. 13, 2015

(54) CONTROL SYSTEM AND METHOD FOR REMOTELY ISOLATING POWERED UNITS IN A VEHICLE SYSTEM

(71) Applicant: General Electric Company, Schenectady, NY (US)

(72) Inventors: Jared Klineman Cooper, Melbourne, FL (US); Mark Bradshaw Kraeling, Melbourne, FL (US); David Allen Eldredge, Melbourne, FL (US); James Brooks, Troy, NY (US); Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/095,373

(22) Filed: Dec. 3, 2013

(65) Prior Publication Data
US 2014/0094998 A1 Apr. 3, 2014

Related U.S. Application Data

(63) Continuation-in-part of application No. 13/488,652, filed on Jun. 5, 2012, now abandoned, and a continuation-in-part of application No. 13/587,966, filed on Aug. 17, 2012, now Pat. No. 8,655,521, said
(Continued)

(51) Int. Cl.
*G06F 17/00* (2006.01)
*B61C 17/12* (2006.01)
(Continued)

(52) U.S. Cl.
CPC ............... *B61C 17/12* (2013.01); *B61L 3/006* (2013.01); *B61L 15/0027* (2013.01); *B61L 15/0036* (2013.01); *B61L 27/0027* (2013.01); *Y02T 30/10* (2013.01)

(58) Field of Classification Search
CPC ............... B60L 7/04; B60L 7/06; B60L 7/08; B60L 7/12; B60L 7/14; B60L 7/18; B60L 7/22; B60L 9/00; B60L 9/16
USPC ........................................ 701/19, 20; 73/121
See application file for complete search history.

(56) References Cited

U.S. PATENT DOCUMENTS 2,104,652 A 1/1938 Inman
2,601,634 A 6/1952 Rivette
(Continued)

FOREIGN PATENT DOCUMENTS

AU 2010256020 A1 12/2011
CA 2192151 A1 8/1997
(Continued)

OTHER PUBLICATIONS

Unofficial English translation of Office Action issued in connection with corresponding AU Application No. 2008302642 on Sep. 29, 2011.

(Continued)

*Primary Examiner* — Helal A Algahaim
*Assistant Examiner* — Jelani Smith
(74) *Attorney, Agent, or Firm* — GE Global Patent Operation

(57) ABSTRACT

A control system includes an energy management system and an isolation control system. The energy management system generates a trip plan that designates operational settings of a vehicle system having powered units that generate tractive effort to propel the vehicle system. The energy management system determines a tractive effort capability of the vehicle system and a demanded tractive effort of a trip. The energy management system identifies a tractive effort difference between the tractive effort capability of the vehicle system and the demanded tractive effort of the trip and selects at least one of the powered units based on the tractive effort difference. The isolation module remotely turns the selected powered unit to an OFF mode such that the vehicle system is propelled along the route during the trip by the powered units other than the selected powered unit.

20 Claims, 31 Drawing Sheets

Related U.S. Application Data application No. 13/488,652 is a continuation-in-part of application No. 12/556,334, filed on Sep. 9, 2009, now Pat. No. 8,538,608, and a continuation-in-part of application No. 13/175,284, filed on Jul. 1, 2011, now Pat. No. 8,565,946, said application No. 13/587,966 is a continuation of application No. 12/061,462, filed on Apr. 2, 2008, now Pat. No. 8,249,763, which is a continuation-in-part of application No. 11/765,443, filed on Jun. 19, 2007, now abandoned, said application No. 11/765,443 is a continuation-in-part of application No. 11/669,364, filed on Jan. 31, 2007, said application No. 11/669,364 is a continuation-in-part of application No. 11/385,354, filed on Mar. 20, 2006.

(60) Provisional application No. 60/849,100, filed on Oct. 2, 2006, provisional application No. 60/850,885, filed on Oct. 10, 2006, provisional application No. 60/939,852, filed on May 24, 2007, provisional application No. 60/894,039, filed on Mar. 9, 2007.

(51) Int. Cl.
*B61L 3/00* (2006.01)
*B61L 15/00* (2006.01)
*B61L 27/00* (2006.01)

(56) References Cited

U.S. PATENT DOCUMENTS

| | | |
|---|---|---|
| 2,783,369 A | 2/1957 | Weber |
| 2,927,711 A | 3/1960 | Naggiar |
| 3,519,805 A | 6/1970 | Throne-Booth |
| 3,650,216 A | 3/1972 | Harwick et al. |
| 3,655,962 A | 4/1972 | Koch |
| 3,781,139 A | 12/1973 | Lohse |
| 3,794,833 A | 2/1974 | Blazek et al. |
| 3,865,042 A | 2/1975 | DePaola et al. |
| 3,886,870 A | 6/1975 | Pelabon |
| 3,948,314 A | 4/1976 | Creswick et al. |
| 4,005,838 A | 2/1977 | Grundy |
| 4,041,283 A | 8/1977 | Mosier |
| 4,042,810 A | 8/1977 | Mosher |
| 4,136,432 A | 1/1979 | Melley, Jr. |
| 4,181,943 A | 1/1980 | Mercer, Sr. et al. |
| 4,253,399 A | 3/1981 | Spigarelli |
| 4,279,395 A | 7/1981 | Boggio et al. |
| 4,344,364 A | 8/1982 | Nickles et al. |
| 4,401,035 A | 8/1983 | Spigarelli et al. |
| 4,548,164 A | 10/1985 | Ylonen et al. |
| 4,561,057 A | 12/1985 | Haley, Jr. et al. |
| 4,602,335 A | 7/1986 | Perlmutter |
| 4,617,627 A | 10/1986 | Yasunobu et al. |
| 4,644,705 A | 2/1987 | Saccomani et al. |
| 4,663,713 A | 5/1987 | Cornell et al. |
| 4,711,418 A | 12/1987 | Aver, Jr. et al. |
| 4,735,385 A | 4/1988 | Nickles et al. |
| 4,794,548 A | 12/1988 | Lynch et al. |
| 4,827,438 A | 5/1989 | Nickles et al. |
| 4,843,575 A | 6/1989 | Crane |
| 4,853,883 A | 8/1989 | Nickles et al. |
| 5,109,343 A | 4/1992 | Budway |
| 5,133,645 A | 7/1992 | Crowley et al. |
| 5,181,541 A | 1/1993 | Bodenheimer |
| 5,187,945 A | 2/1993 | Dixon |
| 5,197,438 A | 3/1993 | Kumano et al. |
| 5,197,627 A | 3/1993 | Disabato et al. |
| 5,201,294 A | 4/1993 | Osuka |
| 5,230,613 A | 7/1993 | Hilsbos et al. |
| 5,239,472 A | 8/1993 | Long et al. |
| 5,240,416 A | 8/1993 | Bennington |
| 5,253,153 A | 10/1993 | Mathews et al. |
| 5,261,366 A | 11/1993 | Regueiro |
| 5,277,156 A | 1/1994 | Osuka et al. |
| 5,313,924 A | 5/1994 | Regueiro |
| 5,316,174 A | 5/1994 | Schutz |
| 5,357,912 A | 10/1994 | Barnes et al. |
| 5,363,787 A | 11/1994 | Konopasek et al. |
| 5,365,902 A | 11/1994 | Hsu |
| 5,388,034 A | 2/1995 | Allen et al. |
| 5,394,851 A | 3/1995 | Cryer et al. |
| 5,398,894 A | 3/1995 | Pascoe |
| 5,433,182 A | 7/1995 | Augustin et al. |
| 5,437,422 A | 8/1995 | Newman |
| 5,440,489 A | 8/1995 | Newman |
| 5,441,027 A | 8/1995 | Buchanon et al. |
| 5,460,013 A | 10/1995 | Thomsen |
| 5,487,516 A | 1/1996 | Murata et al. |
| 5,492,099 A | 2/1996 | Maddock |
| 5,570,284 A | 10/1996 | Roselli et al. |
| 5,583,769 A | 12/1996 | Saitoh |
| 5,605,134 A | 2/1997 | Martin |
| 5,623,413 A | 4/1997 | Matheson et al. |
| 5,642,827 A | 7/1997 | Madsen |
| 5,651,330 A | 7/1997 | Jewett |
| RE35,590 E | 8/1997 | Bezos et al. |
| 5,676,059 A | 10/1997 | Alt |
| 5,681,015 A | 10/1997 | Kull |
| 5,720,455 A | 2/1998 | Kull et al. |
| 5,738,311 A | 4/1998 | Fernandez |
| 5,740,547 A | 4/1998 | Kull et al. |
| 5,744,707 A | 4/1998 | Kull |
| 5,755,349 A | 5/1998 | Brundle |
| 5,758,299 A | 5/1998 | Sandborg et al. |
| 5,785,392 A | 7/1998 | Hart |
| 5,794,172 A | 8/1998 | Matheson et al. |
| 5,803,411 A | 9/1998 | Ackerman et al. |
| 5,813,635 A | 9/1998 | Fernandez |
| 5,817,934 A | 10/1998 | Skantar |
| 5,828,979 A | 10/1998 | Polivka et al. |
| 5,866,811 A | 2/1999 | Skantar |
| 5,950,966 A | 9/1999 | Hungate et al. |
| 5,950,967 A | 9/1999 | Montgomery |
| 5,957,571 A | 9/1999 | Koster et al. |
| 5,995,737 A | 11/1999 | Bonissone et al. |
| 5,995,881 A | 11/1999 | Kull |
| 5,998,915 A | 12/1999 | Scholz et al. |
| 6,005,494 A | 12/1999 | Schramm |
| 6,016,791 A | 1/2000 | Thomas et al. |
| 6,067,964 A | 5/2000 | Ruoff et al. |
| 6,081,769 A | 6/2000 | Curtis |
| 6,088,635 A | 7/2000 | Cox et al. |
| 6,092,021 A | 7/2000 | Ehlbeck et al. |
| 6,102,009 A | 8/2000 | Nishiyama |
| 6,112,142 A | 8/2000 | Shockley et al. |
| 6,114,901 A | 9/2000 | Singh et al. |
| 6,123,111 A | 9/2000 | Nathan et al. |
| 6,125,311 A | 9/2000 | Lo |
| 6,129,025 A | 10/2000 | Minakami et al. |
| 6,135,396 A | 10/2000 | Whitfield et al. |
| 6,158,416 A | 12/2000 | Chen et al. |
| 6,192,863 B1 | 2/2001 | Takase |
| 6,198,993 B1 | 3/2001 | Higashi et al. |
| 6,216,957 B1 | 4/2001 | Turunen, Jr. |
| 6,225,919 B1 | 5/2001 | Lumbis et al. |
| 6,230,668 B1 | 5/2001 | Marsh et al. |
| 6,243,694 B1 | 6/2001 | Bonissone et al. |
| 6,263,266 B1 | 7/2001 | Hawthorne |
| 6,269,034 B1 | 7/2001 | Shibuya |
| 6,270,040 B1 | 8/2001 | Katzer |
| 6,286,480 B1 | 9/2001 | Chen et al. |
| 6,295,816 B1 | 10/2001 | Gallagher et al. |
| 6,304,801 B1 | 10/2001 | Doner |
| 6,308,117 B1 | 10/2001 | Ryland et al. |
| 6,325,050 B1 | 12/2001 | Gallagher et al. |
| 6,332,106 B1 | 12/2001 | Hawthorne et al. |
| 6,349,702 B1 | 2/2002 | Nishiyama |
| 6,349,706 B1 | 2/2002 | Hsu et al. |
| 6,357,421 B1 | 3/2002 | Pritchard |
| 6,363,331 B1 | 3/2002 | Kyrtsos |
| 6,380,639 B1 | 4/2002 | Soucy |
| 6,404,129 B1 | 6/2002 | Hendricx et al. |
| 6,434,452 B1 | 8/2002 | Gray |

(56) References Cited

U.S. PATENT DOCUMENTS

| | | |
|---|---|---|
| 6,459,964 B1 | 10/2002 | Vu et al. |
| 6,459,965 B1 | 10/2002 | Polivka et al. |
| 6,487,488 B1 | 11/2002 | Peterson, Jr. et al. |
| 6,501,393 B1 | 12/2002 | Richards et al. |
| 6,505,103 B1 | 1/2003 | Howell et al. |
| 6,516,727 B2 | 2/2003 | Kraft |
| 6,520,124 B2 | 2/2003 | Bohm, II |
| 6,523,787 B2 | 2/2003 | Braband |
| 6,549,803 B1 | 4/2003 | Raghavan et al. |
| 6,564,172 B1 | 5/2003 | Till |
| 6,584,953 B2 | 7/2003 | Yomogida |
| 6,587,764 B2 | 7/2003 | Nickles et al. |
| 6,591,263 B1 | 7/2003 | Becker et al. |
| 6,591,758 B2 | 7/2003 | Kumar |
| 6,609,049 B1 | 8/2003 | Kane et al. |
| 6,612,245 B2 | 9/2003 | Kumar et al. |
| 6,612,246 B2 | 9/2003 | Kumar |
| 6,615,118 B2 | 9/2003 | Kumar |
| 6,622,068 B2 | 9/2003 | Hawthorne |
| 6,631,322 B1 | 10/2003 | Arthur et al. |
| 6,647,328 B2 | 11/2003 | Walker |
| 6,665,609 B1 | 12/2003 | Franke et al. |
| 6,668,217 B1 | 12/2003 | Franke et al. |
| 6,676,089 B1 | 1/2004 | Katzer |
| 6,691,957 B2 | 2/2004 | Hess, Jr. et al. |
| 6,694,231 B1 | 2/2004 | Rezk |
| 6,698,913 B2 | 3/2004 | Yamamoto |
| 6,702,235 B2 | 3/2004 | Katzer |
| 6,712,045 B1 | 3/2004 | McCarthy, Jr. |
| 6,732,023 B2 | 5/2004 | Sugita et al. |
| 6,732,032 B1 | 5/2004 | Lowrey et al. |
| 6,763,291 B1 | 7/2004 | Houpt et al. |
| 6,789,005 B2 | 9/2004 | Hawthorne |
| 6,799,096 B1 | 9/2004 | Franke et al. |
| 6,810,312 B2 | 10/2004 | Jammu et al. |
| 6,824,110 B2 | 11/2004 | Kane et al. |
| 6,845,953 B2 | 1/2005 | Kane et al. |
| 6,848,414 B2 | 2/2005 | West et al. |
| 6,853,888 B2 | 2/2005 | Kane et al. |
| 6,856,865 B2 | 2/2005 | Hawthorne |
| 6,863,246 B2 | 3/2005 | Kane et al. |
| 6,865,454 B2 | 3/2005 | Kane et al. |
| 6,873,888 B2 | 3/2005 | Kumar |
| 6,903,658 B2 | 6/2005 | Kane et al. |
| 6,910,792 B2 | 6/2005 | Takada et al. |
| 6,915,191 B2 | 7/2005 | Kane et al. |
| 6,922,619 B2 | 7/2005 | Baig et al. |
| 6,948,837 B2 | 9/2005 | Suzuki |
| 6,953,272 B2 | 10/2005 | Hayakawa et al. |
| 6,957,131 B2 | 10/2005 | Kane et al. |
| 6,973,947 B2 | 12/2005 | Penaloza et al. |
| 6,978,195 B2 | 12/2005 | Kane et al. |
| 6,980,894 B1 | 12/2005 | Gordon et al. |
| 6,996,461 B2 | 2/2006 | Kane et al. |
| 7,021,588 B2 | 4/2006 | Hess, Jr. et al. |
| 7,021,589 B2 | 4/2006 | Hess, Jr. et al. |
| 7,024,289 B2 | 4/2006 | Kane et al. |
| 7,036,774 B2 | 5/2006 | Kane et al. |
| 7,072,747 B2 | 7/2006 | Armbruster et al. |
| 7,072,757 B2 | 7/2006 | Adams et al. |
| 7,073,753 B2 | 7/2006 | Root et al. |
| 7,076,343 B2 | 7/2006 | Kornick et al. |
| 7,079,926 B2 | 7/2006 | Kane et al. |
| 7,082,924 B1 | 8/2006 | Ruedin |
| 7,092,800 B2 | 8/2006 | Kane et al. |
| 7,092,801 B2 | 8/2006 | Kane et al. |
| 7,092,894 B1 | 8/2006 | Crone |
| 7,096,171 B2 | 8/2006 | Hawthorne et al. |
| 7,127,336 B2 | 10/2006 | Houpt et al. |
| 7,127,345 B2 | 10/2006 | Chen et al. |
| 7,131,403 B1 | 11/2006 | Banga et al. |
| 7,131,614 B2 | 11/2006 | Kisak et al. |
| 7,139,646 B2 | 11/2006 | Kane et al. |
| 7,164,975 B2 | 1/2007 | Bidaud |
| 7,222,083 B2 | 5/2007 | Matheson et al. |
| 7,231,877 B2 | 6/2007 | Kumar |
| 7,234,449 B2 | 6/2007 | Casabianca et al. |
| 7,302,895 B2 | 12/2007 | Kumar et al. |
| 7,340,328 B2 | 3/2008 | Matheson et al. |
| 7,343,314 B2 | 3/2008 | Matheson et al. |
| 7,347,168 B2 | 3/2008 | Reckels et al. |
| 7,349,797 B2 | 3/2008 | Donnelly et al. |
| 7,395,141 B1 | 7/2008 | Seck et al. |
| 7,497,201 B2 | 3/2009 | Hollenbeck |
| 7,500,436 B2 | 3/2009 | Kumar et al. |
| 7,509,193 B2 | 3/2009 | Kustosch |
| 7,522,990 B2 | 4/2009 | Daum et al. |
| 7,539,624 B2 | 5/2009 | Matheson et al. |
| 7,558,740 B2 | 7/2009 | Matheson et al. |
| 7,618,011 B2 | 11/2009 | Oleski et al. |
| 7,667,611 B2 | 2/2010 | Lindsey et al. |
| 7,822,491 B2 | 10/2010 | Howlett et al. |
| 8,126,601 B2 | 2/2012 | Kapp et al. |
| 8,249,763 B2 | 8/2012 | Brooks et al. |
| 8,538,611 B2 | 9/2013 | Kumar et al. |
| 2001/0029411 A1 | 10/2001 | Hawthorne |
| 2001/0047241 A1 | 11/2001 | Khavakh et al. |
| 2002/0059075 A1 | 5/2002 | Schick et al. |
| 2002/0062819 A1 | 5/2002 | Takahashi |
| 2002/0072833 A1 | 6/2002 | Gray |
| 2002/0093201 A1 | 7/2002 | Soucy |
| 2002/0096081 A1 | 7/2002 | Kraft |
| 2002/0107618 A1 | 8/2002 | Deguchi et al. |
| 2002/0174653 A1 | 11/2002 | Uzkan |
| 2003/0001050 A1 | 1/2003 | Katzer |
| 2003/0034423 A1 | 2/2003 | Hess, Jr. et al. |
| 2003/0076221 A1 | 4/2003 | Akiyama et al. |
| 2003/0091017 A1 | 5/2003 | Davenport et al. |
| 2003/0104899 A1 | 6/2003 | Keller |
| 2003/0105561 A1 | 6/2003 | Nickles et al. |
| 2003/0120400 A1 | 6/2003 | Baig et al. |
| 2003/0183729 A1 | 10/2003 | Root et al. |
| 2003/0213875 A1 | 11/2003 | Hess, Jr. et al. |
| 2003/0222981 A1 | 12/2003 | Kisak et al. |
| 2003/0229446 A1 | 12/2003 | Boscamp et al. |
| 2003/0233959 A1 | 12/2003 | Kumar |
| 2003/0236598 A1 | 12/2003 | Antelo et al. |
| 2004/0010432 A1 | 1/2004 | Matheson et al. |
| 2004/0025849 A1 | 2/2004 | West et al. |
| 2004/0034556 A1 | 2/2004 | Matheson et al. |
| 2004/0068359 A1 | 4/2004 | Neiss et al. |
| 2004/0093245 A1 | 5/2004 | Matheson et al. |
| 2004/0098142 A1 | 5/2004 | Warren et al. |
| 2004/0104312 A1 | 6/2004 | Hess, Jr. et al. |
| 2004/0108814 A1 | 6/2004 | Tsuda et al. |
| 2004/0111309 A1 | 6/2004 | Matheson et al. |
| 2004/0122569 A1 | 6/2004 | Bidaud |
| 2004/0129289 A1 | 7/2004 | Hafemann |
| 2004/0129840 A1 | 7/2004 | Horst |
| 2004/0133315 A1 | 7/2004 | Kumar et al. |
| 2004/0172175 A1 | 9/2004 | Julich et al. |
| 2004/0174121 A1 | 9/2004 | Tsuda et al. |
| 2004/0245410 A1 | 12/2004 | Kisak et al. |
| 2005/0007020 A1 | 1/2005 | Tsuda et al. |
| 2005/0045058 A1 | 3/2005 | Donnelly et al. |
| 2005/0055287 A1 | 3/2005 | Schmidtberg et al. |
| 2005/0065674 A1 | 3/2005 | Houpt et al. |
| 2005/0085961 A1 | 4/2005 | Kane et al. |
| 2005/0107954 A1 | 5/2005 | Nahla |
| 2005/0109882 A1 | 5/2005 | Armbruster et al. |
| 2005/0120904 A1 | 6/2005 | Kumar et al. |
| 2005/0121005 A1 | 6/2005 | Edwards |
| 2005/0171655 A1 | 8/2005 | Flynn et al. |
| 2005/0171657 A1 | 8/2005 | Kumar |
| 2005/0188745 A1 | 9/2005 | Staphanos et al. |
| 2005/0189886 A1 | 9/2005 | Donnelly et al. |
| 2005/0196737 A1 | 9/2005 | Mann |
| 2005/0205719 A1 | 9/2005 | Hendrickson et al. |
| 2005/0234757 A1 | 10/2005 | Matheson et al. |
| 2005/0251299 A1 | 11/2005 | Donnelly et al. |
| 2005/0288832 A1 | 12/2005 | Smith et al. |
| 2006/0025903 A1 | 2/2006 | Kumar |
| 2006/0041341 A1 | 2/2006 | Kane et al. |
| 2006/0047379 A1 | 3/2006 | Schullian et al. |

(56) References Cited

U.S. PATENT DOCUMENTS

| | | | |
|---|---|---|---|
| 2006/0060345 A1 | 3/2006 | Flik et al. | |
| 2006/0074544 A1 | 4/2006 | Morariu et al. | |
| 2006/0085103 A1 | 4/2006 | Smith et al. | |
| 2006/0085363 A1 | 4/2006 | Cheng et al. | |
| 2006/0086546 A1 | 4/2006 | Hu et al. | |
| 2006/0116789 A1 | 6/2006 | Subramanian et al. | |
| 2006/0116795 A1 | 6/2006 | Abe et al. | |
| 2006/0122737 A1 | 6/2006 | Tani et al. | |
| 2006/0129289 A1 | 6/2006 | Kumar et al. | |
| 2006/0138285 A1 | 6/2006 | Oleski et al. | |
| 2006/0155434 A1 | 7/2006 | Kane et al. | |
| 2006/0162973 A1 | 7/2006 | Harris et al. | |
| 2006/0178800 A1 | 8/2006 | Chen et al. | |
| 2006/0212188 A1 | 9/2006 | Kickbusch et al. | |
| 2006/0212189 A1 | 9/2006 | Kickbusch et al. | |
| 2006/0219214 A1 | 10/2006 | Okude et al. | |
| 2006/0277906 A1 | 12/2006 | Burk et al. | |
| 2006/0282199 A1 | 12/2006 | Daum et al. | |
| 2007/0061053 A1 | 3/2007 | Zeitzew | |
| 2007/0078026 A1 | 4/2007 | Holt et al. | |
| 2007/0108308 A1 | 5/2007 | Keightley | |
| 2007/0112475 A1 | 5/2007 | Koebler et al. | |
| 2007/0219680 A1 | 9/2007 | Kumar et al. | |
| 2007/0219681 A1 | 9/2007 | Kumar et al. | |
| 2007/0219683 A1 | 9/2007 | Daum et al. | |
| 2007/0233364 A1 | 10/2007 | Kumar | |
| 2007/0260369 A1 | 11/2007 | Philp et al. | |
| 2007/0261648 A1 | 11/2007 | Reckels et al. | |
| 2008/0004721 A1 | 1/2008 | Huff et al. | |
| 2008/0065282 A1 | 3/2008 | Daum et al. | |
| 2008/0128563 A1 | 6/2008 | Kumar et al. | |
| 2008/0147256 A1 | 6/2008 | Liberatore | |
| 2008/0183345 A1 | 7/2008 | Chandra et al. | |
| 2008/0201028 A1* | 8/2008 | Brooks et al. | 701/20 |
| 2008/0208393 A1 | 8/2008 | Schricker | |
| 2009/0044530 A1 | 2/2009 | Gallagher et al. | |
| 2009/0063045 A1 | 3/2009 | Figueroa et al. | |
| 2009/0140574 A1 | 6/2009 | Gorman et al. | |
| 2009/0177345 A1 | 7/2009 | Severinsky et al. | |
| 2009/0186325 A1* | 7/2009 | Kumar | 434/219 |
| 2009/0248220 A1 | 10/2009 | Ecton et al. | |
| 2009/0254239 A1 | 10/2009 | Daum et al. | |
| 2009/0319092 A1 | 12/2009 | Piche | |
| 2010/0152998 A1 | 6/2010 | Schwarzmann | |
| 2011/0035138 A1 | 2/2011 | Kickbusch et al. | |
| 2012/0296545 A1* | 11/2012 | Cooper et al. | 701/99 |

FOREIGN PATENT DOCUMENTS

| | | | |
|---|---|---|---|
| CH | 642418 A5 | 4/1984 | |
| CN | 1511744 A | 7/2004 | |
| CN | 1906074 A | 1/2007 | |
| DE | 1605862 A1 | 5/1971 | |
| DE | 129761 A1 | 2/1978 | |
| DE | 208324 A1 | 5/1984 | |
| DE | 255132 A1 | 3/1988 | |
| DE | 19645426 A1 | 5/1997 | |
| DE | 19731643 A1 | 9/1998 | |
| DE | 19726542 A1 | 11/1998 | |
| DE | 19935349 A1 | 2/2001 | |
| DE | 19935352 A1 | 2/2001 | |
| DE | 19935353 A1 | 2/2001 | |
| DE | 10045921 A1 | 3/2002 | |
| EP | 0088716 A2 | 9/1983 | |
| EP | 0114633 A1 | 8/1984 | |
| EP | 0257662 A2 | 3/1988 | |
| EP | 0341826 A2 | 11/1989 | |
| EP | 0428113 A1 | 5/1991 | |
| EP | 0445047 A1 | 9/1991 | |
| EP | 0467377 A2 | 1/1992 | |
| EP | 0485978 A1 | 5/1992 | |
| EP | 0539885 A2 | 5/1993 | |
| EP | 0554983 A1 | 8/1993 | |
| EP | 0594226 A2 | 4/1994 | |
| EP | 0755840 A1 | 1/1997 | |
| EP | 0958987 A2 | 11/1999 | |
| EP | 1012019 A1 | 6/2000 | |
| EP | 1136969 A2 | 9/2001 | |
| EP | 1143140 A1 | 10/2001 | |
| EP | 1253059 A1 | 10/2002 | |
| EP | 1293948 A2 | 3/2003 | |
| EP | 1297982 A2 | 4/2003 | |
| EP | 1348854 A1 | 10/2003 | |
| EP | 1466803 A1 | 10/2004 | |
| EP | 1562321 A2 | 8/2005 | |
| EP | 1564395 A2 | 8/2005 | |
| EP | 1566533 A1 | 8/2005 | |
| EP | 1697196 A1 | 9/2006 | |
| EP | 1816332 A1 | 8/2007 | |
| FR | 2129215 A5 | 10/1972 | |
| FR | 2558806 A1 | 8/1985 | |
| FR | 2767770 A1 | 3/1999 | |
| GB | 482625 A | 4/1938 | |
| GB | 1321053 A | 6/1973 | |
| GB | 1321054 A | 6/1973 | |
| GB | 2188464 A | 9/1987 | |
| GB | 2414816 A | 12/2005 | |
| JP | 6028153 A | 2/1985 | |
| JP | 63268405 A | 11/1988 | |
| JP | 03213459 A | 9/1991 | |
| JP | 0532733 A | 2/1993 | |
| JP | 0561347 A | 3/1993 | |
| JP | 0577734 A | 3/1993 | |
| JP | 06108869 A | 4/1994 | |
| JP | 06153327 A | 5/1994 | |
| JP | 08198102 A | 8/1996 | |
| JP | 0976913 A | 3/1997 | |
| JP | 10505036 A | 5/1998 | |
| JP | 10274075 A | 10/1998 | |
| JP | 2001065360 A | 3/2001 | |
| JP | 2004301080 A | 10/2004 | |
| JP | 2004328993 A | 11/2004 | |
| JP | 2005002802 A | 1/2005 | |
| JP | 2005232990 A | 9/2005 | |
| JP | 2005343294 A | 12/2005 | |
| JP | 2006320139 A | 11/2006 | |
| JP | 2006327551 A | 12/2006 | |
| JP | 2008535871 A | 9/2008 | |
| RU | 2117181 C1 | 8/1998 | |
| RU | 2238860 C1 | 10/2004 | |
| RU | 2242392 C2 | 12/2004 | |
| RU | 2272731 C2 | 3/2006 | |
| WO | 199003622 A1 | 4/1990 | |
| WO | 199525053 A1 | 9/1995 | |
| WO | 199606766 A1 | 3/1996 | |
| WO | 199914090 A1 | 3/1999 | |
| WO | 199914093 A1 | 3/1999 | |
| WO | 200186139 A1 | 11/2001 | |
| WO | 2003097424 A1 | 11/2003 | |
| WO | 2004023517 A1 | 3/2004 | |
| WO | 2004051699 A2 | 6/2004 | |
| WO | 2004051700 A2 | 6/2004 | |
| WO | 2004052755 A1 | 6/2004 | |
| WO | 2004059446 A2 | 7/2004 | |
| WO | 2005028837 A2 | 3/2005 | |
| WO | 2005061300 A1 | 7/2005 | |
| WO | 2005120925 A2 | 12/2005 | |
| WO | 2006049252 A1 | 5/2006 | |
| WO | 2007027130 A1 | 3/2007 | |
| WO | 2007091270 A2 | 8/2007 | |
| WO | 2007111768 A2 | 10/2007 | |
| WO | 2008073547 A2 | 6/2008 | |
| WO | 2008147668 A1 | 12/2008 | |
| WO | 2009038885 A1 | 3/2009 | |
| WO | 2010139489 A1 | 12/2010 | |
| WO | 2011031410 A2 | 3/2011 | |

OTHER PUBLICATIONS

Unofficial English translation of Office Action issued in connection with corresponding JP Application No. 2009-501417 on Oct. 25, 2011.

(56) References Cited

OTHER PUBLICATIONS

Unofficial English translation of Office Action issued in connection with corresponding RU Application No. 2008108985 on Oct. 26, 2011.
Unofficial English translation of Office Action issued in connection with corresponding AU Application No. 2007289022 on Oct. 26, 2011.
Unofficial English translation of Office Action issued in connection with corresponding RU Application No. 2008109249 on Oct. 27, 2011.
Unofficial English translation of Office Action issued in connection with corresponding RU Application No. 2010115501 on Nov. 1, 2011.
Unofficial English translation of Office Action issued in connection with corresponding MX Application No. MX/a/2007/010174 on Nov. 11, 2011.
Unofficial English translation of Office Action issued in connection with corresponding CN Application No. 200710306676.3 on Dec. 19, 2011.
Unofficial English translation of Office Action issued in connection with corresponding CN Application No. 200980112545.9 on Dec. 29, 2011.
Unofficial English translation of Office Action issued in connection with corresponding CN Application No. 200780001345.7 on Jan. 12, 2012.
Unofficial English translation of Office Action issued in connection with corresponding MX Application No. MX/a/2008/003360 on Jan. 18, 2012.
Unofficial English translation of Office Action issued in connection with corresponding MX Application No. MX/a/2008/003361 on Feb. 1, 2012.
Unofficial English translation of Office Action issued in connection with corresponding CN Application No. 200980119041.X on Feb. 29, 2012.
Unofficial English translation of Office Action issued in connection with corresponding EP Application No. 07716804.5-2215 on Mar. 5, 2012.
Unofficial English translation of Office Action issued in connection with corresponding CN Application No. 200780001338.7 on Jun. 5, 2012.
Unofficial English translation of Office Action issued in connection with corresponding RU Application No. 2007126476 on Jun. 15, 2012.
Unofficial English translation of Office Action issued in connection with corresponding EA Application No. 201001338 on Jul. 16, 2012.
Unofficial English translation of Office Action issued in connection with corresponding JP Application No. 2009-540343 on Jul. 17, 2012.
Unofficial English translation of Office Action issued in connection with corresponding CN Application No. 200980112545.9 on Sep. 11, 2012.
Unofficial English translation of Office Action issued in connection with corresponding JP Application No. 2009-540341 on Sep. 11, 2012.
Unofficial English translation of Office Action issued in connection with corresponding JP Application No. 2009-501417 on Sep. 18, 2012.
Unofficial English translation of Office Action issued in connection with corresponding RU Application No. 2008108985 on Sep. 13, 2012.
Unofficial English translation of Office Action issued in connection with corresponding MX Application No. MX/a/2010/003022 on Sep. 14, 2012.
Unofficial English translation of Office Action issued in connection with corresponding JP Application No. 2009-540342 on Oct. 2, 2012.
Unofficial English translation of Office Action issued in connection with corresponding CN Application No. 200710306676.3 on Oct. 2, 2012.
Unofficial English translation of Office Action issued in connection with corresponding RU Application No. 2008109249 on Nov. 13, 2012.
Unofficial English translation of Office Action issued in connection with corresponding CN Application No. 200780001338.7 on Dec. 3, 2012.
Unofficial English translation of Office Action issued in connection with corresponding CN Application No. 200880108755.6 on Dec. 26, 2012.
Unofficial English translation of Office Action issued in connection with corresponding CN Application No. 200980119041.X on Jan. 7, 2013.
Unofficial English translation of Office Action issued in connection with corresponding AU Application No. 2007289021 on Jan. 16, 2013.
International Invitation to Pay Additional Fees issued in connection with corresponding PCT Application No. PCT/US2012/044367 dated Feb. 1, 2013.
Unofficial English translation of Office Action issued in connection with corresponding EA Application No. 201001338 on Feb. 14, 2013.
Unofficial English translation of Office Action issued in connection with corresponding MX Application No. MX/a/2010/003022 on Feb. 15, 2013.
Unofficial English translation of Office Action issued in connection with corresponding CN Application No. 200980112545.9 on Mar. 18, 2013.
Unofficial English translation of Office Action issued in connection with corresponding AU Application No. 2010292820 on Mar. 26, 2013.
International Search Report and Written Opinion issued in connection with corresponding PCT Application No. PCT/US2012/044367 dated Apr. 9, 2013.
Unofficial English translation of Office Action issued in connection with corresponding JP Application No. 2009-540343 on Apr. 23, 2013.
Unofficial English translation of Office Action issued in connection with corresponding CN Application No. 200710306676.3 on May 6, 2013.
Unofficial English translation of Office Action issued in connection with corresponding JP Application No. 2009-501417 on May 27, 2013.
Unofficial English translation of Office Action issued in connection with corresponding CN Application No. 200780001338.7 on Jun. 5, 2013.
Unofficial English translation of Office Action issued in connection with corresponding JP Application No. 2009-540341 on Jun. 21, 2013.
Unofficial English translation of Office Action issued in connection with corresponding JP Application No. 2009-540342 on Jun. 25, 2013.
Unofficial English translation of Office Action issued in connection with corresponding CA Application No. 2,604,783 on Aug. 20, 2013.
Unofficial English translation of Office Action issued in connection with corresponding EA Application No. 201001338 on Sep. 23, 2013.
Unofficial English translation of Office Action issued in connection with corresponding CN Application No. 200980112545.9 on Oct. 18, 2013.
Unofficial English translation of Office Action issued in connection with corresponding AU Application No. 2009225776 on Oct. 22, 2013.
Unofficial English translation of Office Action issued in connection with corresponding CN Application No. 200780001338.7 on Nov. 20, 2013.
Unofficial English translation of Office Action issued in connection with corresponding CN Application No. 200980119041.X on Dec. 31, 2013.
Unofficial English translation of Office Action issued in connection with corresponding CN Application No. 200710306676.3 on Jan. 13, 2014.

(56) References Cited

OTHER PUBLICATIONS

Unofficial English translation of Office Action issued in connection with corresponding CN Application No. 200980112545.9 on Jan. 28, 2014.
Hoyt et al., "Assessing the effects of several variables on freight train fuel consumption and performance using a train performance simulator", vol. No. 24A, Issue No. 2, pp. 99-112, 1990.
Grizzle et al., "Improved Cylinder Air Charge Estimation for Transient Air Fuel Ratio Control", Proceedings of the American Control Conference, Maryland, vol. No. 2, pp. 1568-1573, Jun. 29, 1994.
Grabs, "Modification of Electronic Interlocking Ei S in Service", Signal + Draht, vol. No. 87, pp. 254-258, 1995.
Chiang et al., "Cycle Detection in Repair-Based Railway Scheduling System", Proceedings of the 1996 IEEE International Conference on Robotics and Automation, Minneapolis, Minnesota, pp. 2517-2522, Apr. 1996.
Razouqi et al., Rynsord: A Novel, Decentralized Algorithm for Railway Networks with 'Soft Reservation', VTC, vol. No. 3, pp. 2585-2589, 1998.
Cheng, "Hybrid Simulation for Resolving Resource conflicts in Train Traffic Rescheduling", Computers in Industry, vol. No. 35, Issue No. 3, pp. 233-246, 1998.
Cheng et al., "Algorithms on Optimal Driving Strategies for Train Control Problem", Proceedings of the 3rd World Congress on Intelligent Control and Automation, pp. 3523-3527, Jun. 28-Jul. 2, 2000.
Franke et al., "An algorithm for the optimal control of the driving of trains", Proceedings of the 39th IEEE Conference on Decision and Control, Sydney, Australia, pp. 2123-2127, Dec. 2000.
Doe, "21st Century Locomotive Technology: Quarterly Technical Status Report 6", pp. 1-6. 10, Apr.-Jun. 2004.
Automotive Equipment: Diesel Injection Technology. Common Rail from Bosch for Vehicles Used in the Construction Industry and in Agriculture. http:/www.bosch-presse.de, May 2004.
Salasoo, "Heavy vehicle systems optimization program: FY 2004 Annual Report", Section VIII.A., "21st Century Locomotive Technology", pp. 156-163, 2004.
Doe, "21st Century Locomotive Technology: Quarterly Technical Status Report 11", pp. 1-8, Jul.-Sep. 2005.
King et al., DOE Heavy Vehicle Systems Optimization—Peer Review—21st Century locomotive Technology, pp. 20, Apr. 2006.
International Search Report and Written Opinion issued in connection with corresponding PCT Application No. PCT/US2007/066697 dated Dec. 3, 2007.
International Written Opinion issued in connection with corresponding PCT Application No. PCT/US2006/032893 dated Mar. 14, 2008.
International Search Report and Written Opinion issued in connection with corresponding PCT Application No. PCT/US2007/076699 dated Jun. 17, 2008.
International Search Report and Written Opinion issued in connection with corresponding PCT Application No. PCT/US2007/078001 dated Jun. 17, 2008.
International Search Report and Written Opinion issued in connection with corresponding PCT Application No. PCT/US2007/078016 dated Jun. 17, 2008.
International Search Report and Written Opinion issued in connection with corresponding PCT Application No. PCT/US2007/078340 dated Jun. 18, 2008.
International Search Report and Written Opinion issued in connection with corresponding PCT Application No. PCT/US2007/078026 dated Jul. 7, 2008.
International Search Report and Written Opinion issued in connection with corresponding PCT Application No. PCT/US2008/063193 dated Aug. 21, 2008.
International Search Report and Written Opinion issued in connection with corresponding PCT Application No. PCT/US07/01428 dated Sep. 12, 2008.
International Search Report and Written Opinion issued in connection with corresponding PCT Application No. PCT/US07/78118 dated Oct. 7, 2008.
International Search Report and Written Opinion issued in connection with corresponding PCT Application No. PCT/US2008/071958 dated Dec. 30, 2008.
International Invitation to Pay Additional Fees issued in connection with corresponding PCT Application No. PCT/US2008/083526 dated Feb. 2, 2009.
International Invitation to Pay Additional Fees issued in connection with corresponding PCT Application No. PCT/US2009/031740 dated Apr. 17, 2009.
International Search Report and Written Opinion issued in connection with corresponding PCT Application No. PCT/US2009/031740 dated Jun. 15, 2009.
International Search Report and Written Opinion issued in connection with corresponding PCT Application No. PCT/US2009/045004 dated Aug. 13, 2009.
International Search Report and Written Opinion issued in connection with corresponding PCT Application No. PCT/US2009/032933 dated Nov. 3, 2009.
Unofficial English translation of Office Action issued in connection with corresponding MX Application No. MX/a/2007/010174 on Nov. 6, 2009.
Unofficial English translation of Office Action issued in connection with corresponding EP Application No. 07716804.5-2215 on Mar. 17, 2010.
International Invitation to Pay Additional Fees issued in connection with corresponding PCT Application No. PCT/US2010/048856 dated Mar. 18, 2010.
Unofficial English translation of Office Action issued in connection with corresponding CN Application No. 200780000072.4 on Jun. 10, 2010.
Unofficial English translation of Office Action issued in connection with corresponding MX Application No. MX/a/2007/010174 on Jul. 9, 2010.
Unofficial English translation of Office Action issued in connection with corresponding CN Application No. 200780001338.7 on Aug. 12, 2010.
International Search Report and Written Opinion issued in connection with corresponding PCT Application No. PCT/US2010/035058 dated Aug. 20, 2010.
Unofficial English translation of Office Action issued in connection with corresponding CN Application No. 200780001166.3 on Oct. 14, 2010.
International Search Report and Written Opinion issued in connection with corresponding PCT Application No. PCT/US2010/048856 dated Feb. 8, 2011.
Unofficial English translation of Office Action issued in connection with corresponding MX Application No. MX/a/2007/010174 on Mar. 11, 2011.
Unofficial English translation of Office Action issued in connection with corresponding AU Application No. 2007202928 on Mar. 29, 2011.
Unofficial English translation of Office Action issued in connection with corresponding RU Application No. 2007126476 on Apr. 11, 2011.
International Search Report and Written Opinion issued in connection with corresponding PCT Application No. PCT/US2010/047251 dated Apr. 26, 2011.
Unofficial English translation of Office Action issued in connection with corresponding CN Application No. 200780001345.7 on Apr. 29, 2011.
Unofficial English translation of Office Action issued in connection with corresponding RU Application No. 2010115501 on May 26, 2011.
Unofficial English translation of Office Action issued in connection with corresponding MX Application No. MX/a/2008/003361 on Jul. 13, 2011.
Unofficial English translation of Office Action issued in connection with corresponding CN Application No. 200780001338.7 on Aug. 17, 2011.

(56) References Cited

OTHER PUBLICATIONS

Unofficial English translation of Office Action issued in connection with corresponding RU Application No. 2008109009 on Aug. 23, 2011.

Unofficial English translation of Office Action issued in connection with corresponding AU Application No. 2007294585 on Sep. 19, 2011.

Unofficial English translation of Office Action issued in connection with corresponding AU Application No. 2007289021 on Sep. 22, 2011.

International Search Report and Written Opinion issued in connection with corresponding PCT Application No. PCT/US2010/045402 dated Sep. 26, 2011.

* cited by examiner

CONTROL SYSTEM AND METHOD FOR REMOTELY ISOLATING POWERED UNITS IN A VEHICLE SYSTEM

CROSS-REFERENCE TO RELATED APPLICATIONS

This application claims priority to and is a continuation-in-part of U.S. patent application Ser. No. 13/488,652, filed 5 Jun. 2012, and entitled "Control System And Method For Remotely Isolating Powered Units In A Vehicle System" (the "'652 Application"). This application also claims priority to and is a continuation-in-part of U.S. patent application Ser. No. 13/587,966, filed 17 Aug. 2012, and entitled "Method And Computer Software Code For Uncoupling Power Control Of A Distributed Powered System From Coupled Power Settings" (the "'966 Application").

The '652 Application claims priority to and is a continuation-in-part of U.S. Pat. No. 8,538,608, filed 9 Sep. 2009, and entitled "Control System And Method For Remotely Isolating Powered Units In A Rail Vehicle System" (the "'608 patent"). The '652 Application also claims priority to and is a continuation-in-part of U.S. Pat. No. 8,565,946, filed 1 Jul. 2011, and entitled "System And Method For Vehicle Control" (the "'946 patent").

The '966 Application claims priority to and is a continuation of U.S. Pat. No. 8,249,763, filed 2 Apr. 2008, and entitled "Method And Computer Software Code For Uncoupling Power Control Of A Distributed Powered System From Coupled Power Settings" (the "'763 patent").

The '763 patent claims priority to and is a continuation-in-part of U.S. application Ser. No. 11/765,443, filed 19 Jun. 2007, and entitled "System And Method For Optimized Fuel Efficiency And Emission Output Of A Diesel Powered System" (the "'443 Application"). The '763 patent also claims priority to U.S. Provisional Application No. 60/939,852, filed 24 May 2007, and entitled "System And Method For Optimized Fuel Efficiency And Emission Output Of A Diesel Powered System" (the "'852 Application").

The '443 Application claims priority to and is a continuation-in-part of U.S. application Ser. No. 11/669,364, filed 31 Jan. 2007, and entitled "System And Method For Optimized Fuel Efficiency And Emission Output Of A Diesel Powered System" (the "'364 Application"). The '443 Application also claims priority to U.S. Provisional Application No. 60/894,039, filed 9 Mar. 2007, and entitled "System And Method For Optimized Fuel Efficiency And Emission Output Of A Diesel Powered System" (the "'039 Application"), and to the '852 Application.

The '364 Application claims priority to and is a continuation-in-part of U.S. patent application Ser. No. 11/385,354, filed 20 Mar. 2006, and entitled "Trip Optimization System And Method For A Train" (the "'354 Application"). The '364 Application also claims priority to U.S. Provisional Application Nos. 60/849,100, filed 2 Oct. 2006, and entitled "System And Method For Fuel Efficiency Improvement Via Optimized Train Power Makeup" (the "'100 Application"), and 60/850,885, filed 10 Oct. 2006, and entitled "System And Method For Fuel Efficiency And Emissions Improvement Via Optimized Train Power Makeup And Operation" (the "'885 Application").

The entire disclosures of these patents and applications (i.e., the '652 Application, the '966 Application, the '608 patent, the '946 patent, the '763 patent, the '443 Application, the '852 Application, the '364 Application, the '039 Application, the '354 Application, the '100 Application, and the '885 Application) are incorporated by reference.

FIELD

One or more aspects of the inventive subject matter described herein relates to powered vehicle systems. Although one or more embodiments are described and shown in terms of rail vehicle systems, not all embodiments are so limited. For example, one or more embodiments may relate to other types of vehicles, such as automobiles, marine vessels, other off-highway vehicles, and the like.

BACKGROUND

The presently described inventive subject matter relates to a powered system, such as a train, an off-highway vehicle, a marine, a transport vehicle, an agriculture vehicle, and/or a stationary powered system and, more particularly to a method and computer software code for powering the powered system where throttle commands are decoupled from predefined settings.

Some powered systems such as, but not limited to, off-highway vehicles, marine diesel powered propulsion plants, stationary diesel powered systems, and transport vehicles, such as transport buses, agricultural vehicles, and rail vehicle systems (e.g., trains), are typically powered by one or more diesel power units, diesel-fueled power generating units, and/or electric engines. With respect to rail vehicle systems, a diesel power unit is usually a part of at least one locomotive that is powered by at least one diesel internal combustion engine. The rail vehicle system further includes a plurality of rail cars, such as freight cars. Usually more than one locomotive is provided. A plurality of locomotives coupled together is considered a locomotive consist. Locomotives are complex systems with numerous subsystems, with each subsystem being interdependent on other subsystems.

An operator is usually aboard a locomotive to insure the proper operation of the locomotive, and when there is a locomotive consist, the operator is usually aboard a lead locomotive. A locomotive consist is a group of locomotives that operate together in operating a train. In addition to ensuring proper operations of the locomotive, or locomotive consist, the operator also is responsible for determining operating speeds of the train and forces within the train that the locomotives are part of. To perform this function, the operator may generally have extensive experience with operating the locomotive and various trains over the specified terrain. This knowledge may be needed to comply with prescribed operating parameters, such as speeds, emissions and the like that may vary with the train location along the track.

Moreover, the operator also can be responsible for assuring in-train forces remain within designated limits. The operator applies tractive and braking effort to control the speed of the locomotive and a load of railcars to assure proper operation and timely arrival at a desired destination. For example, some known locomotives have several throttle levels, where each level is referred to as a notch. Tractive effort is applied by entering a notch, which is an electrical signal corresponds to throttle position. Speed control may also be exercised to maintain in-train forces within designated limits, thereby avoiding excessive coupler forces and the possibility of a train break. To perform this function and comply with designated operating speeds that may vary with the train's location on the track, the operator generally may have extensive experience operating the locomotive over the specified terrain with different railcar consists so that the operator knows which notch to set.

In marine applications, an operator is usually aboard a marine vehicle to insure the proper operation of the vessel, and when there is a vessel consist, the lead operator is usually aboard a lead vessel. As with the locomotive example cited above, a vessel consist is a group of vessels that operate together in operating a combined mission. In addition to ensuring proper operations of the vessel, or vessel consist, the lead operator is responsible for determining operating speeds of the consist and forces within the consist that the vessels are part of. To perform this function, the operator may have extensive experience with operating the vessel and various consists over the specified waterway or mission. This knowledge is needed to comply with designated operating speeds and other mission parameters that may vary with the vessel location along the mission. Moreover, the operator is also responsible for controlling mission forces and location remain within designated limits.

In the case of multiple diesel powered systems, which by way of example and not limitation, may reside on a single vessel, power plant or vehicle or power plant sets, an operator is usually in command of the overall system to insure the proper operation of the system, and when there is a system consist, the operator is usually aboard a lead system. Defined generally, a system consist is a group of powered systems that operate together in meeting a mission. In addition to ensuring proper operations of the single system, or system consist, the operator also is responsible for determining operating parameters of the system set and forces within the set that the system is part of. To perform this function, the operator generally has extensive experience with operating the system and various sets over the specified space and mission. This knowledge may be needed to comply with prescribed operating parameters and speeds that may vary with the system set location along the route. Moreover, the operator also may be responsible for assuring in-set forces remain within designated limits.

When operating a train, operators typically designate or assign the same notch setting for all locomotives, which in turn may lead to a large variation in fuel consumption and/or emission output, such as, but not limited to, $NO_x$, $CO_2$, etc., depending on a number of locomotives powering the train. Thus, the operator may not be able to operate the locomotives so that the fuel consumption is minimized or significantly reduced and the emission output is minimized or significantly reduced for each trip because the size and loading of trains vary and different locomotives of a train may have different power availabilities.

With respect to a locomotive, even with knowledge to assure safe operation, the operator may not be capable of operating the locomotive so that the fuel consumption and emissions is minimized or significantly reduced for each trip. For example, other factors that may be considered include emission output, the operator's environmental conditions like noise/vibration, a weighted combination of fuel consumption and emissions output, etc. This is difficult to do since, as an example, the size and loading of trains vary, locomotives and their fuel/emissions characteristics are different, and weather and traffic conditions vary.

Control of the powered system, such as a train, can be exercised by an automatic control system that may determine various system and mission parameters (e.g., the timing and magnitude of tractive and braking applications) to control the powered system. Alternatively, the train control system may advise the operator of preferred control actions, with the operator exercising control of the powered system in accordance with the advised actions or in accordance with the operator's independent train control assessments.

The automatic control system generally uses a mission plan (or trip plan) that may be automatically developed or modified to provide an optimized plan that improves (e.g., reduces) certain parameters, such as, but not limited to, emissions, fuel used, etc., while meeting mission objectives, such as, but not limited to, mission completion time, interactions with other powered systems, etc. When planning a mission that may be performed autonomously, which includes little to no input from the operator when the mission is being performed, an operator may verify the mission being planned. Likewise, while the mission plan is being used in controlling a powered vehicle, operator input may be required to monitor operations and/or take control of the powered vehicle.

Because such powered systems as trains and/or locomotives have notch settings, a developed mission plan using the predefined notch settings may not result in an optimum mission. Owners and/or operators of rail vehicles, off-highway vehicles, marine powered propulsion plants, transportation vehicles, agricultural vehicles, and/or stationary diesel powered systems would appreciate the financial benefits realized when these diesel powered systems improve fuel efficiency, emission output, fleet efficiency, and mission parameter performance.

Some known powered rail vehicle systems include one or more powered units and, in certain cases, one or more non-powered units. The powered units supply tractive force to propel the powered units and non-powered units. The non-powered units hold or store goods and/or passengers. "Non-powered" unit generally encompasses any vehicle without an on-board source of motive power, and also may be referred to as a non-propulsion-generating vehicle while a powered unit has an on-board source of motive power and may be referred to as a propulsion-generating vehicle.

Some known powered rail vehicle systems include a rail vehicle system (e.g., train) having powered locomotives and non-powered cars for conveying goods and/or passengers along a track. The powered vehicle systems may include several powered units. For example, the systems may include a lead powered unit, such as a lead locomotive, and one or more remote or trailing powered units, such as trailing locomotives, that are located behind and (directly or indirectly) coupled with the lead powered unit. The lead and remote powered units supply tractive force to propel the vehicle system along a route, such as a track.

The tractive force required to convey the powered units and non-powered units along the route may vary during a trip. For example, due to various parameters that change during a trip, the tractive force that is necessary to move the vehicle system along the route may vary. These changing parameters may include the curvature and/or grade of the route, speed limits and/or requirements of the vehicle system, and the like. As these parameters change during a trip, the total tractive effort, or force, that is required to propel the vehicle system along the track also changes.

While the required tractive effort may change during a trip, the operators of these powered rail vehicle systems do not have the ability to remotely turn the electrical power systems of remote powered units on or off during the trip. For example, an operator in a lead locomotive does not have the ability to remotely turn one or more of the trailing locomotives' electrical power on or off, if the tractive effort required to propel the train changes during a segment of the trip while the rail vehicle system is moving. Instead, the operator may only have the ability to locally turn on or off the remote powered units by manually boarding each such unit of the rail vehicle system.

Some known powered rail vehicle systems provide an operator in a lead locomotive with the ability to change the throttle of trailing locomotives (referred to as distributed power operations). But, these known systems do not provide the operator with the ability to turn the trailing locomotives off. Instead, the operator must turn down the throttle of the trailing locomotives that he or she wants to turn off and wait for an auto engine start/stop (AESS) device in the trailing locomotives to turn the locomotives off. Some known AESS devices do not turn the trailing locomotives off until one or more engine- or motor-related parameters are within a predetermined range. For example, some known AESS devices may not shut off the engine of a trailing locomotive until the temperature of the engine decreases to a predetermined threshold. If the time period between the operator turning down the throttle of the trailing locomotives and the temperature of the engines decreasing to the predetermined threshold is significant, then the amount of fuel that is unnecessarily consumed by the trailing locomotives can be significant. Known powered vehicle systems may include one or more powered units (e.g., locomotives) and one or more non-powered units (e.g., freight cars or other rail cars). The powered units supply tractive force to propel the powered units and non-powered units. The non-powered units hold or store goods and/or passengers, and are not capable of self-propulsion. For example, some known powered vehicle systems have locomotives and rail cars for conveying goods and/or passengers along a track. Some known powered rail vehicle systems include several powered units. For example, the systems may include a lead powered unit, such as a lead locomotive, and one or more remote powered units, such as trailing locomotives, that are located behind and coupled with the lead powered unit. The lead and remote powered units supply tractive force to propel the system along the track.

The remote powered units may be organized in motive power groups referred to as consists. (Generally, a consist is a group of vehicles that are mechanically linked together to travel along a route. As part of a train or other larger consist, a motive power group of remote powered units would be considered a sub-consist or remote consist.) The lead powered unit can control the tractive efforts of the remote powered units in consist. The remote powered units in consist can consume fuel during a trip of the vehicle system. To reduce the amount of fuel consumed by the remote vehicles, one or more operational modes of the consist may be changed during operation.

However, changing operational modes of the consist may result in fluctuations of various components or systems of the consist. For example, changing operational modes may cause voltage fluctuations in electrical circuits of the consist, fluctuations in hydraulic pressures of the consist, or the like. These fluctuations may be incompatible with certain on-board control and/or communication systems of the consist. As a result, the on-board systems may be unable to operate due to the fluctuations.

Additionally, some known rail vehicle systems may include more horsepower that is necessary to enable the vehicle systems to travel over a route to a destination location. For example, the operators that combine several locomotives into a consist of a train may add more locomotives to the train than is necessary. The total horsepower provided by the locomotives may exceed what is needed to allow the train to travel to a destination. The additional locomotives cause additional consumption of fuel and/or generation of additional emissions, which is generally undesirable.

It may be desirable to have a vehicle control system and method that differs in function from those systems that are currently available.

BRIEF DESCRIPTION

Embodiments of the inventive subject matter described herein include a method and computer software code for powering a powered system having a first power generating unit where power settings for the first power generating unit are decoupled from power settings for a second power generating unit. The method discloses developing a power operating plan which is independent of a coupled power setting, and determining a power setting responsive to the power operating plan.

The computer software code discloses a computer software module for developing a power operating plan which is independent of a coupled power setting, and a computer software module for determining a power setting responsive to the power operating plan.

In one aspect of the inventive subject matter, a control system includes an energy management system and an isolation control system. The energy management system is configured to generate a trip plan that designates operational settings of a vehicle system having plural powered units interconnected with one another that generate tractive effort to propel the vehicle system along a route for a trip. The energy management system also is configured to determine a tractive effort capability of the vehicle system and a demanded tractive effort of the trip. The tractive effort capability is representative of the tractive effort that the powered units are capable of providing to propel the vehicle system. The demanded tractive effort is representative of the tractive effort that is calculated to be used for actually propelling the vehicle system along the route for the trip according to the trip plan. The isolation control system is configured to be communicatively coupled with the energy management system and to remotely turn one or more of the powered units to an OFF mode. The OFF mode can include the one or more powered units being turned to idle, or to being fully off and deactivated, as described below. The energy management system also is configured to identify a tractive effort difference between the tractive effort capability of the vehicle system and the demanded tractive effort of the trip and to select at least one of the powered units as a selected powered unit based on the tractive effort difference. The isolation module also is configured to remotely turn the selected powered unit to the OFF mode such that the vehicle system is propelled along the route during the trip by the powered units other than the selected powered unit.

In one aspect of the inventive subject matter, a method (e.g., for controlling a vehicle system) comprises determining a tractive effort capability of a vehicle system having plural powered units that generate tractive effort to propel the vehicle system and a demanded tractive effort of a trip. The tractive effort capability is representative of the tractive effort that the powered units are capable of providing to propel the vehicle system. The demanded tractive effort is representative of the tractive effort that is calculated to be used for actually propelling the vehicle system along a route for the trip according to a trip plan. The trip plan designates operational settings of the vehicle system to propel the vehicle system along the route for the trip. The method also includes identifying a tractive effort difference between the tractive effort capability of the vehicle system and the demanded tractive effort of the trip, selecting at least one of the powered units as a selected powered unit based on the tractive effort difference, and remotely turning the selected powered unit to an OFF mode such that the vehicle system is propelled along the route during the trip by the powered units other than the selected powered unit.

In one aspect, another control system includes an energy management system and an isolation control system. The energy management system is configured to generate a trip plan that designates operational settings of a vehicle system having plural powered units interconnected with one another that generate tractive effort to propel the vehicle system along a route for a trip. Each of the powered units is associated with a respective tractive effort capability representative of a maximum horsepower that can be produced by the powered unit during travel. The isolation control system is configured to be communicatively coupled with the energy management system and to remotely turn one or more of the powered units to an OFF mode. The energy management system also is configured to determine a total tractive effort capability of the powered units in the vehicle system and a demanded tractive effort representative of the tractive effort that is calculated to be used for actually propelling the vehicle system along the route for the trip according to the trip plan. The energy management system is configured to select a first powered unit from the powered units based on an excess of the total tractive effort capability of the powered units over the demanded tractive effort of the trip. The isolation control system is configured to remotely turn the first powered unit to an OFF mode such that the vehicle system is propelled along the route during the trip without tractive effort from the first powered unit.

In one aspect of a method (e.g., a method for controlling a vehicle consist), the method comprises, in a vehicle consist comprising plural powered units, controlling one or more of the powered units to an OFF mode of operation. The one or more powered units are controlled to the OFF mode of operation from a start of a trip of the vehicle consist along a route at least until a completion of the trip. During the trip when the one or more powered units are in the OFF mode of operation, the one or more powered units would be capable of providing tractive effort to help propel the vehicle consist. (For example, the powered units controlled to the OFF mode are not disabled or otherwise incapable of providing tractive effort.) In another embodiment of the method, in the OFF mode of operation, engine(s) of the one or more powered units are deactivated.

In one aspect, a control system comprises an energy management system configured to generate a trip plan for controlling a vehicle system having plural powered units along a route for a trip. The energy management system is further configured to determine a tractive effort difference between a tractive effort capability of the vehicle system and a demanded tractive effort of the trip. The tractive effort capability is representative of the tractive effort that the powered units are capable of providing to propel the vehicle system, and the demanded tractive effort is representative of the tractive effort that is calculated to be used for actually propelling the vehicle system along the route for the trip according to the trip plan. The energy management system is further configured to generate the trip plan such that according to the trip plan, at least one of the powered units is to be controlled to an OFF mode during at least part of the trip. (For example, the trip plan is configured such that when the trip plan is executed, the at least one of the powered units is designated to be in the OFF mode of operation.) The energy management system is configured to select the at least one of the powered units based on the tractive effort difference.

In another aspect, a control system for a rail vehicle system including a lead powered unit and a remote powered unit is provided. The system includes a user interface, a master isolation module, and a slave controller. The user interface is disposed in the lead powered unit and is configured to receive an isolation command to turn on or off the remote powered unit. The master isolation module is configured to receive the isolation command from the user interface and to communicate an instruction based on the isolation command. The slave controller is configured to receive the instruction from the master isolation module. The slave controller causes the remote powered unit to supply tractive force to propel the rail vehicle system when the instruction directs the slave controller to turn on the remote powered unit. The slave controller causes the remote powered unit to withhold the tractive force when the instruction directs the slave controller to turn off the remote powered unit.

In another aspect, a method for controlling a rail vehicle system that includes a lead powered unit and a remote powered unit is provided. The method includes providing a user interface in the lead powered unit to receive an isolation command to turn on or off the remote powered unit and a slave controller in the remote powered unit. The method also includes communicating an instruction based on the isolation command to the slave controller and directing the slave controller to cause the remote powered unit to supply tractive force to propel the rail vehicle system when the instruction directs the slave controller to turn on the remote powered unit and to cause the remote powered unit to withhold the tractive force when the instruction directs the slave controller to turn off the remote powered unit.

In another aspect, a computer readable storage medium for a control system of a rail vehicle system is having a lead powered unit and a remote powered unit is provided. The lead powered unit includes a microprocessor and the remote powered unit includes a slave isolation module and a slave controller. The computer readable storage medium includes instructions to direct the microprocessor to receive an isolation command to turn on or off the remote powered unit. The instructions also direct the microprocessor to communicate an instruction based on the isolation command. The slave controller receives the instruction to cause the remote powered unit to supply tractive force to propel the rail vehicle system when the instruction directs the slave controller to turn on the remote powered unit and to withhold the tractive force when the instruction directs the slave controller to turn off the remote powered unit.

In another aspect, a method for controlling a train having a lead locomotive and a remote locomotive is provided. The method includes communicating an instruction that relates to an operational state of the remote locomotive from the lead locomotive to the remote locomotive. The method also includes controlling an engine of the remote locomotive at the remote locomotive based on the instruction into one of an on operational state and an off operational state. The engine does not combust fuel during at least a portion of a time period when the engine is in the off operational state.

As should be appreciated, the control system, method, and computer readable storage medium remotely adjust the tractive force provided by powered units in a powered rail vehicle system by turning powered units in the system on or off. Such a system, method, and computer readable storage medium can improve some known rail vehicle systems by reducing the amount of fuel that is consumed during a trip.

BRIEF DESCRIPTION OF THE DRAWINGS

A more particular description of the inventive subject matter briefly described above will be rendered by reference to specific embodiments thereof that are illustrated in the appended drawings. Understanding that these drawings depict only example embodiments and are not therefore to be considered to be limiting of its scope, various embodiments will be described and explained with additional specificity and detail through the use of the accompanying drawings in which.

DETAILED DESCRIPTION

Figure 1:
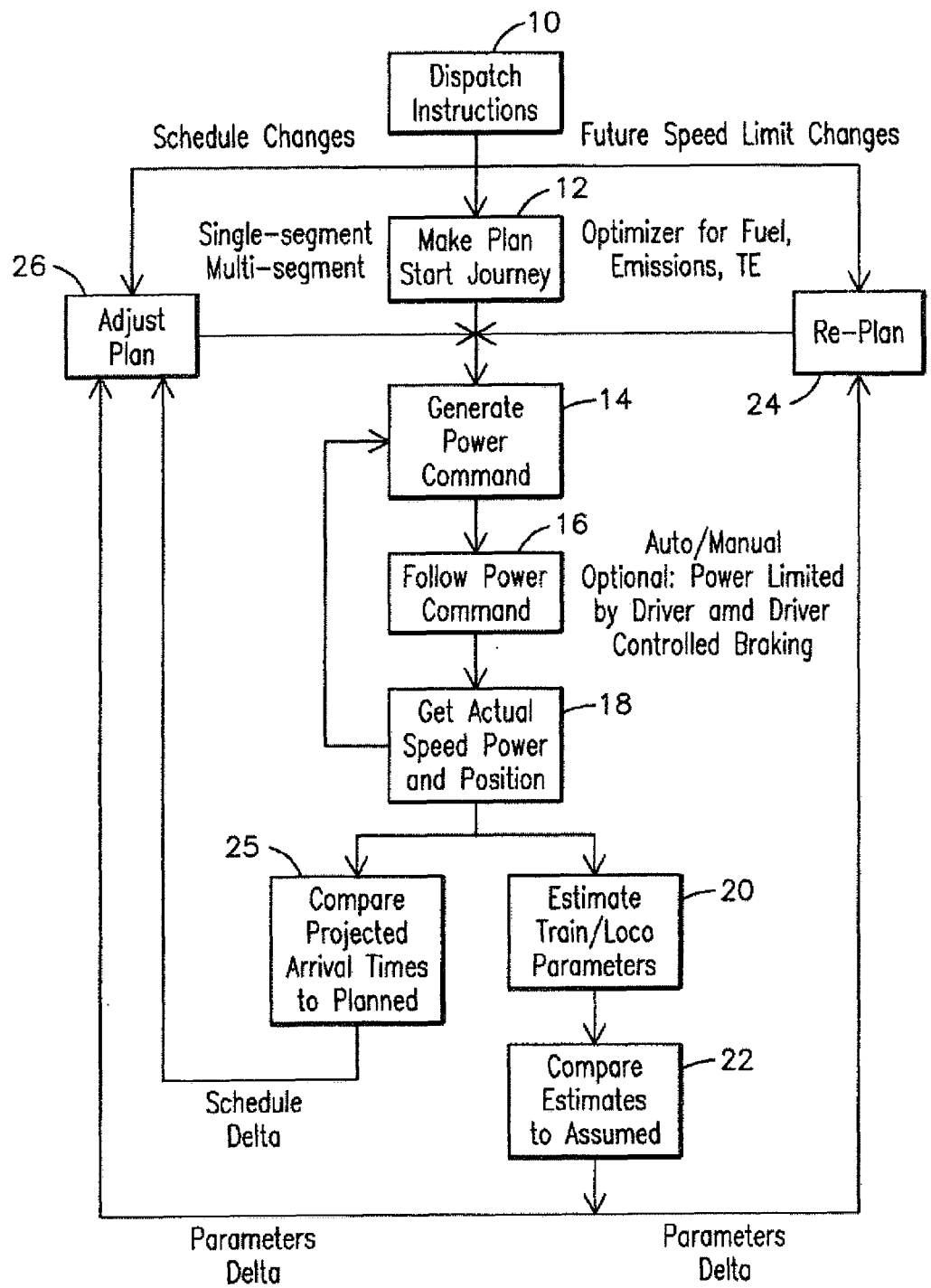
FIG. 1 illustrates a flowchart of a method for trip optimization.

Reference will now be made in detail to various embodiments, examples of which are illustrated in the accompanying drawings. Wherever possible, the same reference numerals used throughout the drawings refer to the same or like parts.

Though some embodiments are described with respect to rail vehicles, or railway transportation systems, specifically trains and locomotives having diesel engines, embodiments may also be applicable for other uses, such as, but not limited to, off-highway vehicles, marine vessels, stationary units, agricultural vehicles, transport buses, each of which may use at least one diesel engine, or diesel internal combustion engine. Additionally the vehicles disclosed herein may also be electric powered vehicles, for example an electric powered locomotive. A mission may include a task or requirement to be performed by the powered system. For example, with respect to railway, marine, transport vehicles, agricultural vehicles, or off-highway vehicle applications, a mission may include the movement of the system from a present location to a destination and/or any location there between, such as a trip of the powered system. In the case of stationary applications, such as, but not limited to, a stationary power generating station or network of power generating stations, a mission may refer to an amount of wattage (e.g., MW/hr) or other parameter or requirement to be satisfied by the diesel powered system. An operating condition of the diesel-fueled power generating unit may include one or more of speed, load, fueling value, timing, etc.

The foregoing summary, as well as the following detailed description of certain embodiments of the inventive subject matter, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a circuit or circuitry that includes and/or is coupled with one or more processors, microcontrollers, random access memories, hard disks, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "including," "comprising," or "having" (and various forms thereof) an element or a plurality of elements having a particular property may include additional such elements not having that property.

As used herein, the term "vehicle system" includes two or more vehicles that operate together to travel along a route. The term "consist" can refer to a group of vehicles that are mechanically and/or logically linked together to travel along a route. According to various aspects of the invention, a consist may be defined based on one or more of the following: mechanical linkages, where vehicles in a consist are mechanically linked and adjacent to at least one other vehicle in the consist; electrical linkages, where vehicles are electrically linked for possibly transferring electrical power between the vehicles; and/or operational/functional linkages, where plural vehicles are controlled in a coordinated manner, e.g., certain modes of distributed power operations. As one example, in a rail vehicle context, a locomotive consist comprises plural locomotives that are mechanically (and possibly electrically) linked together, with each locomotive linked and adjacent to at least one other locomotive in the consist. For example, a consist of vehicles, or a vehicle consist, may include two or more vehicles that are mechanically coupled with each other and/or that communicate with each other over one or more wired and/or wireless connections to coordinate control of tractive efforts and/or braking efforts of the vehicles in the consist. A vehicle system can include one or more vehicle consists, such as a train that includes two or more motive power groups formed from two or more locomotives mechanically linked together with each other. The term "lead vehicle" refers to a vehicle that controls operations of one or more vehicles in the vehicle system, and does not necessarily mean the vehicle disposed at a front or leading end of a vehicle system. For example, a lead locomotive in a train may not be disposed at the front end of a train. The term "remote vehicle" refers to a vehicle other than the lead vehicle in a vehicle system. For example, a remote vehicle may include a locomotive that is controlled by a lead locomotive in a train. The term "remote" does not require a predetermined spacing or separation between items. For example, a remote vehicle may be directly coupled with a lead vehicle.

Though diesel powered systems are disclosed, embodiments may also be utilized with non-diesel powered systems, such as, but not limited to, natural gas powered systems, bio-diesel powered systems, electrically powered systems, etc. Furthermore, as disclosed herein such non-diesel powered systems, as well as diesel powered systems, may include multiple engines, other power sources, and/or additional power sources, such as, but not limited to, battery sources, voltage sources (e.g., capacitors), chemical sources, pressure based sources (e.g., spring and/or hydraulic expansion), current sources (e.g., inductors), inertial sources (e.g., flywheel devices), gravitational-based power sources, and/or thermal-based power sources.

In one embodiment involving marine vessels, a plurality of tugs may be operating together where all are moving the same larger vessel, where each tug is linked in time to accomplish the mission of moving the larger vessel. In another example, a single marine vessel may have a plurality of engines. Off Highway Vehicle (OHV) may involve a fleet of vehicles that have a same mission to move earth, from location A to location B, where each OHV is linked in time to accomplish the mission. With respect to a stationary power generating station, a plurality of stations may be grouped together collectively generating power for a specific location and/or purpose. In another embodiment, a single station is provided, but with a plurality of generators making up the single station. In one example involving locomotive vehicles, a plurality of diesel powered systems may be operating together where all are moving the same larger load, where each system is linked in time to accomplish the mission of moving the larger load. In another embodiment, a locomotive vehicle may have more than one diesel powered system.

Embodiments may solve problems in the art by decoupling a plurality of throttle commands in the powered system from coupled power settings. With respect to locomotives, embodiments may also be operable when the locomotive consist is in distributed power operations.

An apparatus, such as a data processing system, including a CPU, memory, I/O, program storage, a connecting bus, and other appropriate components, can be programmed or otherwise designed to facilitate the practice of the method. Such a system would include appropriate program means for executing the method.

Also, an article of manufacture, such as a pre-recorded disk or other similar computer program product, for use with a data processing system, could include a storage medium and program means recorded thereon for directing the data processing system to facilitate the practice of the method. Such apparatus and articles of manufacture also fall within the spirit and scope of the claims.

A technical effect may be to decouple a plurality of throttle commands from coupled power settings. Embodiments are described hereinafter with reference to specific implementations thereof. Embodiments may be described in the general context of computer-executable instructions, such as program modules, being executed by any device, such as, but not limited to, a computer, designed to accept data, perform prescribed mathematical and/or logical operations usually at high speed, where results of such operations may or may not be displayed. Generally, program modules include routines, programs, objects, components, data structures, etc. that performs particular tasks or implement particular abstract data types. For example, the software programs can be coded in different programming languages, for use with different devices, or platforms. In the description that follows, examples may be described in the context of a web portal that employs a web browser. It will be appreciated, however, that the principles that underlie one or more embodiments can be implemented with other types of computer software technologies as well.

Moreover, one or more embodiments may be practiced with other computer system configurations, including hand-held devices, multiprocessor systems, microprocessor-based or programmable consumer electronics, minicomputers, mainframe computers, and the like. One or more embodiments may also be practiced in distributed computing environments where tasks are performed by remote processing devices that are linked through a communications network. In a distributed computing environment, program modules may be located in both local and remote computer storage media including memory storage devices. These local and remote computing environments may be contained entirely within the locomotive, or adjacent locomotives in consist, or off-board in wayside or central offices where wireless communication is used.

As used herein, a locomotive consist may include one or more locomotives in succession, connected together so as to provide motoring and/or braking capability. The locomotives may be connected together where no train cars are in between the locomotives. A train can have more than one locomotive consists in the composition of the train. Specifically, there can be a lead consist and more than one remote consists, such as midway in the line of cars and another remote consist at the end of the train. Each locomotive consist may have a first locomotive and trail locomotive(s). A consist group of locomotives may also be recognized as a consist even when at least a car separates the locomotives, such as when the locomotive consist is configured for distributed power operation. In distributed power operation, throttle and braking commands are relayed from the lead locomotive to the remote trains by a radio link or physical cable. Accordingly, the term locomotive consist should not be considered a limiting factor when discussing multiple locomotives within the same train.

As disclosed herein, a consist may also be applicable when referring to such diesel powered systems as, but not limited to, marine vessels, off-highway vehicles, transportation vehicles, agricultural vehicles and/or stationary power plants, that operate together so as to provide motoring, power generation, and/or braking capability. Therefore even though locomotive consist is used herein, this term may also apply to other diesel powered systems. Similarly, sub-consists may exist. For example, the diesel powered system may have more than one diesel-fueled power generating unit. A power plant may have more than one diesel electric power unit where optimization may be at the sub-consist level. Likewise, a locomotive may have more than one diesel power unit.

As used herein, the term "optimize" (and forms thereof) are not intended to require maximizing or minimizing a characteristic, parameter, or other object in all embodiments described herein. Instead, "optimize" and its forms are intended to mean that a characteristic, parameter, or other object is increased or decreased toward a designated or desired amount. For example, "optimizing" fuel efficiency is not limited to a complete absence of fuel consumption or that the absolute minimum amount of fuel is consumed. Rather, optimizing the fuel efficiency may mean that the fuel efficiency is increased, but not necessarily maximized. However, "optimizing" fuel efficiency can include reducing fuel consumption to the minimum amount possible. As another example, optimizing emission generation may not mean completely eliminating the generation of all emissions. Instead, optimizing emission generation may mean that the amount of emissions generated is reduced but not necessarily eliminated. However, optimizing emission generation can include reducing the amount of emissions generated to a minimum amount possible. In one embodiment, "optimizing" a characteristic, parameter, or other object includes increasing or decreasing the characteristic, parameter, or object (as appropriate) during performance of a mission (e.g., a trip) such that the characteristic, parameters, or object is increased or decreased (as appropriate) relative to performing the same mission in another way. For example, the powered system traveling along a trip according to an optimized trip plan can result in the powered system consuming less fuel and/or generating fewer emissions relative to traveling along the same trip according to another, different trip plan.

Embodiments can be implemented in numerous ways, including as a system (including a computer processing system), a method (including a computerized method), an apparatus, a computer readable medium, a computer program product, a graphical user interface, including a web portal, or a data structure tangibly fixed in a computer readable memory. Several embodiments are discussed below.

FIG. 1 illustrates a flowchart of one embodiment. Although the following is with specific reference to a rail vehicle system, such as a train having one or more locomotives, the following may be applicable to other power generating units and systems as described herein. As illustrated, instructions are input specific to planning a trip either on board or from a remote location, such as a dispatch center 10. Such input information includes, but is not limited to, train position, consist description (such as locomotive models), locomotive power description, performance of locomotive traction transmission, consumption of engine fuel as a function of output power, cooling characteristics, the intended trip route (effective track grade and curvature as function of milepost or an "effective grade" component to reflect curvature following standard railroad practices), car makeup and loading together with effective drag coefficients, and trip desired parameters including, but not limited to, start time and location, end location, desired travel time, crew (user and/or operator) identification, crew shift expiration time, and route.

The data may be provided to a locomotive 42 of a train 31 (FIG. 3) in a number of ways, such as, but not limited to, an operator manually entering the data into the locomotive 42 via an on-board display, inserting a memory device such as a hard card and/or USB drive containing the data into a receptacle aboard the locomotive, and transmitting the information via wireless communication from a central or wayside location 41 (FIG. 3), such as a track signaling device and/or a wayside device, to the locomotive 42. The locomotive 42 and the train 31 load characteristics (e.g., drag) may also change over the route (e.g., with altitude, ambient temperature and condition of the rails and rail-cars), and the plan may be updated to reflect such changes as needed by any of the methods discussed above and/or by real-time autonomous collection of locomotive/train conditions. Such changes include, for example, changes in locomotive or train characteristics that are detected by monitoring equipment on or off board the locomotive(s) 42.

The track signal system determines an allowable speed of the train. There are many types of track signal systems and the operating rules associated with each of the signals. For example, some signals have a single light (on/off), some signals have a single lens with multiple colors, and some signals have multiple lights and colors. The signals can indicate the track is clear and the train may proceed at a designated speed. The signals can also indicate a reduced speed or stop is required. The signals may indicate that the reduction in the speed should occur immediately or by a designated location (e.g. prior to the next signal or crossing).

The signal status is communicated to the train and/or operator through various means. Some systems have circuits in the track and inductive pick-up coils on the locomotives. Other systems have wireless communications systems. Signal systems can also require the operator to visually inspect the signal and take the appropriate actions.

The signaling system may interface with the on-board signal system and adjust the locomotive speed according to the inputs and the appropriate operating rules. For signal systems that require the operator to visually inspect the signal status, the operator screen will present the appropriate signal options for the operator to enter based on the train's location. The type of signal systems and operating rules, as a function of location, may be stored in an onboard database 63.

Based on the specification data, an improved plan is computed to produce a trip profile 12. The improved plan may reduce fuel use and/or emissions produced subject to speed limit constraints along the route with desired start and end times. The trip profile contains a designated speed and power (notch) settings for the train. The trip profile may be a function of distance and/or time. Train operating limits include, but are not limited to, designated notch power settings, brake settings, speed limits as a function of location, expected fuel used, and emissions generated. In one embodiment, a value for the notch setting is selected to obtain throttle change decisions about once every 10 to 30 seconds. However, the throttle change decisions may occur at a longer or shorter duration, if needed and/or desired to follow an optimal (e.g., improved) or designated speed profile. Trip profiles may provide power settings for the train, either at the train level, consist level and/or individual train level. Power may include braking power, motoring power, and airbrake power. In another embodiment, instead of operating at the traditional discrete notch power settings, one embodiment may be able to select a continuous power setting determined as optimal for the profile selected. Thus, for example, if an optimal profile specifies a notch setting of 6.8, instead of operating at notch setting 7, the locomotive 42 can operate at 6.8. Allowing such intermediate power settings may bring additional efficiency benefits as described below.

The procedure used to compute the optimal profile can be any number of methods for computing a power sequence that drives the train 31 to reduce fuel and/or emissions subject to locomotive operating and schedule constraints, as summarized below. In some cases, the trip profile may be similar to another trip profile that was previously determined, due to the similarity of the train configurations, routes and/or environmental conditions. In these cases it may be sufficient to identify a driving trajectory within a database 63 and attempt to follow the driving trajectory. When no previously computed plan is suitable, methods to compute a new one include, but are not limited to, direct calculation of the optimal profile using differential equation models which approximate the train physics of motion. The setup involves selection of a quantitative objective function, commonly a weighted sum (integral) of model variables that correspond to rate of fuel consumption and emissions generation plus a term to penalize excessive throttle variation.

An optimal control formulation is determined to reduce the quantitative objective function subject to constraints including, but not limited to, speed limits, minimum and/or maximum power (throttle) settings, and maximum cumulative and/or instantaneous emissions. Depending on planning objectives at any time, the problem may be setup flexibly to reduce fuel subject to constraints on emissions and speed limits, or to reduce emissions, subject to constraints on fuel use and arrival time. Embodiments may also determine, for example, a goal to reduce the total travel time without constraints on total emissions or fuel use where such relaxation of constraints would be permitted or required for the mission.

Throughout the document example equations and objective functions are presented for reducing locomotive fuel consumption. These equations and functions are for illustration only as other equations and objective functions can be employed to improve fuel consumption or to improve other locomotive/train operating parameters.

Mathematically, the problem to be solved may be stated more precisely. The basic physics are expressed by:

$$\frac{dx}{dt} = v; x(0) \qquad (1)$$
$$= 0.0; x(T_f)$$
$$= D$$

$$\frac{dv}{dt} = T_e(u, v) - G_a(x) - R(v); v(0) \qquad (2)$$
$$= 0.0; v(T_f)$$
$$= 0.0$$

where x is the position of the train, v is the velocity of the train, t is time (in miles, miles per hour and minutes or hours as appropriate), and u is the notch (throttle) command input. Further, D denotes the distance to be traveled; $T_f$ is the desired arrival time at distance D along the track; $T_e$ is the tractive effort produced by the locomotive consist; $G_a$ is the gravitational drag which depends on the train length; train makeup and terrain on which the train is located; and R is the net speed dependent drag of the locomotive consist and train combination. The initial and final speeds can also be specified, but without loss of generality are taken to be zero here (train stopped at beginning and end). The model is may be modified to include other important dynamics such as the lag between a change in throttle, u, and the resulting tractive effort or braking. Using this model, an optimal control formulation is set up to reduce the quantitative objective function subject to constraints including but not limited to, speed limits and minimum and maximum power (throttle) settings. Depending on planning objectives at any time, the problem may be setup flexibly to reduce fuel subject to constraints on emissions and speed limits, and/or to reduce emissions, subject to constraints on fuel use and arrival time.

It is also possible to identify, for example, an operating goal to reduce the total travel time without constraints on total emissions or fuel use where such relaxation of constraints would be permitted or required for the mission. Performance measures can be expressed as a linear combination of any of the following:

$$\min_{u(t)} \int_0^{T_f} F(u(t))dt - \text{Minimize (e.g., reduce) total fuel consumption} \qquad (3)$$

$$\min_{u(t)} T_f - \text{Minimize (e.g., reduce) Travel Time} \qquad (4)$$

$$\min_{u_i} \sum_{i=2}^{n_d} (u_i - u_{i-1})^2 - \qquad (5)$$

Minimize (e.g., reduce) notch jockeying (piecewise constant input)

$$\min_{u(t)} \int_0^{T_f} (du/dt)^2 dt - \qquad (6)$$

Minimize (e.g., reduce) notch jockeying (continous input)

Replace the fuel term F in (1) with a term corresponding to emissions production. For example for emissions:

$$\min_{u(t)} \int_0^{T_f} E(u(t))dt - \text{Minimize total emissions consumption} \quad (7)$$

In this equation, E is the quantity of emissions in gm/hphr for each of the notches (or power settings). In addition, a minimization could be done based on a weighted total of fuel and emissions.

A commonly used and representative objective function is thus $$\min_{u(t)} \alpha_1 \int_0^{T_f} F(u(t))dt + \alpha_3 T_f + \alpha_2 \int_0^{T_f} (du/dt)^2 dt \quad \text{(OP)}$$

The coefficients of the linear combination depend on the importance (weight) given to each of the terms. Note that in equation (OP), u(t) is the optimizing variable that is the continuous notch position. If discrete notch is required, e.g. for older locomotives, the solution to equation (OP) is discretized, which may result in lower fuel savings. Finding a minimum time solution ($\alpha_1$ set to zero and $\alpha_2$ set to zero or a relatively small value) is used to find a lower bound for the achievable travel time ($T_f = T_{fmin}$). In this case, both u(t) and $T_f$ are optimizing variables. The preferred embodiment solves the equation (OP) for various values of $T_f$ with $T_f > T_{fmin}$ with $\alpha_3$ set to zero. In this latter case, $T_f$ is treated as a constraint.

For those familiar with solutions to such problems, it may be necessary to adjoin constraints, e.g. the speed limits along the path:

$$0 \leq v \leq SL(x) \quad (8)$$

or when using minimum time as the objective, that an end point constraint must hold, e.g., total fuel consumed must be less than what is in the tank, e.g., via:

$$0 < \int_0^{T_f} F(u(t))dt \leq W_F \quad (9)$$

where $W_F$ is the fuel remaining in the tank at $T_f$. Equation (OP) can be in other forms and that what is presented above is only one equation for use in an embodiment. For example, a variation of equation (OP) may be required where multiple power systems, diesel and/or non-diesel, are used to provide multiple thrusters, such as those used when operating a marine vessel.

Emissions may include cumulative emissions produced in the form of oxides of nitrogen (NOx), carbon oxides ($CO_x$), unburned hydrocarbons (HC), and particulate matter (PM), etc. However, other emissions may include, but not be limited to a maximum value of electromagnetic emission, such as a limit on radio frequency (RF) power output, measured in watts, for respective frequencies emitted by the locomotive. Yet another form of emission is the noise produced by the locomotive, typically measured in decibels (dB). An emission requirement may be variable based on a time of day, a time of year, and/or atmospheric conditions such as weather or pollutant level in the atmosphere. Emission regulations may vary geographically across a railroad system. For example, an operating area such as a city or state may have specified emission objectives, and an adjacent area may have different emission objectives, for example a lower amount of allowed emissions or a higher fee charged for a given level of emissions.

Accordingly, an emission profile for a certain geographic area may be generated or modified to include improved emission values for each of the regulated emissions including in the profile to meet a predetermined emission objective required for that area. Typically, for a locomotive, these emission parameters are determined by, but not limited to, the power (Notch) setting, ambient conditions, engine control method, etc. Locomotives may be compliant with EPA emission standards. Operation of the locomotive according to a trip plan may be compliant with EPA emission standards. However, other regulations may also be applicable. For example, regulations for $CO_2$ emissions may also be considered.

If one objective during a trip mission is to reduce emissions, the control formulation, equation (OP), may be amended to consider the objective. A key flexibility in the optimization setup is that any or all of the trip objectives can vary by geographic region or mission. For example, for a high priority train, minimum time may be the only objective on one route because it is high priority traffic. In another example emission output could vary from state to state along the planned train route.

To solve the resulting optimization problem, one or more embodiments may transcribe a dynamic optimal control problem in the time domain to an equivalent static mathematical programming problem with N decision variables, where the number 'N' depends on the frequency at which throttle and braking adjustments are made and the duration of the trip. For typical problems, this N can be in the thousands. For example in one embodiment, suppose a train is traveling a 172-mile (276.8 kilometers) stretch of track in the southwest United States. Utilizing one embodiment, 7.6% saving in fuel used may be realized when comparing a trip determined and followed as describe herein versus an actual driver throttle/speed history where the trip was determined by an operator. The improved savings is realized because the optimization produces a driving strategy with both less drag loss and little or no braking loss compared to the trip plan of the operator.

Figure 2:
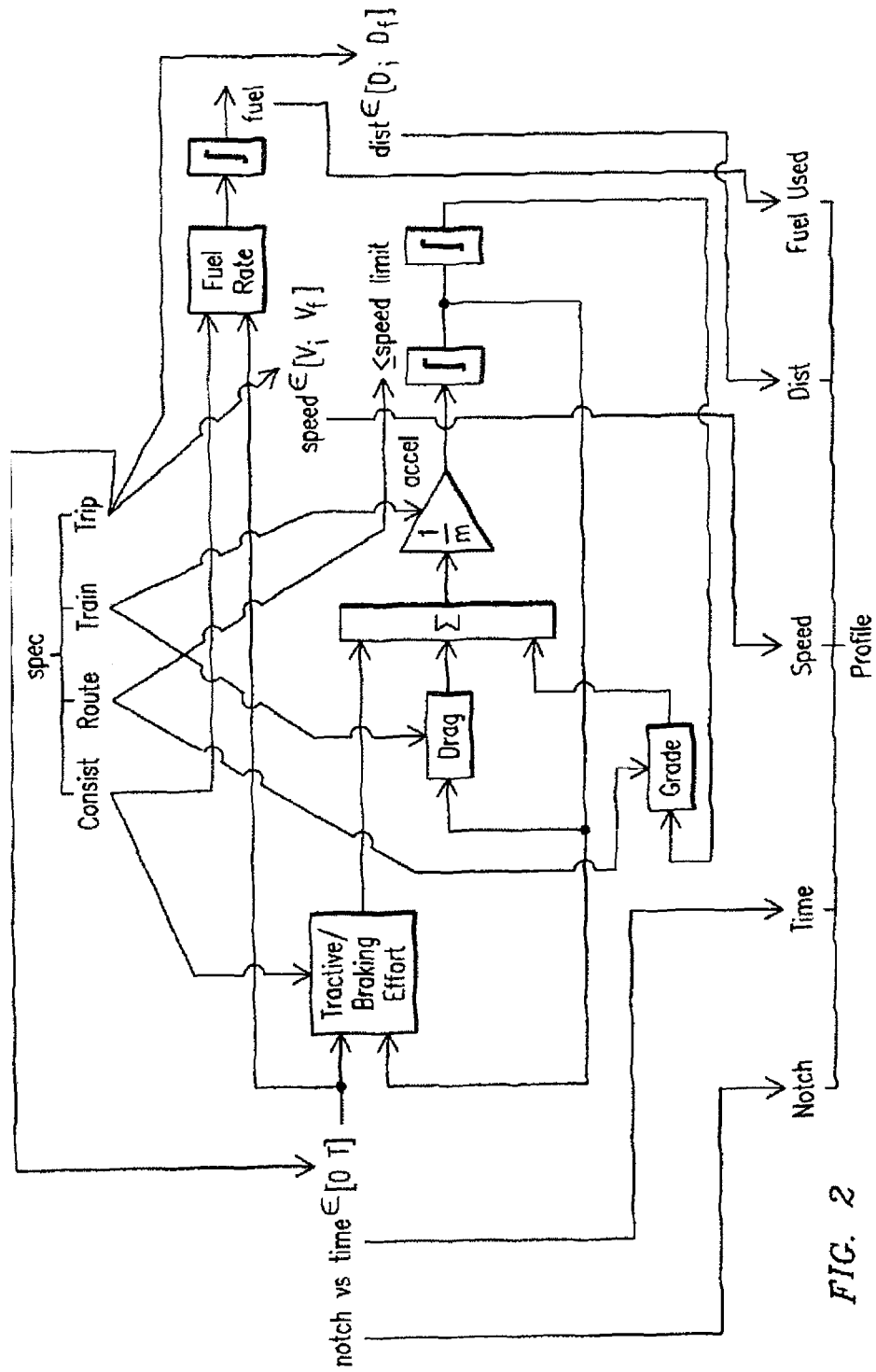
FIG. 2 depicts a simplified a mathematical model of a powered system that may be employed in one or more embodiments.

In some embodiments, a simplified mathematical model of the train may be employed, such as illustrated in FIG. 2 and the equations discussed above. As illustrated, certain set specifications, such as, but not limited to, information about the consist, route information, train information, and/or trip information, are considered to determine a profile, preferably an optimized profile. Such factors included in the profile include, but are not limited to, speed, distance remaining in the mission, and/or fuel used. As disclosed herein, other factors that may be included in the profile are notch setting and time. One refinement to the profile is produced by driving a more detailed model with the optimal power sequence generated, to test if other thermal, electrical, and mechanical constraints are violated, leading to a modified profile with speed versus distance that is closest to a run that can be achieved without harming locomotive or train equipment, e.g., satisfying additional implied constraints such as thermal and electrical limits on the locomotive and inter-car forces in the train. The equations discussed herein may be utilized with FIG. 2.

Referring back to FIG. 1, once the trip is started 12, power commands are generated 14 to put the plan in motion. One command may be for the locomotive to follow the optimized power command 16 so as to achieve a designated speed. A controller may obtain actual speed and power information from the locomotive consist of the train 18. A closed-loop calculation of corrections to optimize power may be obtained to track the desired optimal speed. Such corrections of train operating limits can be made automatically or by the operator, who always has ultimate control of the train.

In some cases, the model used in the optimization may differ significantly from actual performance of the train. This can occur for many reasons, including but not limited to, extra cargo pickups or setouts, locomotives that fail in route, and errors in the initial database 63 or data entry by the operator. For these reasons a monitoring system is in place that uses real-time train data to estimate locomotive and/or train parameters in real time 20. The estimated parameters are then compared to the assumed parameters used when the trip was initially created 22. Based on any differences in the assumed and estimated values, the trip may be re-planned 24, should large enough savings accrue from a new plan.

Other reasons a trip may be re-planned include directives from a remote location, such as dispatch and/or the operator requesting a change in objectives to be consistent with more global movement planning objectives. More global movement planning objectives may include, but are not limited to, other train schedules, allowing exhaust to dissipate from a tunnel, maintenance operations, etc. Another reason may be due to an onboard failure of a component. Strategies for re-planning may be grouped into incremental and significant adjustments depending on the severity of the disruption, as discussed in more detail below. In general, a "new" plan is derived from a solution to the problem equation (OP) described above, but frequently faster approximate solutions can be found, as described herein.

Figure 4:
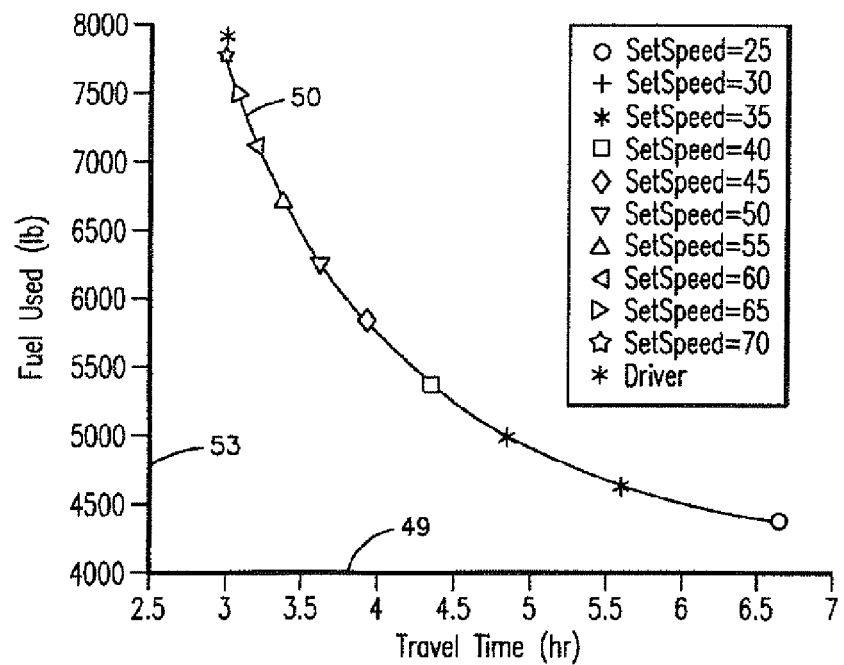
FIG. 4 depicts one embodiment of a fuel-use/travel time curve.

In operation, the locomotive 42 may continuously monitor system efficiency and continuously update the trip plan based on the actual efficiency measured, whenever such an update would improve trip performance. Re-planning computations may be carried out entirely within the locomotive(s) or fully or partially moved to a remote location, such as dispatch or wayside processing facilities where wireless technology is used to communicate the plans to the locomotive 42. One or more embodiments may also generate efficiency trends that can be used to develop locomotive fleet data regarding efficiency transfer functions. The fleet-wide data may be used when determining the initial trip plan, and may be used for network-wide optimization tradeoff when considering locations of a plurality of trains. For example, the travel-time fuel use tradeoff curve as illustrated in FIG. 4 reflects a capability of a train on a particular route at a current time, updated from ensemble averages collected for many similar trains on the same route. Thus, a central dispatch facility collecting curves like FIG. 4 from many locomotives could use that information to better coordinate overall train movements to achieve a system-wide advantage in fuel use or throughput. As disclosed above, various fuel types, such as, but not limited to, diesel fuel, heavy marine fuels, palm oil, bio-diesel, etc., may be used.

Furthermore, as disclosed above, various energy storage devices may be used. For example, the amount of power withdrawn from a particular source, such as a diesel engine and batteries, could be optimized so that the maximum fuel efficiency/emission, which may be an objective function, is obtained. As further illustration suppose the total power demand is 2000 horse power (HP) where the batteries can supply 1500 HP and the engine can supply 4400 HP, the optimum point could be when batteries are supplying 1200 HP and engine is supplying 200 HP.

Similarly, the amount of power may also be based the amount of energy stored and the need of the energy in the future. For example if there is long high demand coming for power, the battery could be discharged at a slower rate. For example if 1000 horsepower hour (HPhr) is stored in the battery and the demand is 4400 HP for the next 2 hrs, it may be optimum to discharge the battery at 800 HP for the next 1.25 hrs and take 3600 HP from the engine for that duration.

Various events in daily operations can lead to a need to generate or modify a currently executing plan, where it desired to keep the same trip objectives, for when a train is not on schedule for planned meet or pass with another train and it needs to make up time. Using the actual speed, power, and location of the locomotive, a comparison is made between a planned arrival time and the currently estimated (predicted) arrival time 25. Based on a difference in the times, as well as the difference in parameters (detected or changed by dispatch or the operator), the plan is adjusted 26. This adjustment may be made automatically following a railroad company's desire for how such departures from plan should be handled or manually propose alternatives for the on-board operator and dispatcher to jointly decide the best way to get back on plan. Whenever a plan is updated but where the original objectives remain the same, additional changes may be factored in concurrently, e.g. new future speed limit changes, which could affect the feasibility of recovering the original plan. In such instances if the original trip plan cannot be maintained, or in other words the train is unable to meet the original trip plan objectives, other trip plan(s) may be presented to the operator and/or remote facility, or dispatch.

A re-plan may also be made when it is desired to change the original objectives. Such re-planning can be done at either fixed preplanned times, manually at the discretion of the operator or dispatcher, or autonomously when predefined limits, such a train operating limits, are exceeded. For example, if the current plan execution is running late by more than a specified threshold, such as thirty minutes, one or more embodiments can re-plan the trip to accommodate the delay at expense of increased fuel as described above or to alert the operator and dispatcher how much of the time can be made up at all (i.e. what minimum time to go or the maximum fuel that can be saved within a time constraint). Other triggers for re-plan can also be envisioned based on fuel consumed or the health of the power consist, including but not limited time of arrival, loss of horsepower due to equipment failure and/or equipment temporary malfunction (such as operating too hot or too cold), and/or detection of gross setup errors, such in the assumed train load. That is, if the change reflects impairment in the locomotive performance for the current trip, these may be factored into the models and/or equations used in the optimization.

Changes in plan objectives can also arise from a need to coordinate events where the plan for one train compromises the ability of another train to meet objectives and arbitration at a different level, e.g. the dispatch office is required. For example, the coordination of meets and passes may be further optimized through train-to-train communications. Thus, as an example, if a train knows that it is behind in reaching a location for a meet and/or pass, communications from the other train can notify the late train (and/or dispatch). The operator can then enter information to recalculate the train's trip plan. One or more embodiments can also be used at a high level, or network-level, to allow a dispatch to determine which train should slow down or speed up should a scheduled meet and/or pass time constraint may not be met. As discussed herein, this is accomplished by trains transmitting data to the dispatch to prioritize how each train should change its planning objective. A choice could depend either from schedule or fuel saving benefits, depending on the situation.

For any of the manually or automatically initiated re-plans, more than one trip plan may be presented to the operator. One or more embodiments may present different trip profiles to the operator, permitting the operator to select the arrival time, and determine the corresponding fuel and/or emission impact. Such information can also be provided to the dispatch for similar consideration, either as a simple list of alternatives or as a plurality of tradeoff curves such as illustrated in FIG. 4.

One or more embodiments may have the ability of learning and adapting to key changes in the train and power consist which can be incorporated either in the current plan and/or for future plans. For example, one of the triggers discussed above is loss of horsepower. When building up horsepower over time, either after a loss of horsepower or when beginning a trip, transition logic is utilized to determine when desired horsepower is achieved. This information can be saved in the locomotive database 61 for use in optimizing either future trips or the current trip should loss of horsepower occur again.

Likewise, in a similar fashion where multiple thrusters are available, each may need to be independently controlled. For example, a marine vessel may have many force producing elements, or thrusters, such as, but not limited to, propellers. Each propeller may need to be independently controlled to produce the optimum output. Therefore utilizing transition logic, the trip optimizer may determine which propeller to operate based on what has been learned previously and by adapting to key changes in the marine vessel's operation.

Figure 3:
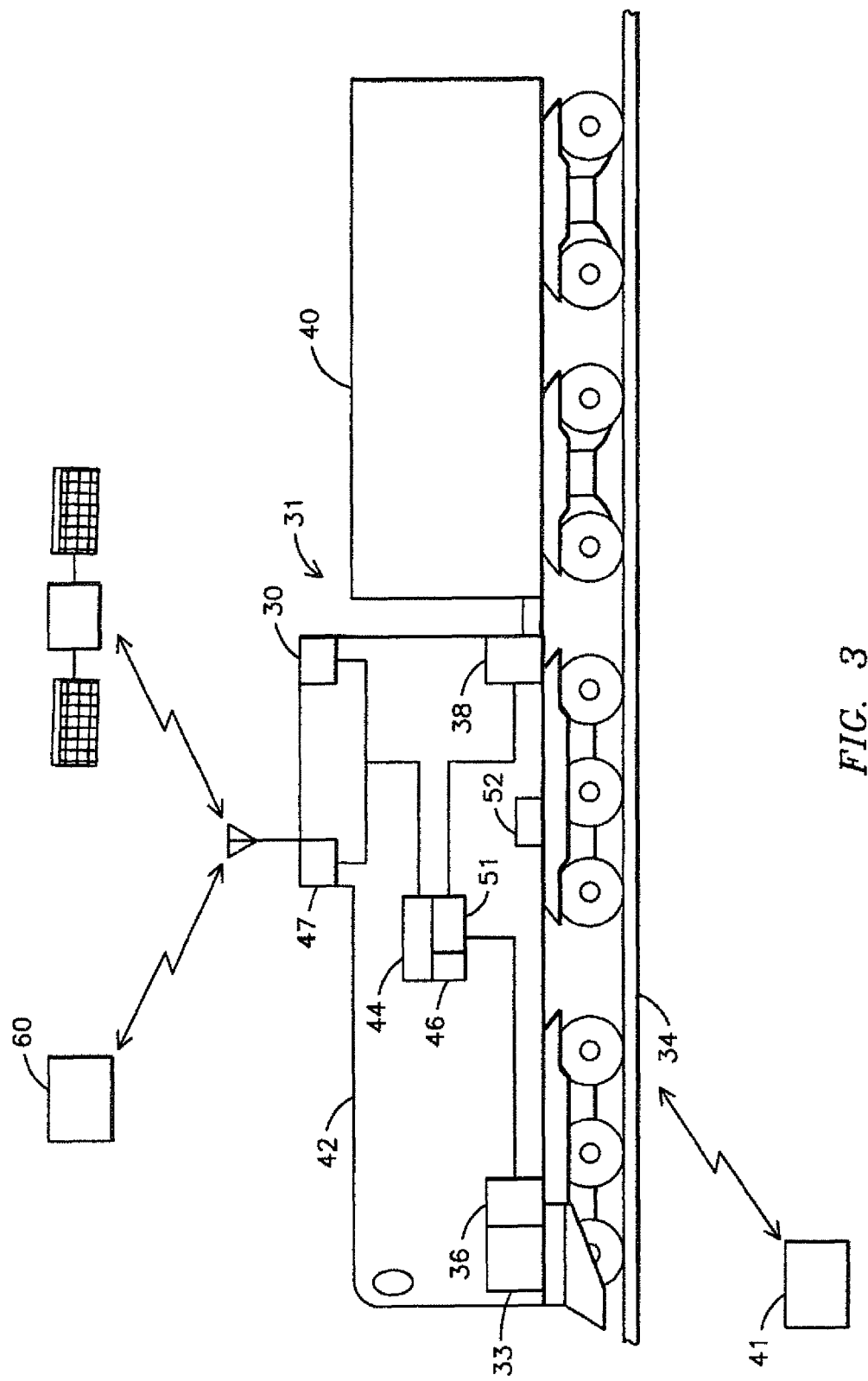
FIG. 3 depicts one embodiment of elements for trip optimization.

FIG. 3 depicts one embodiment of elements of that may part of a trip optimizer system. A locator element 30 to determine a location of the train 31 is provided. The locator element 30 can be a GPS sensor, or a system of sensors, that determine a location of the train 31. Examples of such other systems may include, but are not limited to, wayside devices, such as radio frequency automatic equipment identification (RF AEI) Tags, dispatch, and/or video determination. Another system may include the tachometer(s) aboard a locomotive and distance calculations from a reference point. As discussed previously, a wireless communication system 47 may also be provided to allow for communications between trains and/or with a remote location, such as dispatch. Information about travel locations may also be transferred from other trains.

A track characterization element 33 may provide information about a track, such as grade, elevation, and curvature information, is also provided. The track characterization element 33 may include an on-board track integrity database 36. Sensors 38 are used to measure a tractive effort 40 being hauled by the locomotive consist 42, throttle setting of the locomotive consist 42, locomotive consist 42 configuration information, speed of the locomotive consist 42, individual locomotive configuration, individual locomotive capability, etc. In one embodiment, the locomotive consist 42 configuration information may be loaded without the use of a sensor 38, but is input by other approaches as discussed above. Furthermore, an operability of the locomotives in the consist may also be considered. For example, if one locomotive in the consist is unable to operate above power notch level 5, this information is used when optimizing the trip plan.

Information from the locator element may also be used to determine an appropriate arrival time of the train 31. For example, if there is a train 31 moving along a track 34 toward a destination and no train is following behind it, and the train has no fixed arrival deadline to adhere to, the locator element, including but not limited to radio frequency automatic equipment identification (RF AEI) Tags, dispatch, and/or video determination, may be used to gage the exact location of the train 31. Furthermore, inputs from these signaling systems may be used to adjust the train speed. Using the on-board track database, discussed below, and the locator element, such as GPS, one or more embodiments can adjust the operator interface to reflect the signaling system state at the given locomotive location. In a situation where signal states would indicate restrictive speeds ahead, the planner may elect to slow the train to conserve fuel consumption.

Information from the locator element 30 may also be used to change planning objectives as a function of distance to destination. For example, owing to inevitable uncertainties about congestion along the route, "faster" time objectives on the early part of a route may be employed as hedge against delays that statistically occur later. If it happens on a particular trip that delays do not occur, the objectives on a latter part of the journey can be modified to exploit the built-in slack time that was banked earlier, and thereby recover some fuel efficiency. A similar strategy could be invoked with respect to emissions restrictive objectives, e.g. approaching an urban area.

As an example of the hedging strategy, if a trip is planned from New York to Chicago, the system may have an option to operate the train slower at either the beginning of the trip or at the middle of the trip or at the end of the trip. One or more embodiments may be able to optimize the trip plan to allow for slower operation at the end of the trip since unknown constraints (e.g., weather conditions, track maintenance, etc.) may develop and become known during the trip. As another consideration, if traditionally congested areas are known, the plan is developed with an option to have more flexibility around these traditionally congested regions. Therefore, one or more embodiments may also consider weighting/penalty as a function of time/distance into the future and/or based on known/past experience. Planning and re-planning a trip plan due weather conditions, track conditions, other trains on the track, etc., may occur at any time during the trip.

FIG. 3 further discloses other elements that may be part of one or more embodiments. A processor 44 is provided that is operable to receive information from the locator element 30, track characterizing element 33, and sensors 38. An algorithm 46 operates within the processor 44. The algorithm 46 is used to compute an optimized (e.g., improved) trip plan based on parameters involving the locomotive 42, train 31, track 34, and the objectives of the mission as described above. In one embodiment, the trip plan is base on a solution of non-linear differential equations derived from physics with simplifying assumptions that are provided in the algorithm. The algorithm 46 has access to the information from the locator element 30, track characterizing element 33 and/or sensors 38 to create a trip plan reducing fuel consumption of a locomotive consist 42, reducing emissions of a locomotive consist 42, establishing a desired trip time, and/or ensuring proper crew operating time aboard the locomotive consist 42. In one embodiment, a driver (or controller element) 51 is also provided. As discussed herein the controller element 51 may be used for controlling the train as it follows the trip plan. In one embodiment discussed further herein, the controller element 51 makes train operating decisions automatically. In another embodiment, the operator may be involved with directing the train to follow the trip plan.

Accordingly, one or more embodiments may create and/or subsequently modify the trip plan that is being executed. This includes creating the initial plan when a long distance is involved, owing to the complexity of the plan optimization algorithm. When a total length of a trip profile exceeds a given distance, an algorithm 46 may be used to segment the mission wherein the mission may be divided by waypoints. Though only a single algorithm 46 is discussed, more than one algorithm may be used where the algorithms may be connected together. The waypoint may include natural locations where the train 31 stops, such as, but not limited to, sidings where a meet with opposing traffic, or pass with a train behind the current train is scheduled to occur on single-track rail, or at yard sidings or industry where cars are to be picked up and set out, and locations of planned work. At such waypoints, the train 31 may be required to be at the location at a scheduled time and be stopped or moving with speed in a specified range. The time duration from arrival to departure at waypoints is called dwell time.

Some embodiments may be able to separate a longer trip into smaller segments in a systematic way. In some embodiments, the segments may be selected to begin at a natural location, such as a stop or significant speed restriction, or at key mileposts that define junctions with other routes. Given a partition, or segment, selected in this way, a driving profile is created for each segment of track as a function of travel time taken as an independent variable, such as shown in FIG. 4. The fuel used/travel-time tradeoff associated with each segment can be computed prior to the train 31 reaching that segment of track. A total trip plan can be created from the driving profiles created for each segment. One or more embodiments may distribute travel time amongst all the segments of the trip so that the total trip time satisfies one or more objectives and total fuel consumed over all the segments satisfies one or more objectives. A three-segment trip is disclosed in FIG. 6 and discussed below. However, it is understood that the trip plan may include only a single segment that represents the complete trip.

FIG. 4 depicts one embodiment of a fuel-use/travel time curve. As mentioned previously, such a curve 50 may be created when calculating a trip profile for various travel times for each segment. That is, for a given travel time 49, fuel used 53 is the result of a computed driving profile as described above. Once travel times for each segment are allocated, a power/speed plan is determined for each segment from the previously computed solutions. If there are any waypoint constraints on speed between the segments (e.g., a change in a speed limit) the constraints are considered during creation of the optimal trip profile. If speed restrictions change in only a single segment, the fuel use/travel-time curve 50 has to be re-computed for only the segment changed. This reduces time for having to re-calculate more parts, or segments, of the trip. If the locomotive consist or train changes significantly along the route, e.g. from loss of a locomotive or pickup or set-out of cars, then driving profiles for all subsequent segments may be recomputed creating new instances of the curve 50. These new curves 50 would then be used along with new schedule objectives to plan the remaining trip.

Once a trip plan is created as discussed above, a trajectory of speed and power versus distance is used to reach a destination with minimum fuel and/or emissions at the required trip time. There are several ways in which to execute the trip plan. As provided below in more detail, in a coaching mode, information is displayed to the operator for the operator to follow to achieve the required power and speed determined according to the optimal trip plan. In the coaching mode, the operating information is suggested operating conditions that the operator should select. In another embodiment, acceleration and maintaining a constant speed are performed. However, when the train 31 is slowed, the operator is responsible for applying a braking system 52. In another embodiment, commands for powering and braking are provided as required to follow the desired speed-distance path.

Feedback control strategies are used to provide corrections to the power control sequence in the profile to correct for designated events (e.g., train load variations caused by fluctuating head winds and/or tail winds). Errors may be caused by an error in train parameters, such as, but not limited to, train mass and/or drag, when compared to assumptions in the optimized trip plan. Another type of error may occur with information contained in the track database 36. Another possible error may involve un-modeled performance differences due to the locomotive engine, traction motor thermal deration and/or other factors. Feedback control strategies compare the actual speed as a function of position to the speed in the desired optimal profile. Based on this difference, a correction to the optimal power profile is added to drive the actual velocity toward the optimal profile. To assure stable regulation, a compensation algorithm may be provided which filters the feedback speeds into power corrections to assure closed-performance stability is assured. Compensation may include standard dynamic compensation to meet performance objectives.

One or more embodiments may accommodate changes in trip objectives. In one embodiment, to determine the fuel-optimal trip from point A to point B where there are stops along the way, and for updating the trip for the remainder of the trip once the trip has begun, a sub-optimal decomposition method is usable for finding an optimal trip profile. Using modeling methods the computation method can determine the trip plan with a designated travel time and designated initial and final speeds, so as to satisfy all the speed limits and locomotive capability constraints when there are stops. Though the following discussion is directed toward improving fuel usage, it can also be applied to optimize other factors, such as, but not limited to, emissions, schedule, crew comfort, and load impact. The method may be used at the outset in developing a trip plan, and more importantly to adapting to changes in objectives after initiating a trip.

Figure 5:
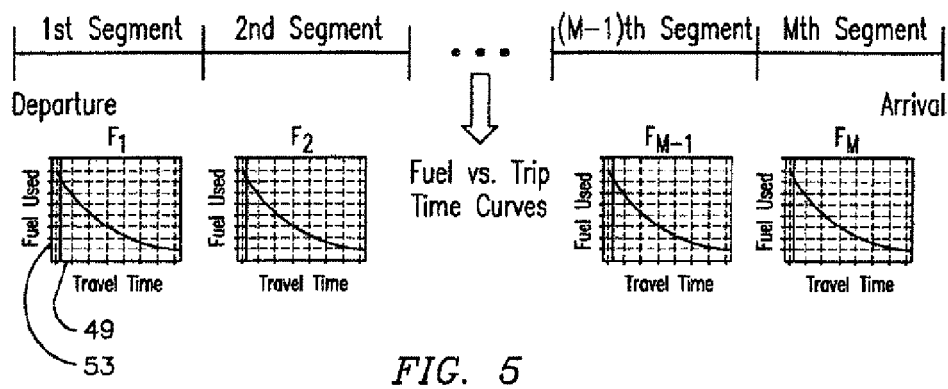
FIG. 5 depicts one embodiment of segmentation decomposition for trip planning.
Figure 6:
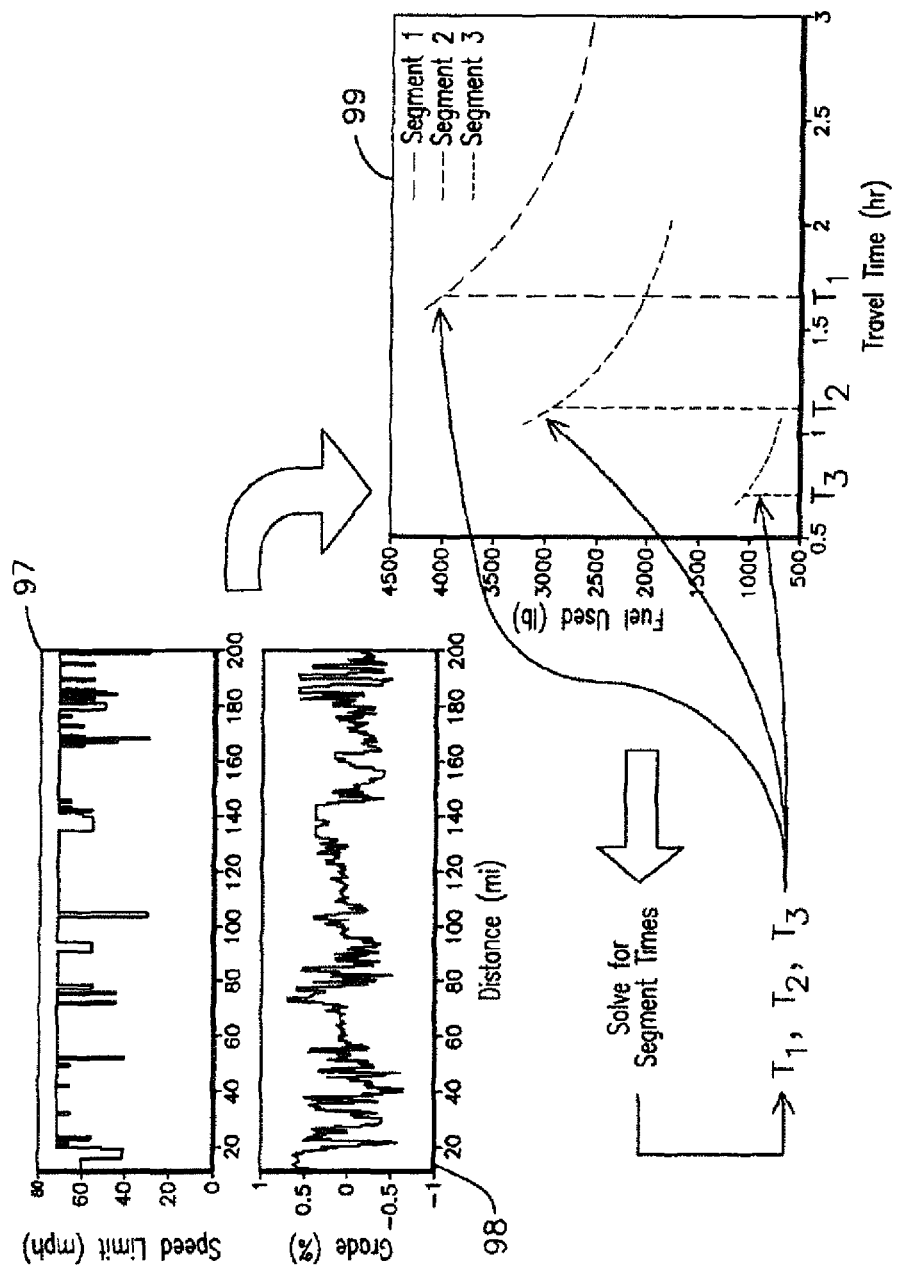
FIG. 6 depicts another embodiment of a segmentation decomposition for trip planning.

As discussed herein, embodiments may employ a setup as illustrated in the flowchart depicted in FIG. 5 and the three-segment example depicted in detail in FIG. 6. As illustrated, the trip may be broken into two or more segments, T1, T2, and T3. Though as discussed herein, it is possible to consider the trip as a single segment. As discussed herein, the segment boundaries may not result in equal segments. Instead, the segments may use natural or mission specific boundaries. Optimal trip plans may be pre-computed for each segment. If fuel use versus trip time is the trip object to be met, fuel versus trip time curves are built for each segment. As discussed herein, the curves may be based on other factors, wherein the factors are objectives to be met with a trip plan. When trip time is the parameter being determined, trip time for each segment is computed while satisfying the overall trip time constraints. FIG. 6 illustrates speed limits for the three-segment 200-mile (321.9 kilometers) trip 97. Further illustrated are grade changes over the 200-mile (321.9 kilometers) trip 98. A combined chart 99 illustrating curves for each segment of the trip of fuel used over the travel time is also shown.

Using the optimal control setup described previously, the present computation method can find the trip plan with specified travel time and initial and final speeds, so as to satisfy all the speed limits and locomotive capability constraints when there are stops. Though the following detailed discussion is directed toward optimizing fuel use, it can also be applied to optimize other factors as discussed herein, such as, but not limited to, emissions. One or more embodiments may accommodate desired dwell time at stops and consider constraints on earliest arrival and departure at a location as may be required, for example, in single-track operations where the time to arrive at or pass a siding is critical.

One or more embodiments may determine a fuel-optimal trip from distance $D_0$ to $D_M$, traveled in time T, with M−1 intermediate stops at $D_1, \ldots, D_{M-1}$, and with the arrival and departure times at these stops constrained by:

$$t_{min}(i) \leq t_{arr}(D_i) \leq t_{max}(i) - \Delta t_i \quad (10)$$

$$t_{arr}(D_i) + \Delta t_i \leq t_{dep}(D_i) \leq t_{max}(i) \quad i=1, \ldots, M-1 \quad (11)$$

where $t_{arr}(D_i)$, $t_{dep}(D_i)$, and $\Delta t_i$ are the arrival, departure, and minimum stop time at the $i^{th}$ stop, respectively. Assuming that fuel-optimality implies reducing stop time, therefore $t_{dep}(D_i) = t_{arr}(D_i) + \Delta t_i$ which eliminates the second inequality above. Suppose for each $i=1, \ldots, M$, the fuel-optimal trip from $D_{i-1}$ to $D_i$ for travel time t, $T_{min}(i) \leq t \leq T_{max}(i)$, is known. Let $F_i(t)$ be the fuel-use corresponding to this trip. If the travel time from $D_{j-1}$ to $D_j$ is denoted $T_j$, then the arrival time at $D_i$ is given by:

$$t_{arr}(D_i) = \sum_{j=1}^{i} (T_j + \Delta t_{j-1}) \quad (12)$$

where $\Delta t_0$ is defined to be zero. The fuel-optimal trip from $D_0$ to $D_M$ for travel time T is then obtained by finding $T_i$, $i=1, \ldots, M$, which minimize or reduce:

$$\sum_{i=1}^{M} F_i(T_i) T_{min}(i) \leq T_i \leq T_{max}(i) \quad (13)$$

subject to:

$$t_{min}(i) \leq \sum_{j=1}^{i} (T_j + \Delta t_{j-1}) \leq t_{max}(i) - \Delta t_i \quad (14)$$

$$i = 1, \ldots, M - 1$$

$$\sum_{j=1}^{M} (T_j + \Delta t_{j-1}) = T \quad (15)$$

Once a trip is underway, the fuel-optimal solution for the remainder of a trip (originally from $D_0$ to $D_M$ in time T) may be re-determined when disturbances preclude following the originally generated fuel-optimal solution. Let the current distance and speed be x and v, respectively, where $D_{i-1} < x \leq D_i$. Also, let the current time since the beginning of the trip be $t_{act}$. Then the fuel-optimal solution for the remainder of the trip from x to $D_M$, which retains the original arrival time at $D_M$, is obtained by finding $\tilde{T}_i$, $T_j$, $j=i+1, \ldots M$, which minimize:

$$\tilde{F}_i(\tilde{T}_i, x, v) + \sum_{j=i+1}^{M} F_j(T_j) \quad (16)$$

subject to:

$$t_{min}(i) \leq t_{act} + \tilde{T}_i \leq t_{max}(i) - \Delta t_i \quad (17)$$

$$t_{min}(k) \leq t_{act} + \tilde{T}_i + \sum_{j=i+1}^{k} (T_j + \Delta t_{j-1}) \leq t_{max}(k) - \Delta t_k \quad (18)$$

$$k = i + 1, \ldots, M - 1$$

$$t_{act} + \tilde{T}_i + \sum_{j=i+1}^{M} (T_j + \Delta t_{j-1}) = T \quad (19)$$

Here, $\tilde{F}_i(t,x,v)$ is the fuel-used of the optimal trip from x to $D_i$, traveled in time t, with initial speed at x of v.

As discussed above, one way to enable more efficient re-planning is to construct the optimal solution for a stop-to-stop trip from partitioned segments. For the trip from $D_{i-1}$ to $D_i$, with travel time $T_i$, choose a set of intermediate points $D_{ij}$, $j=1, \ldots, N_i-1$. Let $D_{i0}=D_{i-1}$ and $D_{iN_i}=D_i$. Then express the fuel-use for the optimal trip from $D_{i-1}$ to $D_i$ as:

$$F_i(t) = \sum_{j=1}^{N_i} f_{ij}(t_{ij} - t_{i,j-1}, v_{i,j-1}, v_{ij}) \quad (20)$$

where $f_{ij}(t,v_{i,j-1},v_{ij})$ is the fuel-use for the optimal trip from $D_{i,j-1}$ to $D_{ij}$, traveled in time t, with initial and final speeds of $v_{i,j-1}$ and $v_{ij}$. Furthermore, $t_{ij}$ is the time in the optimal trip corresponding to distance $D_{ij}$. By definition, $t_{iN_i} - t_{i0} = T_i$. Since the train is stopped at $D_{i0}$ and $D_{iN_i}$, $v_{i0} = v_{iN_i} = 0$.

The above expression enables the function $F_i(t)$ to be alternatively determined by first determining the functions $f_{ij}(\bullet)$, $1 \leq j \leq N_i$, then finding $\tau_{ij}$, $1 \leq j \leq N_i$ and $v_{ij}$, $1 \leq j < N_i$, which minimize:

$$F_i(t) = \sum_{j=1}^{N_i} f_{ij}(\tau_{ij}, v_{i,j-1}, v_{ij}) \quad (21)$$

subject to:

$$\sum_{j=1}^{N_i} \tau_{ij} = T_i \quad (22)$$

$$v_{min} = (i, j) \leq v_{ij} \leq v_{max}(i, j) \quad (23)$$

$$j = 1, \ldots, N_i - 1$$

$$v_{i0} = v_{iN_i} \quad (24)$$

$$= 0$$

By choosing $D_{ij}$ (e.g., at speed restrictions or meeting points), $v_{max}(i,j) - v_{min}(i,j)$ can be reduced, thus reducing the domain over which $f_{ij}(\,)$ needs to be known.

Based on the partitioning above, a simpler suboptimal re-planning approach than that described above is to restrict re-planning to times when the train is at distance points $D_{ij}$, $1 \leq i \leq M$, $1 \leq j \leq N_i$. At point $D_{ij}$, the new optimal trip from $D_{ij}$ to $D_M$ can be determined by finding $\tau_{ik}$, $j < k \leq N_i$, $v_{ik}$, $j < k < N_i$, and $\tau_{mn}$, $i < m \leq M$, $1 \leq n < N_m$, $v_{mn}$, $i < m \leq M$, $1 \leq n < N_m$, which minimize or reduce:

$$\sum_{k=j+1}^{N_i} f_{ik}(\tau_{ik}, v_{i,k-1}, v_{ik}) + \sum_{m=i+1}^{M} \sum_{n=1}^{N_m} f_{mn}(\tau_{mn}, v_{m,n-1}, v_{mn}) \quad (25)$$

subject to:

$$t_{min}(i) \le t_{act} + \sum_{k=j+1}^{N_i} \tau_{ik} \le t_{max}(i) - \Delta t_i \quad (26)$$

$$t_{min}(n) \le t_{act} + \sum_{k=j+1}^{N_i} \tau_{ik} + \sum_{m=i+1}^{n} (T_m + \Delta t_{m-1}) \le t_{max}(n) - \Delta t_n \quad (27)$$

$$n = i+1, \ldots, M-1$$

$$t_{act} + \sum_{k=j+1}^{N_i} \tau_{ik} + \sum_{m=i+1}^{M} (T_m + \Delta t_{m-1}) = T \quad (28)$$

where:

$$T_m = \sum_{n=1}^{N_m} \tau_{mn} \quad (29)$$

A further simplification is obtained by waiting on the re-computation of $T_m$, $i<m\le M$, until distance point $D_i$ is reached. In this way, at points $D_{ij}$ between $D_{i-1}$ and $D_i$, the minimization above needs only be performed over $\tau_{ik}$, $j<k\le N_i$, $v_{ik}$, $j<k<N_i$. $T_i$ is increased as needed to accommodate any longer actual travel time from $D_{i-1}$ to $D_{ij}$ than planned. This increase is later compensated, if possible, by the re-computation of $T_m$, $i<m\le M$, at distance point D.

With respect to the closed-loop configuration disclosed above, the total input energy that moves a train 31 from point A to point B may include the sum of four components, e.g., a difference in kinetic energy between points A and B; a difference in potential energy between points A and B; an energy loss due to friction and other drag losses; and an energy dissipated by the application of brakes. Assuming the start and end speeds to be equal (e.g., stationary), the first component is zero. Furthermore, the second component is independent of driving strategy. Thus, it may be desirable to reduce the sum of the last two components.

Following a constant speed profile may reduce drag loss. Following a constant speed profile also may reduce a total energy input when braking is not needed to maintain constant speed. However, if braking is required to maintain constant speed, applying braking just to maintain constant speed will most likely increase total required energy because of the need to replenish the energy dissipated by the brakes. A possibility exists that some braking may actually reduce total energy usage if the additional brake loss is more than offset by the resultant decrease in drag loss caused by braking, by reducing speed variation.

After completing a re-plan from the collection of events described above, a new optimal notch/speed plan can be followed using the closed loop control described herein. However, in some situations there may not be enough time to carry out the segment decomposed planning described above, and particularly when there are critical speed restrictions that must be respected, an alternative is needed. One or more embodiments may accomplish this with an algorithm referred to as "smart cruise control". The smart cruise control algorithm is an efficient way to generate, on the fly, an energy-efficient (hence fuel-efficient) sub-optimal prescription for driving the train 31 over a known terrain. This algorithm assumes knowledge of the position of the train 31 along the track 34 at all times, as well as knowledge of the grade and curvature of the track versus position. The method relies on a point-mass model for the motion of the train 31, whose parameters may be adaptively estimated from online measurements of train motion as described earlier.

The smart cruise control algorithm has three principal components, specifically a modified speed limit profile that serves as an energy-efficient (and/or emissions efficient or any other objective function) guide around speed limit reductions; an ideal throttle or dynamic brake setting profile that attempts to balance between reducing speed variation and braking; and a mechanism for combining the latter two components to produce a notch command, employing a speed feedback loop to compensate for mismatches of modeled parameters when compared to reality parameters. Smart cruise control can accommodate strategies that do not include active braking (i.e. the driver is signaled and assumed to provide the requisite braking) or a variant that does include active braking.

With respect to the cruise control algorithm that does not control dynamic braking, the three components are a modified speed limit profile that serves as an energy-efficient guide around speed limit reductions, a notification signal directed to notify the operator when braking should be applied, an ideal throttle profile that attempts to balance between reducing speed variations and notifying the operator to apply braking, a mechanism employing a feedback loop to compensate for mismatches of model parameters to reality parameters.

One or more embodiments may identify key parameter values of the train 31. For example, with respect to estimating train mass, a Kalman filter and a recursive least-squares approach may be utilized to detect errors that may develop over time.

Figure 7:
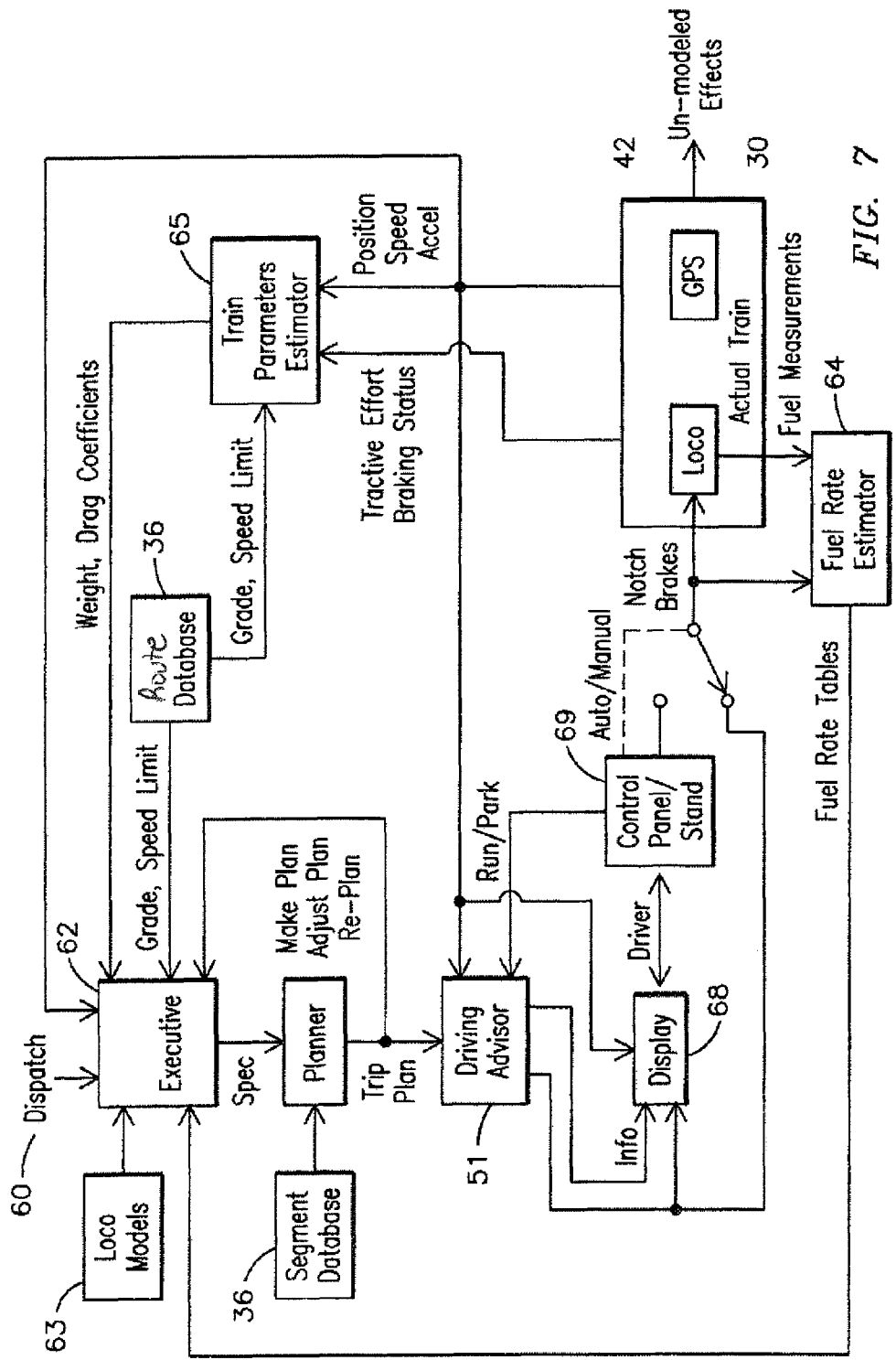
FIG. 7 depicts another flowchart of a method for trip optimization.

FIG. 7 depicts a flowchart. As discussed previously, a remote facility, such as a dispatch 60 can provide information. As illustrated, such information is provided to an executive control element 62. Also supplied to the executive control element 62 is locomotive modeling information database 63, information from a track database 36 such as, but not limited to, track grade information and speed limit information, estimated train parameters such as, but not limited to, train weight and drag coefficients, and fuel rate tables from a fuel rate estimator 64. The executive control element 62 supplies information to the planner 12, which is disclosed in more detail in FIG. 1. Once a trip plan has been calculated, the plan is supplied to a driving advisor, driver or controller element 51. The trip plan is also supplied to the executive control element 62 so that it can compare the trip when other new data is provided.

As discussed above, the driving advisor 51 can automatically set a notch power, either a pre-established notch setting or an optimum continuous notch power. In addition to supplying a speed command to the locomotive 42, a display 68 is provided so that the operator can view what the planner has recommended. The operator also has access to a control panel 69. Through the control panel 69 the operator can decide whether to apply the notch power recommended. Toward this end, the operator may limit a targeted or recommended power. That is, at any time the operator always has final authority over what power setting the locomotive consist will operate at. This includes deciding whether to apply braking if the trip plan recommends slowing the train 31. For example, if operating in dark territory, or where information from wayside equipment cannot electronically transmit information to a train and instead the operator views visual signals from the wayside equipment, the operator inputs commands based on information contained in track database and visual signals from the wayside equipment. Based on how the train 31 is functioning, information regarding fuel measurement is supplied to the fuel rate estimator 64. Since direct measurement of fuel flows is not typically available in a locomotive consist, all information on fuel consumed so far within a trip and projections into the future following optimal plans is carried out using calibrated physics models such as those used in developing the optimal plans. For example, such predictions may include but are not limited to, the use of measured gross horse-power and known fuel characteristics and emissions characteristics to derive the cumulative fuel used and emissions generated.

The train 31 also has a locator device 30 such as a GPS sensor, as discussed above. Information is supplied to the train parameters estimator 65. Such information may include, but is not limited to, GPS sensor data, tractive/braking effort data, braking status data, speed and any changes in speed data. With information regarding grade and speed limit information, train weight and drag coefficients information is supplied to the executive control element 62.

One or more embodiments may also allow continuously variable power throughout the optimization planning and closed loop control implementation. In a conventional locomotive, power is typically quantized to eight discrete levels. Modern locomotives can realize continuous variation in horsepower which may be incorporated into the previously described optimization methods. With continuous power, the locomotive 42 can further optimize operating conditions, e.g., by reducing auxiliary loads and power transmission losses, and fine tuning engine horsepower regions of optimum efficiency, or to points of increased emissions margins. Example include, but are not limited to, reducing cooling system losses, adjusting alternator voltages, adjusting engine speeds, and reducing number of powered axles. Further, the locomotive 42 may use the on-board track database 36 and the forecasted performance requirements to reduce auxiliary loads and power transmission losses to provide optimum efficiency for the target fuel consumption/emissions. Examples include, but are not limited to, reducing a number of powered axles on flat terrain and pre-cooling the locomotive engine prior to entering a tunnel.

One or more embodiments may also use the on-board track database 36 and the forecasted performance to adjust the locomotive performance, such as to insure that the train has sufficient speed as it approaches a hill and/or tunnel. For example, this could be expressed as a speed constraint at a particular location that becomes part of the optimal plan generation created solving the equation (OP). Additionally, one or more embodiments may incorporate train-handling rules, such as, but not limited to, tractive effort ramp rates, maximum braking effort ramp rates. These may be incorporated directly into the formulation for optimum trip profile or alternatively incorporated into the closed loop regulator used to control power application to achieve the target speed.

One embodiment may only be installed on a lead locomotive of the train consist. Even though embodiments are not dependant on data or interactions with other locomotives, it may be integrated with a consist manager, as disclosed in U.S. Pat. No. 6,691,957 and U.S. Pat. No. 7,021,588 (owned by the Assignee and both incorporated by reference), functionality and/or a consist optimizer functionality to improve efficiency. Interaction with multiple trains is not precluded as illustrated by the example of dispatch arbitrating two "independently optimized" trains described herein.

Trains with distributed power systems can be operated in different modes. One mode is where all locomotives in the train operate at the same notch command. So if the lead locomotive is commanding motoring-N8, all units in the train will be commanded to generate motoring-N8 power. Another mode of operation is "independent" control. In this mode, locomotives or sets of locomotives (e.g., locomotive consists) distributed throughout the train can be operated at different motoring or braking powers. For example, as a train crests a mountaintop, the lead locomotives (or lead locomotive consist) on the down slope of mountain may be placed in braking, while the locomotives in the middle or at the end of the train (or remote locomotive consist(s)) on the up slope of mountain may be in motoring. This may be done to reduce tensile forces on the mechanical couplers that connect the railcars and locomotives. Traditionally, operating the distributed power system in "independent" mode required the operator to manually command each remote locomotive or set of locomotives via a display in the lead locomotive. Using the physics based planning model, train set-up information, on-board track database, on-board operating rules, location determination system, real-time closed loop power/brake control, and sensor feedback, the system shall automatically operate the distributed power system in "independent" mode.

When operating in distributed power, the operator in a lead locomotive can control operating functions of remote locomotives in the remote consists via a control system, such as a distributed power control element. Thus when operating in distributed power, the operator can command each locomotive consist to operate at a different notch power level (or one consist could be in motoring and other could be in braking) wherein each individual locomotive in the locomotive consist operates at the same notch power. In one embodiment, when a notch power level for a remote locomotive consist is desired as recommended by the trip plan, the embodiment will communicate this power setting to the remote locomotive consists for implementation. As discussed below, the same is true regarding braking.

One or more embodiments may be used with consists in which the locomotives are not contiguous, e.g., with 1 or more locomotives up front, others in the middle and at the rear for train. Such configurations are called distributed power wherein the standard connection between the locomotives is replaced by radio link or auxiliary cable to link the locomotives externally. When operating in distributed power, the operator in a lead locomotive can control operating functions of remote locomotives in the consist via a control system, such as a distributed power control element. In particular, when operating in distributed power, the operator can command each locomotive consist to operate at a different notch power level (or one consist could be in motoring and other could be in braking) wherein each individual in the locomotive consist operates at the same notch power.

In one embodiment, when a notch power level for a remote locomotive consist is desired as recommended by the optimized trip plan, one or more embodiments will communicate this power setting to the remote locomotive consists for implementation. As discussed below, the same is true regarding braking. When operating with distributed power, the optimization problem previously described can be enhanced to allow additional degrees of freedom, in that each of the remote units can be independently controlled from the lead unit. The value of this is that additional objectives or constraints relating to in-train forces may be incorporated into the performance function, assuming the model to reflect the in-train forces is also included. Thus, one or more embodiments may include the use of multiple throttle controls to better manage in-train forces as well as fuel consumption and emissions.

In a train utilizing a consist manager, the lead locomotive in a locomotive consist may operate at a different notch power setting than other locomotives in that consist. The other locomotives in the consist operate at the same notch power setting. One or more embodiments may be utilized in conjunction with the consist manager to command notch power settings for the locomotives in the consist. Since the consist manager divides a locomotive consist into two groups, lead locomotive and trail units, the lead locomotive may be commanded to operate at a designated notch power and the trail locomotives may be commanded to operate at another designated notch power. In one embodiment the distributed power control element may be the system and/or apparatus where this operation is housed.

Likewise, when a consist optimizer is used with a locomotive consist, one or more embodiments can be used in conjunction with the consist optimizer to determine notch power for each locomotive in the locomotive consist. For example, suppose that a trip plan recommends a notch power setting of 4 for the locomotive consist. Based on the location of the train, the consist optimizer will take this information and then determine the notch power setting for each locomotive in the consist. In this implementation, the efficiency of setting notch power settings over intra-train communication channels is improved. Furthermore, as discussed above, implementation of this configuration may be performed utilizing the distributed control system.

Furthermore, as discussed previously, one or more embodiments may be used for continuous corrections and re-planning with respect to when the train consist uses braking based on upcoming items of interest, such as, but not limited to, railroad crossings, grade changes, approaching sidings, approaching depot yards, and approaching fuel stations where each locomotive in the consist may require a different braking option. For example, if the train is coming over a hill, the lead locomotive may have to enter a braking condition whereas the remote locomotives, having not reached the peak of the hill may have to remain in a motoring state.

Figure 8:
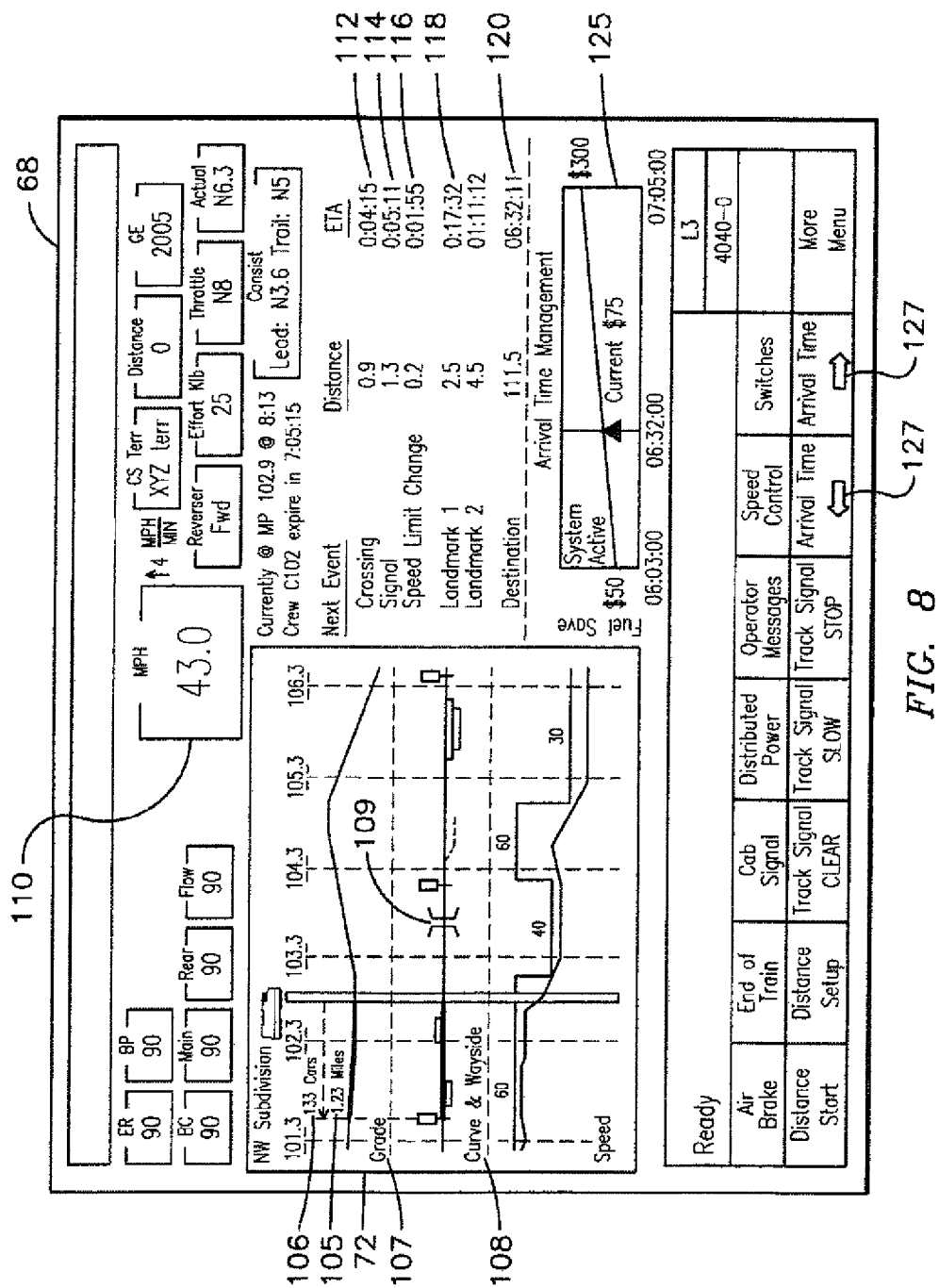
FIG. 8 illustrates a dynamic display for use by an operator.
Figure 9:
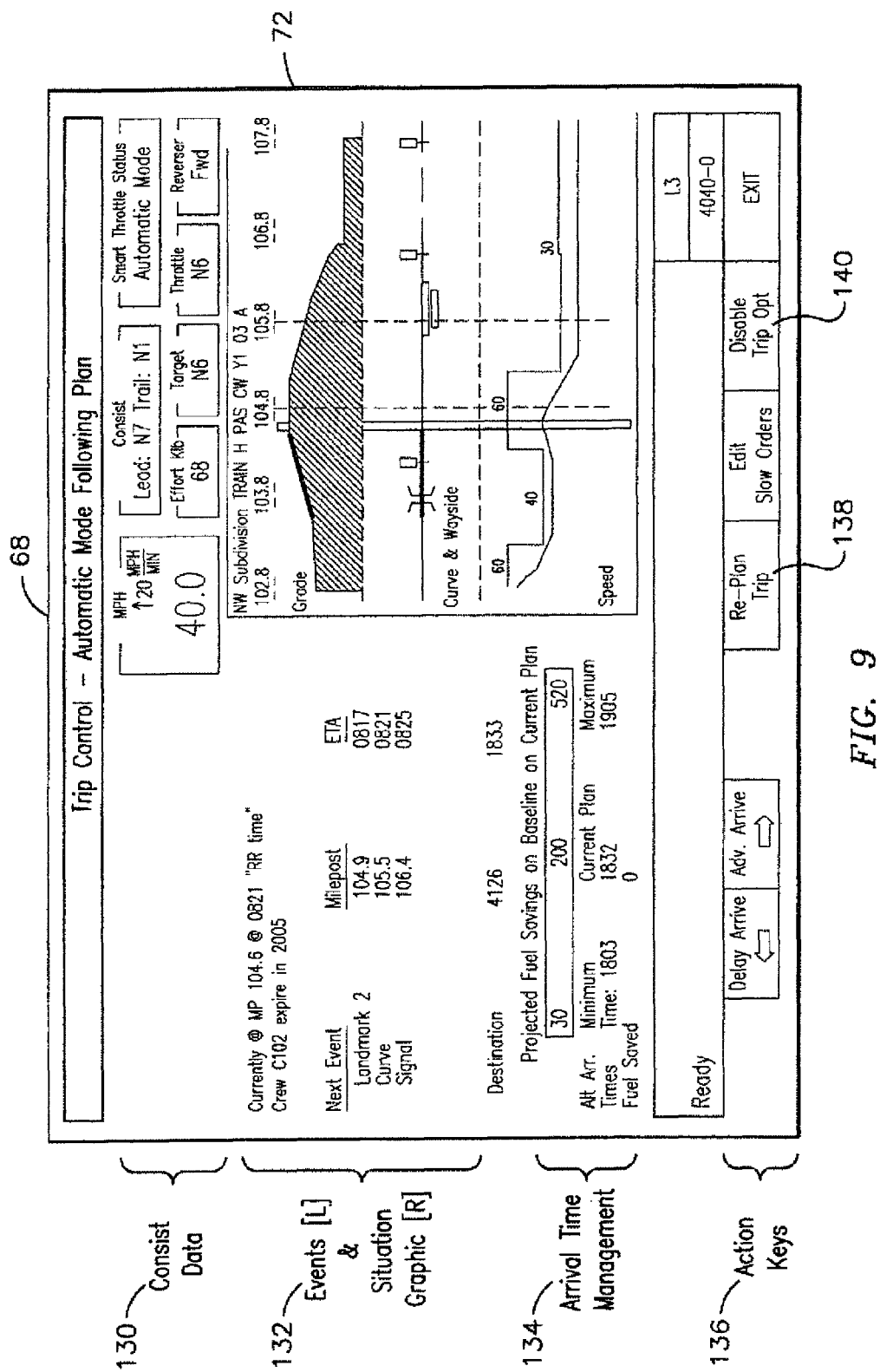
FIG. 9 illustrates a dynamic display for use by the operator.
Figure 10:
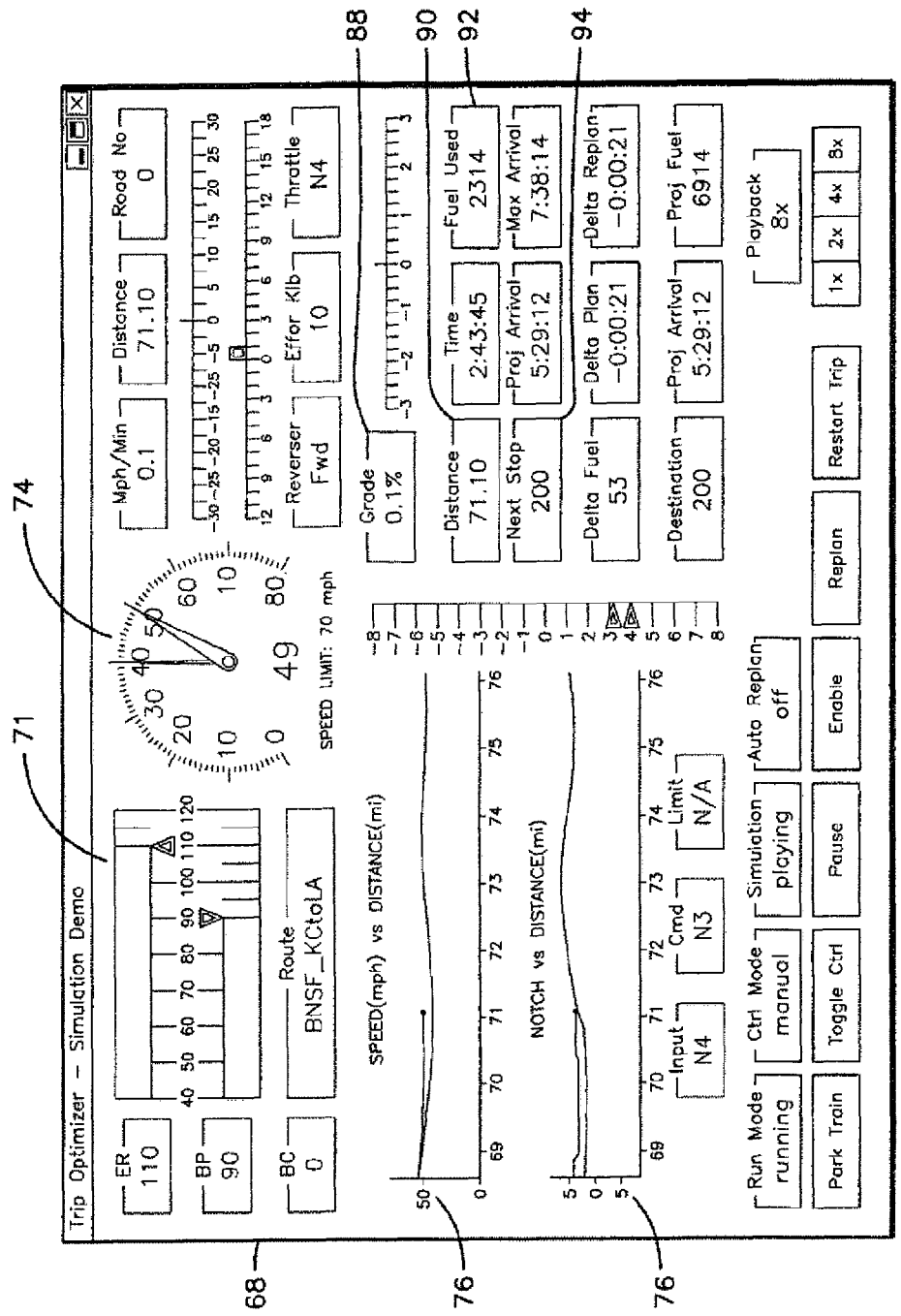
FIG. 10 depicts another illustration of a dynamic display for use by the operator.

FIGS. 8, 9 and 10 depict illustrations of dynamic displays for use by the operator. As provided, FIG. 8, a trip profile is provided 72. Within the profile a location 73 of the locomotive is provided. Such information as train length 105 and the number of cars 106 in the train is provided. Elements are also provided regarding track grade 107, curve and wayside elements 108, including bridge location 109, and train speed 110. The display 68 allows the operator to view such information and also see where the train is along the route. Information pertaining to distance and/or estimate time of arrival to such locations as crossings 112, signals 114, speed changes 116, landmarks 118, and destinations 120 is provided. An arrival time management tool 125 is also provided to allow the user to determine the fuel savings that is being realized during the trip. The operator has the ability to vary arrival times 127 and witness how this affects the fuel savings. Fuel saving is an example of only one objective that can be reviewed with a management tool. Toward this end, depending on the parameter being viewed, other parameters, discussed herein can be viewed and evaluated with a management tool that is visible to the operator. The operator is also provided information about how long the crew has been operating the train. Time and distance information may either be illustrated as the time and/or distance until a particular event and/or location. Displays may provide a total elapsed time.

As illustrated in FIG. 9 a display provides information about consist data 130, an events and situation graphic 132, an arrival time management tool 134, and action keys 136. Similar information as discussed above is provided in this display as well. This display 68 also provides action keys 138 to allow the operator to re-plan as well as to disengage 140 the trip optimizer.

FIG. 10 depicts another embodiment of the display. Data typical of a modern locomotive including air-brake status 72, analog speedometer with digital insert, and/or indicator, 74, and information about tractive effort in pounds force (or traction amps for DC locomotives) is visible. An indicator 74 is provided to show the current optimal speed in the plan being executed as well as an accelerometer graphic to supplement the readout in mph/minute. Important new data for optimal plan execution is in the center of the screen, including a rolling strip graphic 76 with optimal speed and notch setting versus distance compared to the current history of these variables. In this embodiment, location of the train is derived using the locator element. As illustrated, the location is provided by identifying how far the train is away from its final destination, an absolute position, an initial destination, an intermediate point, and/or an operator input.

The strip chart provides a look-ahead to changes in speed required to follow the optimal plan, which is useful in manual control, and monitors plan versus actual during automatic control. As discussed herein, such as when in the coaching mode, the operator can either follow or not follow the suggested notch or speed. The vertical bar gives a graphic of desired and actual notch, which are also displayed digitally below the strip chart. When continuous notch power is utilized, as discussed above, the display will simply round to closest discrete equivalent, the display may be an analog display so that an analog equivalent or a percentage or actual horse power/tractive effort is displayed.

Critical information on trip status is displayed on the screen, and shows the current grade the train is encountering 88, either by the lead locomotive, a location elsewhere along the train or an average over the train length. A distance traveled so far in the plan 90, cumulative fuel used 92, where or the distance away the next stop is planned 94, current and projected arrival time 96 expected time to be at next stop are also disclosed. The display 68 also shows the maximum possible time to destination possible with the computed plans available. If a later arrival was required, a re-plan would be carried out. Delta plan data shows status for fuel and schedule ahead or behind the current optimal plan. Negative numbers mean less fuel or early compared to plan, positive numbers mean more fuel or late compared to plan, and typically trade-off in opposite directions (slowing down to save fuel makes the train late and conversely).

At all times these displays 68 gives the operator a snapshot of where he stands with respect to the currently instituted driving plan. This display is for illustrative purpose only as there are many other ways of displaying/conveying this information to the operator and/or dispatch. Toward this end, the information disclosed above could be intermixed to provide a display different than the ones disclosed.

Other features that may be included in various embodiments include, but are not limited to, allowing for the generating of data logs and reports. This information may be stored on the train and downloaded to an off-board system at some point in time. The downloads may occur via manual and/or wireless transmission. This information may also be viewable by the operator via the locomotive display. The data may include such information as, but not limited to, operator inputs, time system is operational, fuel saved, fuel imbalance across locomotives in the train, train journey off course, system diagnostic issues such as if GPS sensor is malfunctioning.

Since trip plans may also take into consideration allowable crew operation time, various embodiments may take such information into consideration as a trip is planned. For example, if the maximum time a crew may operate is eight hours, then the trip shall be fashioned to include stopping location for a new crew to take the place of the present crew. Such specified stopping locations may include, but are not limited to rail yards, meet/pass locations, etc. If, as the trip progresses, the trip time may be exceeded, embodiments may be overridden by the operator to meet criteria as determined by the operator. Ultimately, regardless of the operating conditions of the train, such as, but not limited to, high load, low speed, train stretch conditions, etc., the operator remains in control to command a speed and/or operating condition of the train.

Using one or more embodiments, the train may operate in a plurality of operations. In one operational concept, the train may provide commands for commanding propulsion, dynamic braking. The operator then handles all other train functions. In another operational concept, the train may provide commands for commanding propulsion only. The operator then handles dynamic braking and all other train functions. In yet another operational concept, one embodiment may provide commands for commanding propulsion, dynamic braking and application of the airbrake. The operator then handles all other train functions.

One or more embodiments may also notify the operator of upcoming items of interest or actions to be taken. Specifically, the forecasting logic described herein, the continuous corrections and re-planning to the optimized trip plan, the track database, may be used to notify the operator of upcoming crossings, signals, grade changes, brake actions, sidings, rail yards, fuel stations, etc. This notification may occur audibly and/or through the operator interface.

Specifically using the physics based planning model, train set-up information, on-board track database, on-board operating rules, location determination system, real-time closed loop power/brake control, and sensor feedback, the system shall present and/or notify the operator of required or suggested actions. The notification can be visual and/or audible. Examples include notifying of crossings that require the operator activate the locomotive horn and/or bell, notifying of "silent" crossings that do not require the operator activate the locomotive horn or bell.

In another embodiment, using the physics based planning model discussed above, train set-up information, on-board track database, on-board operating rules, location determination system, real-time closed power/brake control, and sensor feedback, embodiments may present the operator information (e.g. a gauge on display) that allows the operator to identify when the train will arrive at various locations as illustrated in FIG. 9. The system shall allow the operator to adjust the trip plan (target arrival time). This information (actual estimated arrival time or information needed to derive off-board) can also be communicated to the dispatch center to allow the dispatcher or dispatch system to adjust the target arrival times. This allows the system to quickly adjust and optimize for the appropriate target function (for example trading off speed and fuel usage).

Figure 11:
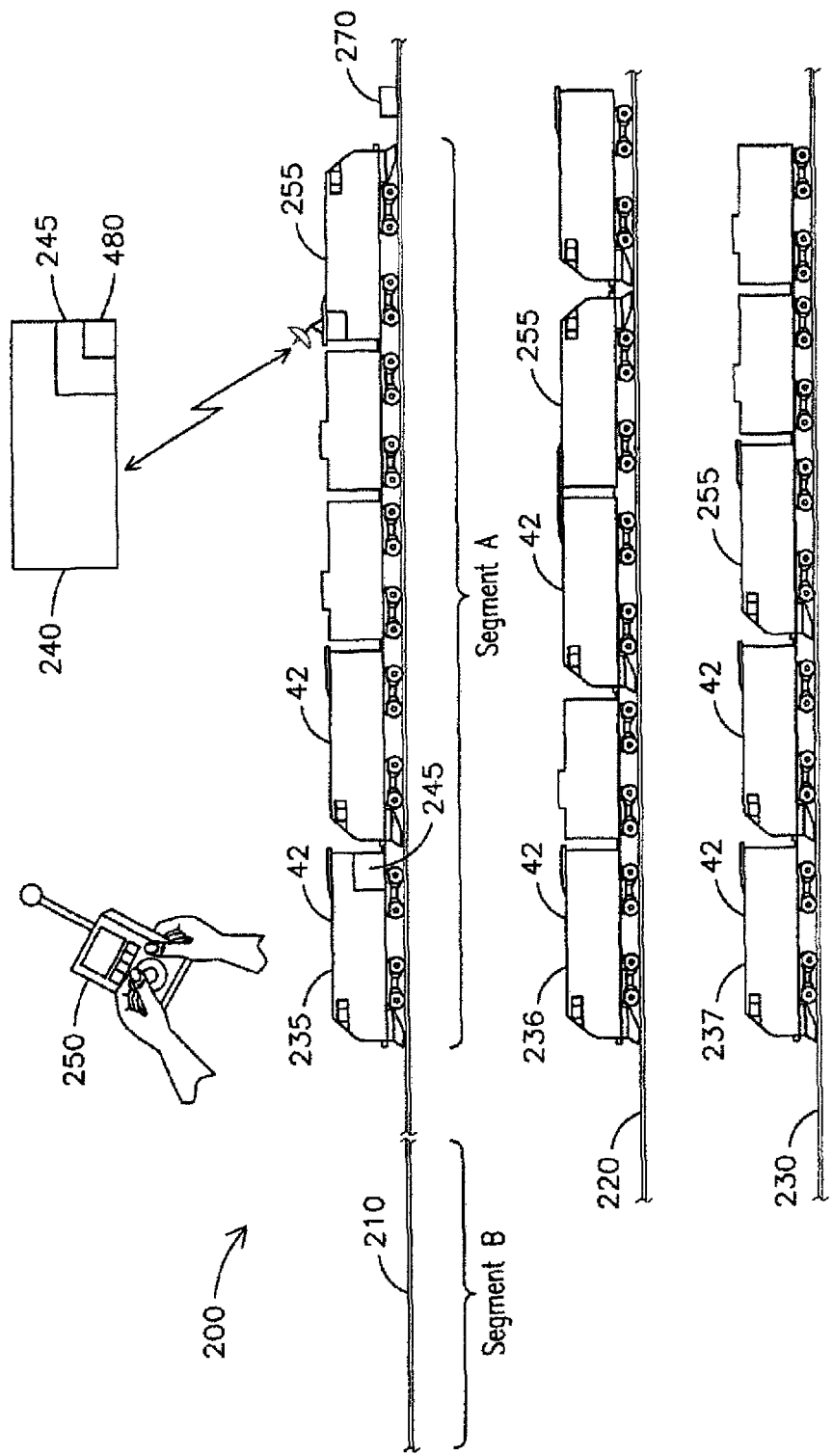
FIG. 11 depicts one embodiment of a network of routes with multiple vehicles.

FIG. 11 depicts one embodiment of a network of railway tracks with multiple trains. In the railroad network 200, it is desirable to obtain an optimized fuel efficiency and time of arrival for the overall network of multiple interacting tracks 210, 220, 230, and trains 235, 236, 237. As illustrated multiple tracks 210, 220, 230 are shown with a train 235, 236, 237 on each respective track. Though locomotive consists 42 are illustrated as part of the trains 235, 236, 237, the trains may only have a single locomotive consist having a single locomotive. As disclosed herein, a remote facility 240 may also be involved with improving fuel efficiency and reducing emissions of a train through optimized train power makeup. This may be accomplished with a processor 245, such as a computer, located at the remote facility 240. In another embodiment a hand-held device 250 may be used to facilitate improving fuel efficiency of the train 235, 236, 237 through optimized train power makeup. Typically in either of these approaches, configuring the train 235, 236, 237 usually occurs at a hump, or rail, yard, more specifically when the train is being compiled.

However as discussed below, the processor 245 may be located on the train 235, 236, 237 or aboard another train wherein train setup may be accomplished using inputs from the other train. For example, if a train has recently completed a mission over the same tracks, input from that train's mission may be supplied to the current train as it either is performing and/or is about to begin its mission. Thus configuring the train may occur at train run time, and even during the run time. For example, real time configuration data may be utilized to configure the train locomotives. One such example is provided above with respect to using data from another train. Another example entails using other data associated with trip optimization of the train as discussed above. Additionally the train setup may be performed using input from a plurality of sources, such as, but not limited to, a dispatch system, a wayside system 270, an operator, an off-line real time system, an external setup, a distributed network, a local network, and/or a centralized network.

Figure 12:
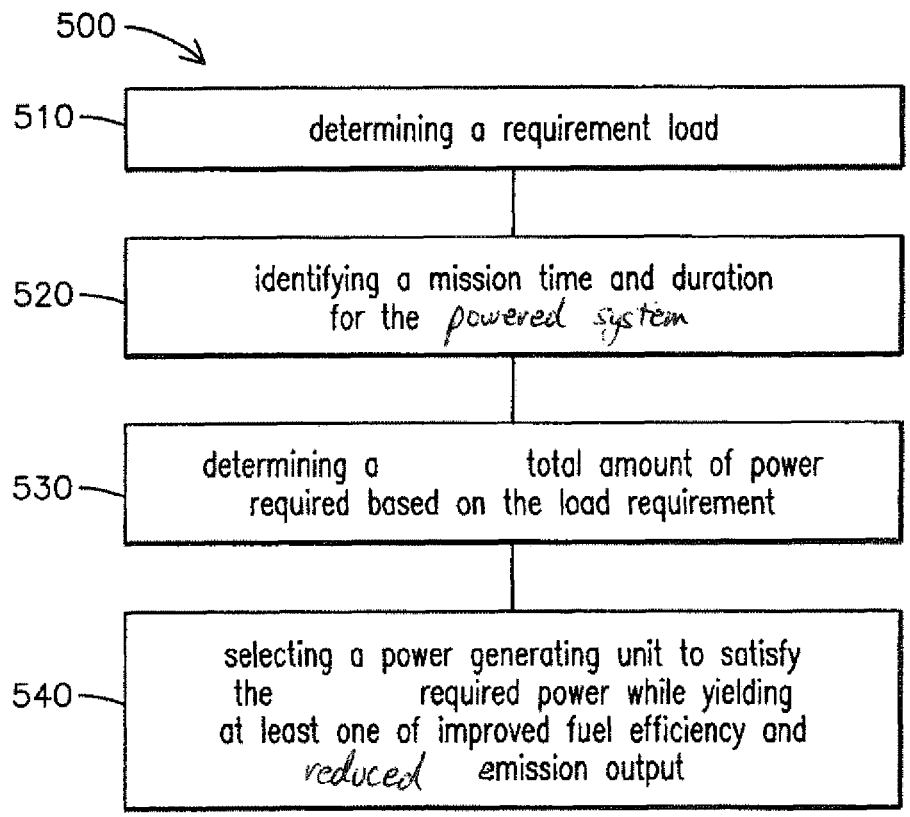
FIG. 12 depicts one embodiment of a flowchart of a method for improving fuel efficiency of a train.

FIG. 12 depicts one embodiment of a flowchart for improving fuel efficiency and reducing emission output through optimized train power makeup. As disclosed above, to reduce fuel use and emissions while preserving time arrival, acceleration and matched breaking may be reduced. Undesired emissions may also be reduced by powering a minimal set of locomotives. For example, in a train with several locomotives or locomotive consists, powering a minimal set of locomotives at a higher power setting while putting the remaining locomotives into idle, unpowered standby, or an automatic engine start-stop ("AESS") mode as discussed below, will reduce emissions. This is due, in part, because at lower power setting such as notch 1-3, exhaust emissions after-treatment devices (e.g., catalytic converters) located on the locomotives are at a temperature below which these systems' operations are optimal. Therefore, using the minimum number of locomotives or locomotive consists to make the mission on time, operating at high power settings will allow for the exhaust emission treatment devices to operate at optimal temperatures thus further reducing emissions.

Figure 13:
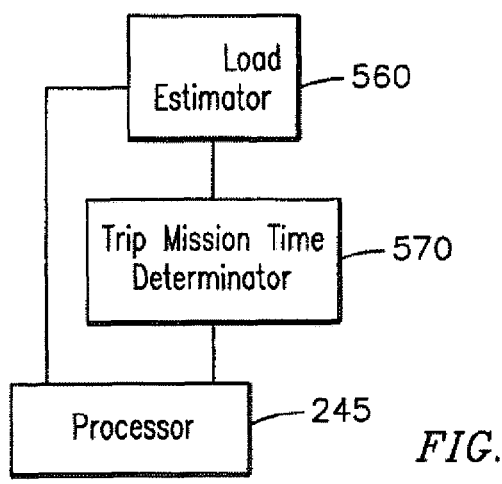
FIG. 13 depicts a block diagram of elements included in a system for improved train power makeup.

The flowchart 500 provides for determining a train load, at 510. When the engine is used in other applications, the load is determined based on the engine configuration. The train load may be determined with a load, or train load, estimator 560, as illustrated in FIG. 13. In one embodiment the train load is estimated based on information obtained as disclosed in a train makeup docket 480, as illustrated in FIG. 11. For example, the train makeup docket 480 may be contained in the computer 245 (illustrated in FIGS. 11 & 13) wherein the processor 245 makes the estimation, or may be on paper wherein an operator makes the estimation. The train makeup docket 480 may include such information as, but not limited to, number of cars, weight of the cars, content of the cars, age of cars, etc. In another embodiment the train load is estimated using historical data, such as, but not limited to, prior train missions making the same trip, similar train car configurations, etc. As discussed above, using historical data may be accomplished with a processor or manually. In yet another embodiment, the train load is estimated using a rule of thumb or table data. For example, the operator configuring the train 235, 236, 237 may determine the train load required based on established guideline such as, but not limited to, a number of cars in the train, types of cars in the train, weight of the cars in the train, an amount of products being transported by the train, etc. This same rule of thumb determination may also be accomplished using the processor 245.

Identifying a mission time and/or duration for the diesel power system, at 520, is disclosed. With respect to engines used in other applications, identifying a mission time and/or duration for the diesel power system may be equated to defining the mission time which the engine configuration is expected to accomplish the mission. A determination is made about a minimum total amount of power required based on the train load, at 530. The locomotive is selected to satisfy the minimum required power while yielding improved fuel efficiency and/or reduced emission output, at 540. The locomotive may be selected based on a type of locomotive (based on its engine) needed and/or a number of locomotives (based on a number of engines) needed. Similarly, with respect to diesel engines used in other power applications, such as, but not limited to, marine, OHV, and stationary power stations, where multiple units of each are used to accomplish an intended mission unique for the specific application.

Toward this end, a trip mission time determinator 570, as illustrated in FIG. 13, may be used to determine the mission time. Such information that may be used includes, but not limited to, weather conditions, track conditions, etc. The locomotive makeup may be based on types of locomotives needed, such as based on power output, and/or a minimum number of locomotives needed. For example, based on the available locomotives, a selection is made of those locomotives that just meet the total power required. Toward this end, as an example, if ten locomotives are available, a determination of the power output from each locomotive is made. Based on this information, the fewest number and type of locomotives needed to meet the total power requirements are selected. For example the locomotives may have different horse power (HP) ratings or starting Tractive Effort (TE) ratings. In addition to the total power required, the distribution of power and type of power in the train can be determined. For example on heavy trains to limit the maximum coupler forces, the locomotives may be distributed within the train. Another consideration is the capability of the locomotive. It may be possible to put 4 DC locomotives on the head end of a train, however 4 AC units with the same HP may not be used at the headend since the total drawbar forces may exceed the limits.

In another embodiment, the selection of locomotives may not be based solely on reducing a number of locomotives used in a train. For example, if the total power requirement is minimally met by five of the available locomotives when compared to also meeting the power requirement by the use of three of the available locomotives, the five locomotives are used instead of the three. In view of these options, a smaller or minimum number of locomotives may be selected from a sequential (and random) set of available locomotives. Such an approach may be used when the train 235, 236, 237 is already compiled and a decision is being made at run time and/or during a mission wherein the remaining locomotives are not used to power the train 235, 236, 237, as discussed in further detail below.

While compiling the train 235, 236, 237, if the train 235, 236, 237 requires backup power, incremental locomotive 255, or locomotives, may be added. However this additional locomotive 255 is isolated to reduce fuel use, emission output, and power variation, but may be used to provide backup power in case an operating locomotive fails, and/or to provide additional power to accomplish the trip within an established mission time. The isolated locomotive 255 may be put into an AESS mode to reduce fuel use and having the locomotive available when needed. In one embodiment, if a backup, or isolated, locomotive 255 is provided, its dimensions, such as weight, may be taken into consideration when determining the train load.

Thus, as discussed above in more detail, determining minimum power needed to power the train 235, 236, 237 may occur at train run time and/or during a run (or mission). In this instance once a determination is made as to optimized train power and the locomotives or locomotive consists 42 in the train 235, 236, 237 are identified to provide the requisite power needed, the additional locomotive(s) 255 not identified for use are put in the idle, or AESS, mode.

In one embodiment, the total mission run may be broken into a plurality of sections, or segments, such as, but not limited to, at least 2 segments, such as segment A and segment B as illustrated in FIG. 11. Based on the amount of time taken to complete any segment the backup power, provided by the isolated locomotive 255, is provided in case incremental power is needed to meet the trip mission objective. Toward this end, the isolated locomotive 255 may be utilized for a specific trip segment to get the train 235, 236, 237 back on schedule and then switched off for the following segments, if the train 235, 236, 237 remains on schedule.

Thus in operation, the lead locomotive may put the locomotive 255 provided for incremental power into an isolate mode until the power is needed. This may be accomplished by use of wired or wireless modems or communications from the operator, usually on the lead locomotive, to the isolated locomotive 255. In another embodiment, the locomotives operate in a distributed power configuration and the isolated locomotive 255 is already integrated in the distributed power configuration, but is idle, and is switched on when the additional power is required. In yet another embodiment the operator puts the isolated locomotive 255 into the appropriate mode.

In one embodiment the initial setup of the locomotives, based on train load and mission time, is updated by the trip optimizer, as disclosed in above, and adjustments to the number and type of powered locomotives are made. As one illustration, consider a locomotive consist 42 of 3 locomotives having relative available maximum power of 1, 1.5 and 0.75, respectively. Relative available power is relative to a reference locomotive; railroads use 'reference' locomotives to determine the total consist power; this could be a '3000 HP' reference locomotive; hence, in this example the first locomotive has 3000 HP, the second 4500 HP and the third 2250 HP). Suppose that the mission is broken into seven segments. Given the above scenario the following combinations are available and can be matched to the track section load, 0.75, 1, 1.5, 1.75, 2.25, 2.5, 3.25, which is the combination of maximum relative HP settings for the consist. Thus for each respective relative HP setting mentioned above, for 0.75 the third locomotive is on and the first and second are off, for 1 the first locomotive is on and the second and third are off, etc. In a preferred embodiment the trip optimizer selects the maximum required load and adjusts via notch calls while reducing an overlap of power settings. Hence, if a segment calls for between 2 and 2.5 (times 3000 HP) then locomotive 1 and locomotive 2 are used while locomotive 3 is in either idle or in standby mode, depending on the time it is in this segment and the restart time of the locomotive.

In another embodiment, an analysis may be performed to determine a trade off between emission output and locomotive power settings to maximize higher notch operation where the emissions from the exhaust after treatment devices are more optimal. This analysis may also take into consideration one of the other parameters discussed above regarding train operation optimization. This analysis may be performed for an entire mission run, segments of a mission run, and/or combinations of both.

FIG. 13 depicts a block diagram of elements included in a system for optimized train power makeup. As illustrated and discussed above, a train load estimator 560 is provided. A trip mission time determinator 570 is also provided. A processor 240 is also provided. As disclosed above, though directed at a train, similar elements may be used for other engines not being used within a rail vehicle, such as, but not limited to, off-highway vehicles, marine vessels, and stationary units. The processor 240 calculates a total amount of power required to power the train 235, 236, 237 based on the train load determined by the train load estimator 560 and a trip mission time determined by the trip mission time determinator 570. A determination is further made of a type of locomotive needed and/or a number of locomotives needed, based on each locomotive power output, to minimally achieve the minimum total amount of power required based on the train load and trip mission time.

The trip mission time determinator 570 may segment the mission into a plurality of mission segments, such as, but not limited to, segment A and segment B, as discussed above. The total amount of power may then be individually determined for each segment of the mission. As further discussed above, an additional locomotive 255 is part of the train 235, 236, 237 and is provided for back up power. The power from the back-up locomotive 255 may be used incrementally as a required is identified, such as, but not limited to, providing power to get the train 235, 236, 237 back on schedule for a particular trip segment. In this situation, the train 235, 236, 237 is operated to achieve and/or meet the trip mission time.

The train load estimator 560 may estimate the train load based on information contained in the train makeup docket 480, historical data, a rule of thumb estimation, and/or table data. Furthermore, the processor 245 may determine a trade off between emission output and locomotive power settings to maximize higher notch operation where the emissions from the exhaust after-treatment devices are optimized.

Figure 14:
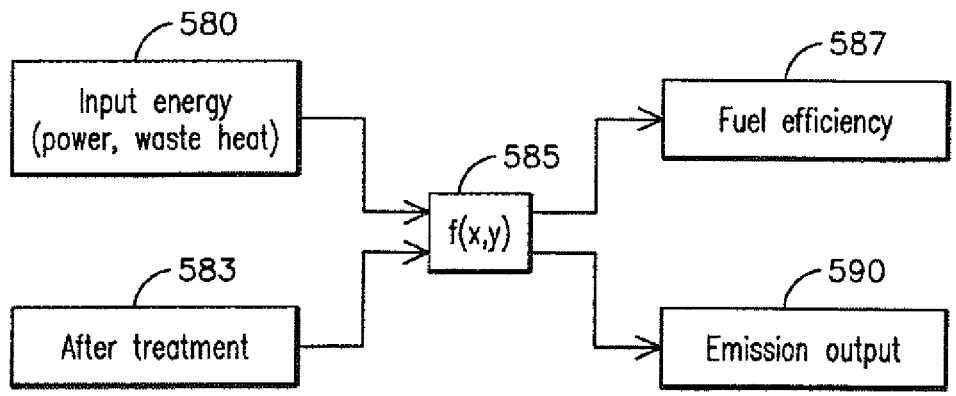
FIG. 14 depicts a block diagram of a transfer function for determining a fuel efficiency and emissions for a diesel powered system.

FIG. 14 depicts a block diagram of a transfer function for determining a fuel efficiency and emissions for a diesel powered system. Such diesel powered systems include, but are not limited to locomotives, marine vessels, OHV, and/or stationary generating stations. As illustrated, information pertaining to input energy 580 (such as, but not limited to, power, waste heat, etc.) and information about an after treatment process 583 are provided to a transfer function 585. The transfer function 585 utilizes this information to determine an optimum fuel efficiency 587 and emission output 590.

Figure 15:
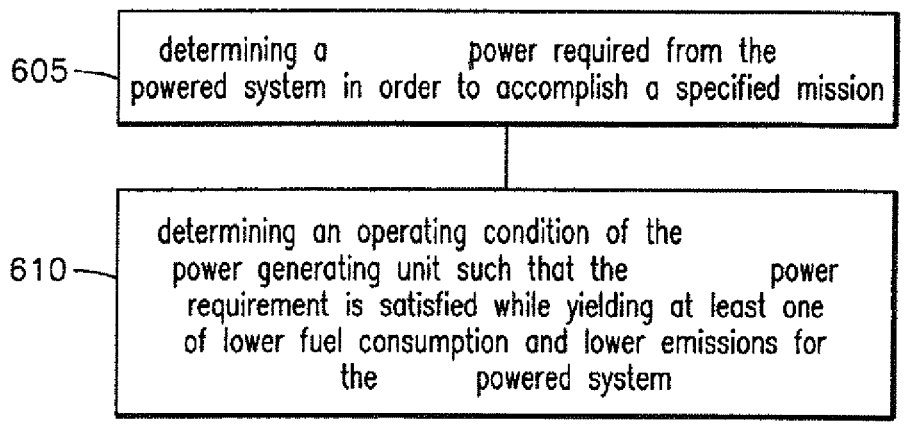
FIG. 15 depicts one embodiment of a flowchart of a method for determining a configuration of a diesel powered system having at least one power generating unit.

FIG. 15 depicts one embodiment of a flow for determining a configuration of a diesel powered system having at least one diesel-fueled power generating unit. The flowchart 600 includes determining a minimum power required from the diesel powered system in order to accomplish a specified mission, at 605. Determining an operating condition of the diesel-fueled power generating unit such that the minimum power requirement is satisfied while yielding lower fuel consumption and/or lower emissions for the diesel powered system, at 610, is also disclosed. As disclosed above, this flowchart 600 is applicable for a plurality of diesel-fueled power generating units, such as, but not limited to, a locomotive, marine vessel, OHV, and/or stationary generating stations. Additionally, this flowchart 600 may be implemented using a computer software program that may reside on a computer readable media.

Figure 16:
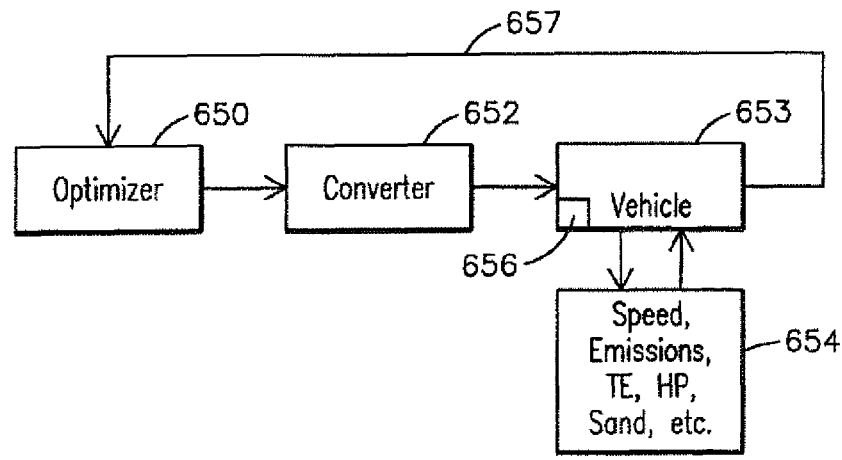
FIG. 16 depicts one embodiment of a closed-loop system for operating a rail vehicle.

FIG. 16 depicts one embodiment of a closed-loop system for operating a rail vehicle. As illustrated, an optimizer 650, converter 652, rail vehicle 653, and at least one output 654 from gathering specific information, such as, but not limited to, speed, emissions, tractive effort, horse power, a friction modifier technique (e.g., application of sand), etc., are part of the closed-loop control communication system 657. The output 654 may be determined by a sensor 656 which is part of the rail vehicle 653, or in another embodiment independent of the rail vehicle 653. Information initially derived from information generated from the trip optimizer 650 and/or a regulator is provided to the rail vehicle 653 through the converter 652. Locomotive data gathered by the sensor 654 from the rail vehicle is then communicated 657 back to the optimizer 650.

The optimizer 650 determines operating characteristics for at least one factor that is to be regulated, such as, but not limited to, speed, fuel, emissions, etc. The optimizer 650 determines a power and/or torque setting based on a determined optimized value. The converter 652 is provided to convert the power, torque, speed, emissions, initiate applying a friction modifying technique (e.g., application of sand), setup, configurations etc., control inputs for the rail vehicle 653, usually a locomotive. Specifically, this information or data about power, torque, speed, emissions, friction modifying, setup, configurations etc., and/or control inputs is converted to an electrical signal.

Figure 17:
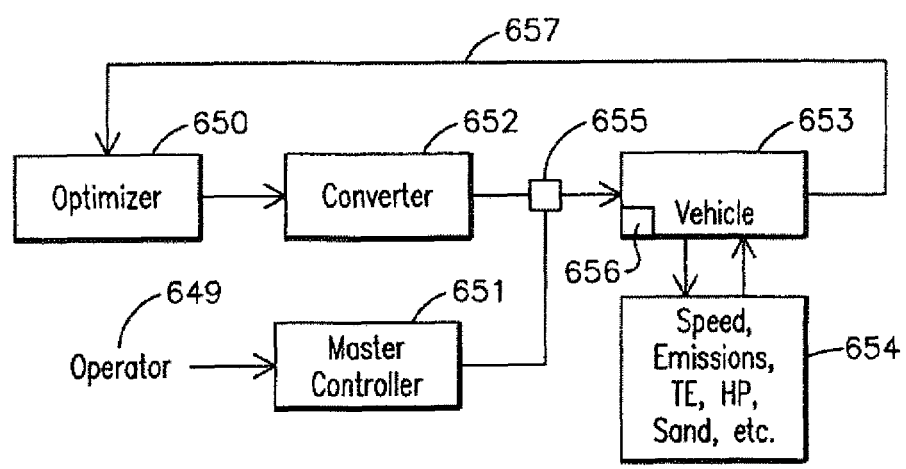
FIG. 17 depicts the closed-loop system of FIG. 16 integrated with a master control unit.

FIG. 17 depicts the closed loop system integrated with a master control unit. As illustrated in further detail below, the converter 652 may interface with any one of a plurality of devices, such as, but not limited to, a master controller, remote control locomotive controller, a distributed power drive controller, a train line modem, analog input, etc. The converter, for example, may disconnect the output of the master controller (or actuator) 651. The actuator 651 is normally used by the operator to command the locomotive, such as, but not limited to, power, horsepower, tractive effort, implement a friction modifying technique, braking (including at least one of dynamic braking, air brakes, hand brakes, etc.), propulsion, etc. levels to the locomotive. The master controller may be used to control both hard switches and software based switches used in controlling the locomotive. The converter 652 then injects signals into the actuator 651. The disconnection of the actuator 651 may be electrical wires or software switches or configurable input selection process etc. A switching device 655 is illustrated to perform this function.

Though FIG. 17 discloses a master controller, which is specific to a locomotive. In other applications, as disclosed above, another device provides the function of the master controller as used in the locomotive. For example, an accelerator pedal is used in an OHV and transportation bus, and an excitation control is used on a generator. With respect to the marine there may be multiple force producers (propellers), in different angles/orientation need to be controlled closed loop.

As discussed above, the same technique may be used for other devices, such as, but not limited to, a control locomotive controller, a distributed power drive controller, a train line modem, analog input, etc. Though not illustrated, the master controller similarly could use these devices and their associated connections to the locomotive and use the input signals. The Communication system 657 for these other devices may be either wireless or wired.

Figure 18:
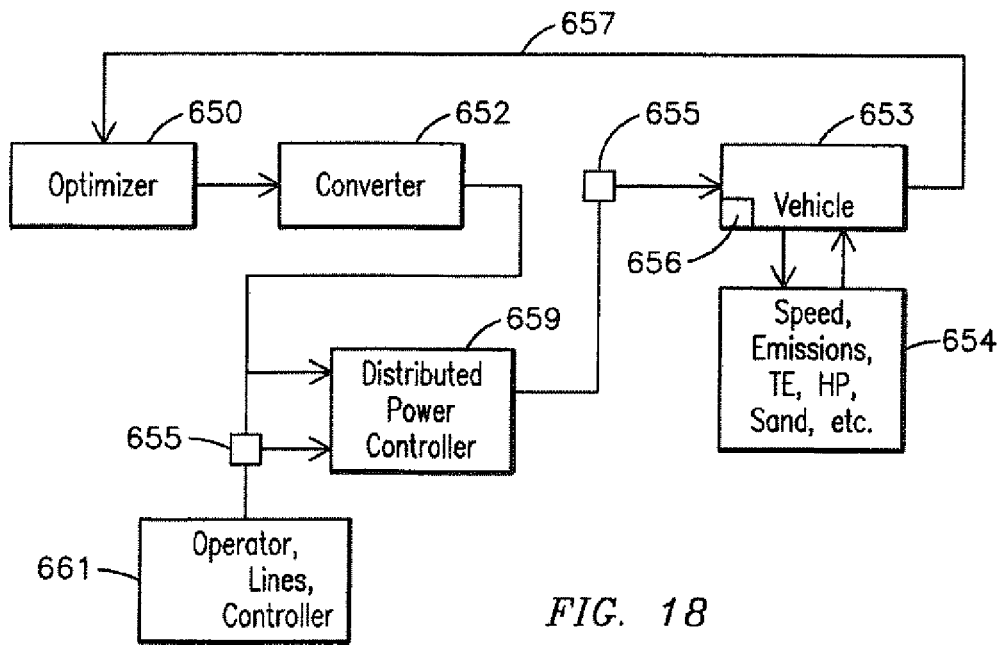
FIG. 18 depicts one embodiment of a closed-loop system for operating a rail vehicle integrated with another input operational subsystem of the rail vehicle.

FIG. 18 depicts one embodiment of a closed-loop system for operating a rail vehicle integrated with another input operational subsystem of the rail vehicle. For example the distributed power drive controller 659 may receive inputs from various sources 661, such as, but not limited to, the operator, train lines, locomotive controllers and transmit the information to locomotives in the remote positions. The converter 652 may provide information directly to input of the DP controller 659 (as an additional input) or break one of the input connections and transmit the information to the DP controller 659. A switch 655 is provided to direct how the converter 652 provides information to the DP controller 659 as discussed above. The switch 655 may be a software-based switch and/or a wired switch. Additionally, the switch 655 is not necessarily a two-way switch. The switch may have a plurality of switching directions based on the number of signals it is controlling.

Figure 19:
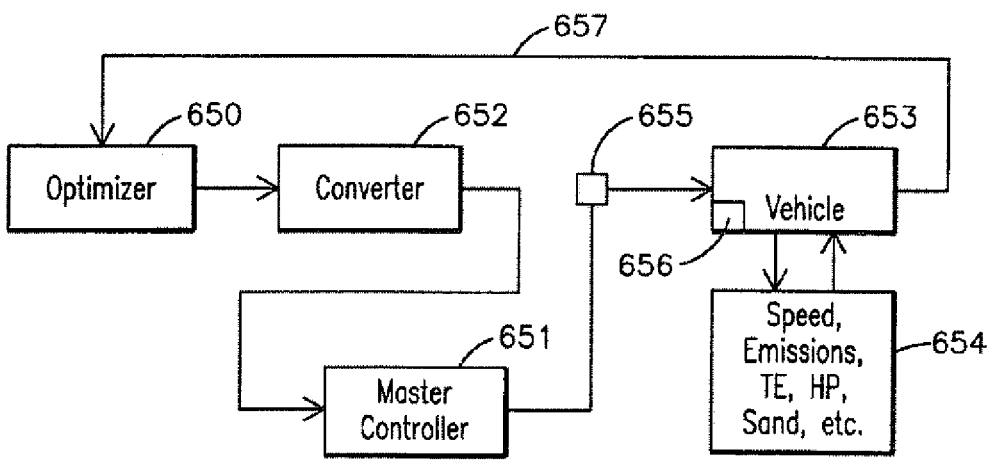
FIG. 19 depicts another embodiment of the closed-loop system with a converter which may command operation of the master controller.

In another embodiment, the converter may command operation of the master controller, as illustrated in FIG. 19. The converter 652 has a mechanical means for moving the actuator 651 automatically based on electrical signals received from the optimizer 650.

Sensors 654 are provided aboard the locomotive to gather operating condition data, such as, but not limited to, speed, emissions, tractive effort, horse power, etc. Locomotive output information 654 is then provided to the optimizer 650, usually through the rail vehicle 653, thus completing the closed loop system.

Figure 20:
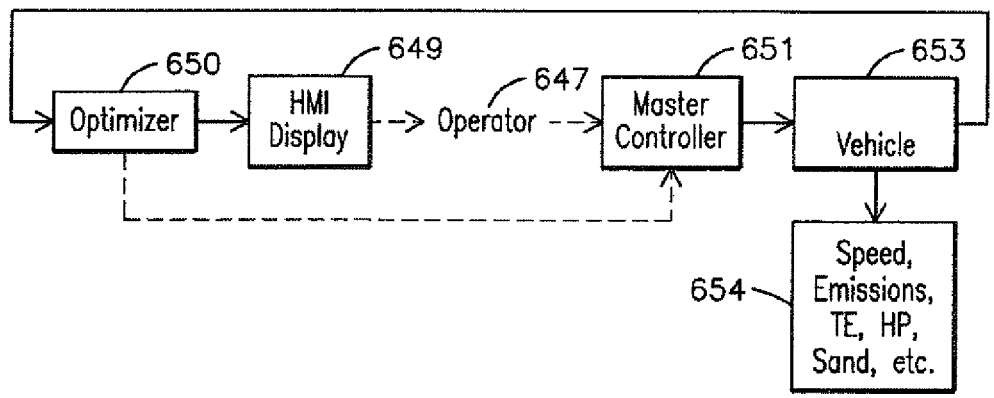
FIG. 20 depicts another embodiment of a closed-loop system.

FIG. 20 depicts another closed loop system where an operator is in the loop. The optimizer 650 generates the power/operating characteristic required for the optimum performance. The information is communicated to the operator 647, such as, but not limited to, through human machine interface (HMI) and/or display 649. This could be in various forms including audio, text or plots or video displays. The operator 647 in this case can operate the master controller or pedals or any other actuator 651 to follow the optimum power level.

If the operator follows the plan, the optimizer continuously displays the next operation required. If the operator does not follow the plan, the optimizer may recalculate/re-optimize the plan, depending on the deviation and the duration of the deviation of power, speed, position, emission etc. from the plan. If the operator fails to meet an optimize plan to an extent where re-optimizing the plan is not possible or where safety criteria has been or may be exceeded, in one embodiment the optimizer may take control of the vehicle to insure optimize operation, annunciate a need to consider the optimized mission plan, or simply record it for future analysis and/or use. In such an embodiment, the operator could retake control by manually disengaging the optimizer.

Figure 21:
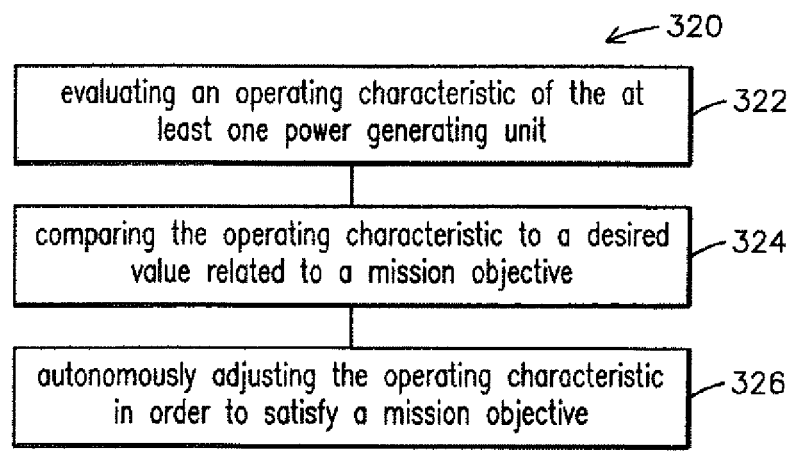
FIG. 21 depicts one embodiment of a flowchart of a method for operating a powered system.

FIG. 21 depicts one embodiment of a flowchart 320 for operating a powered system having at least one power generating unit where the powered system may be part of a fleet and/or a network of powered systems. Evaluating an operating characteristic of at least one power generating unit is disclosed, at 322. The operating characteristic is compared to a desired value related to a mission objective, at 324. The operating characteristic is autonomously adjusted in order to satisfy a mission objective, at 326. As disclosed herein the autonomously adjusting may be performed using a closed-loop technique. Furthermore, the embodiments disclosed herein may also be used where a powered system is part of a fleet and/or a network of powered systems.

Figure 22:
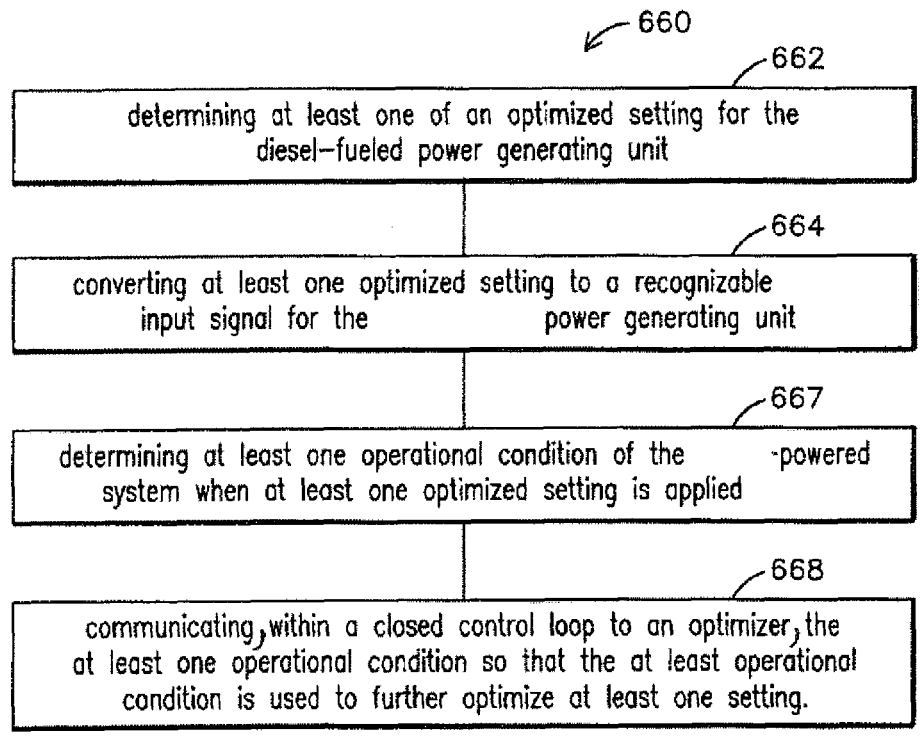
FIG. 22 depicts a flowchart of a method for operating a rail vehicle in a closed-loop process.

FIG. 22 depicts one flowchart operating a rail vehicle in a closed-loop process. The flowchart 660 includes determining an optimized setting for a locomotive consist, at 662. The optimized setting may include a setting for any setup variable such as, but not limited to, at least one of power level, optimized torque emissions, other locomotive configurations, etc. Converting the optimized power level and/or the torque setting to a recognizable input signal for the locomotive consist, at 664, is also disclosed. At least one operational condition of the locomotive consist is determined when at least one of the optimized power level and the optimized torque setting is applied, at 667. Communicating within a closed control loop to an optimizer the at least one operational condition so that the at least operational condition is used to further optimize at least one of power level and torque setting, at 668, is further disclosed.

As disclosed above, this flowchart 660 may be performed using a computer software code. Therefore for rail vehicles that may not initially have the ability to utilize the flowchart 660 disclosed herein, electronic media containing the computer software modules may be accessed by a computer on the rail vehicle so that at least of the software modules may be loaded onto the rail vehicle for implementation. Electronic media is not to be limiting since any of the computer software modules may also be loaded through an electronic media transfer system, including a wireless and/or wired transfer system, such as, but not limited to, using the Internet to accomplish the installation.

Locomotives produce emission rates based on notch levels. In reality, a lower notch level does not necessarily result in a lower emission per unit output, such as for example gm/hp-hr, and the reverse is true as well. Such emissions may include, but are not limited to particulates, exhaust, heat, etc. Similarly, noise levels from a locomotive also may vary based on notch levels, in particularly noise frequency levels. Therefore, when emissions are mentioned herein, embodiments are also applicable for reducing noise levels produced by a diesel powered system. Therefore even though both emissions and noise are disclosed at various times herein, the term emissions should also be read to also include noise.

When an operator calls for a specific horse power level, or notch level, the operator is expecting the locomotive to operate at a certain traction power or tractive effort. In one embodiment, to reduce emission output, the locomotive is able to switch between notch/power/engine speed levels while maintaining the average traction power desired by the operator. For example, suppose that the operator calls for Notch 4 or 2000 HP. Then the locomotive may operate at Notch 3 for a given period, such as a minute, and then move to Notch 5 for a period and then back to Notch 3 for a period such that the average power produced corresponds to Notch 4. The locomotive moves to Notch 5 because the emission output of the locomotive at this notch setting is already known to be less than when at Notch 4. During the total time that the locomotive is moving between notch settings, the average is still Notch 4, thus the tractive power desired by the operator is still realized.

The time for each notch is determined by various factors, such as, but not limited to, including the emissions at each notch, power levels at each notch, and the operator sensitivity. Embodiments are operable when the locomotive is being operated manually, and/or when operation is automatically performed, such as, but not limited to, when controlled by an optimizer and during low speed regulation.

In another embodiment, multiple set points are used. These set points may be determined by considering a plurality of factors such as, but not limited to, notch setting, engine speed, power, engine control settings, etc. In another embodiment, when multiple locomotives are used but may operate at different notch/power settings, the notch/power setting are determined as a function of performance and/or time. When emissions are being reduced, other factors that may be considered wherein a tradeoff may be considered in reducing emissions includes, but are not limited to, fuel efficiency, noise, etc. Likewise, if the desire is to reduce noise, emissions and fuel efficiency may be considered. A similar analysis may be applied if fuel efficiency is what is to be improved.

Figure 23:
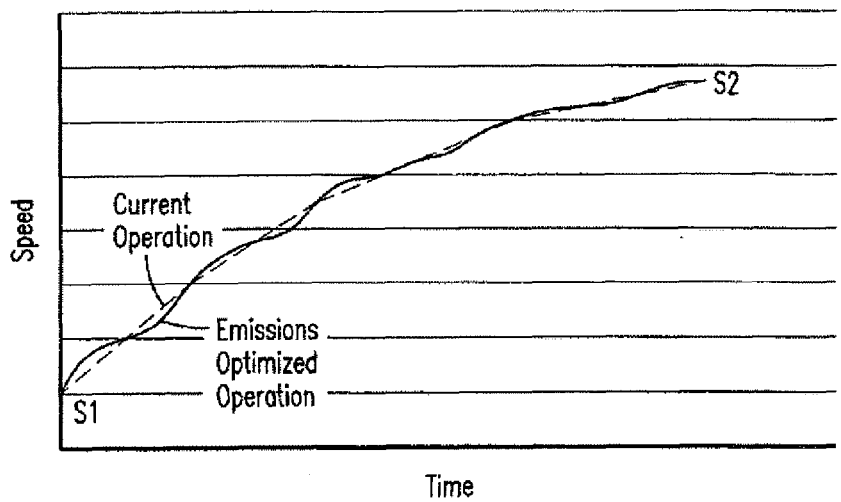
FIG. 23 depicts an embodiment of a speed versus time graph comparing current operations to emissions optimized operation.

FIG. 23 depicts an embodiment of a speed versus time graph comparing current operations to emissions optimized operation. The speed change compared to desirable speed can be arbitrarily reduced. For example if the operator desires to move from one speed (S1) to another speed (S2) within a desired time, it can be achieved with minor deviations.

Figure 24:
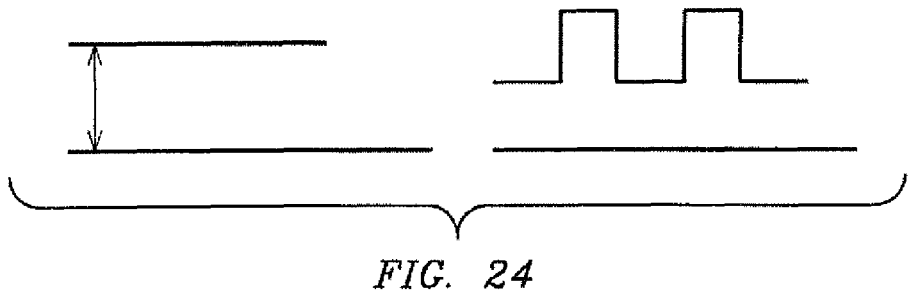
FIG. 24 depicts a modulation pattern compared to a given notch level.

FIG. 24 depicts a modulation pattern that results in maintaining a constant desired notch and/or horsepower. The amount of time at each notch depends on the number of locomotives and the weight of the train and its characteristics. Essentially the inertia of the train is used to integrate the tractive power/effort to obtain a desired speed. For example if the train is heavy the time between transitions of Notches 3 to 5 and vice versa in the example can be large. In another example, if the number of locomotives for a given train is great, the time between transitions need to be smaller. More specifically, the time modulation and/or cycling will depend on train and/or locomotive characteristics.

As discussed previously, emission output may be based on an assumed Notch distribution but the operator/rail road is not required to have that overall distribution. Therefore it is possible to enforce the Notch distribution over a period of time, over many locomotives over a period of time, and/or for a fleet locomotives over a period of time. By being providing emission data, the trip optimized described herein compares the notch/power setting desired with emission output based on notch/power settings and determines the notch/power cycle to meet the speed required while reducing emission output. The optimization could be explicitly used to generate the plan, or the plan could be modified to enforce, reduce, and/or meet the emissions required.

Figure 25:
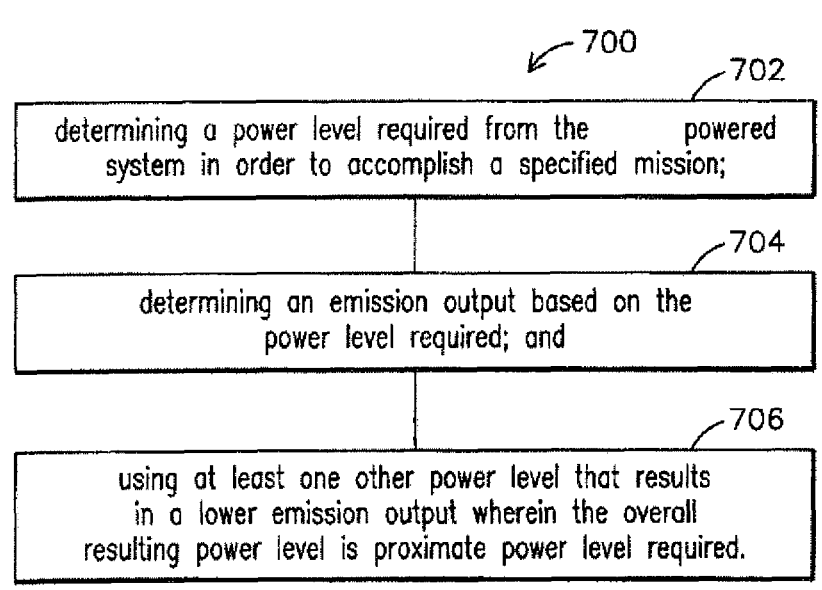
FIG. 25 depicts a flowchart for determining a configuration of a diesel powered system.

FIG. 25 depicts one flowchart for determining a configuration of a diesel powered system having at least one diesel-fueled power generating unit. The flowchart 700 provides for determining a minimum power, or power level, required from the diesel powered system in order to accomplish a specified mission, at 702. An emission output based on the minimum power, or power level, required is determined, at 704. Using at least one other power level that results in a lower emission output wherein the overall resulting power is proximate the power required, at 706, is also disclosed. Therefore in operation, the desired power level with at least another power level may be used and/or two power levels, not including the desired power level may be used. In the second example, as disclosed if the desires power level is Notch 4, the two power levels used may include Notch 3 and Notch 5.

As disclosed, emission output data based on notch speed is provided to the trip optimizer. If a certain notch speed produces a high amount of emission, the trip optimizer can function by cycling between notch settings that produce lower amounts of emission output so that the locomotive will avoid operating at the particular notch while still meeting the speed of the avoided notch setting. For example applying the same example provided above, if Notch 4 is identified as a less than optimum setting to operate at because of emission output, but other Notch 3 and 5 produce lower emission outputs, the trip optimizer may cycle between Notch 3 and 5 where that the average speed equates to speed realized at Notch 4. Therefore, while providing speed associated with Notch 4, the total emission output is less than the emission output expected at Notch 4.

Therefore when operating in this configuration though speed constraints imposed based on defining Notch limitations may not actually be adhered to, total emission output over a complete mission may be improved. More specifically, though a region may impose that rail vehicles are not to exceed Notch 5, the trip optimizer may determined that cycling between Notch 6 and 4 may be preferable to reach the Notch 5 speed limit but while also improving emission output because emission output for the combination of Notch 6 and 4 are better than when operating at Notch 5 since either Notch 4 or Notch 6 or both are better than Notch 5.

Figure 26:
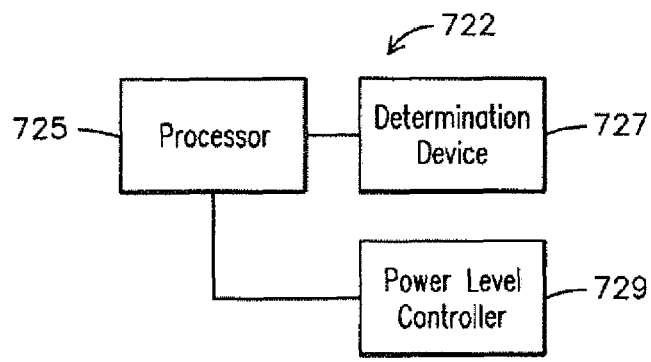
FIG. 26 depicts a system for reducing emission output.

FIG. 26 illustrates a system for reducing emission output, noise level, etc., from a diesel powered system having at least one diesel-fueled power generating unit while maintaining a specific speed. As disclosed above, the system 722 includes a processor 725 for determining a minimum power required from the diesel-powered system 18 in order to accomplish a specified mission is provided. The processor 725 may also determine when to alternate between two power levels. A determination device 727 is used to determine an emission output based on the minimum power required. A power level controller 729 for alternating between power levels to achieve the minimum power required is also included. The power level controller 729 functions to produce a lower emission output while the overall average resulting power is proximate the minimum power required.

Figure 27:
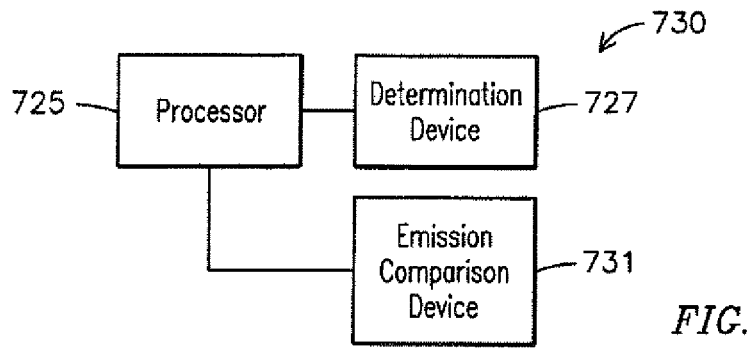
FIG. 27 depicts a system for reducing emission output from a diesel powered system.

FIG. 27 illustrates a system for reducing such output as but not limited to emission output and noise output from a diesel powered system having at least one diesel-fueled power generating unit while maintaining a specific speed. The system includes processor 727 for determining a power level required from the diesel-powered system in order to accomplish a specified mission is disclosed. An emission determinator device 727 for determining an emission output based on the power level required is further disclosed. An emission comparison device 731 is also disclosed. The emission comparison device 731 compares emission outputs for other power levels with the emission output based on the power level required. The emission output of the diesel-fueled power generating unit 18 is reduced based on the power level required by alternating between at least two other power levels which produce less emission output than the power level required wherein alternating between the at least two other power levels produces an average power level proximate the power level required while producing a lower emission output than the emission output of the power level required. As disclosed herein, alternating may simply result in using at least one other power level. Therefore though discussed as alternating, this term is not used to be limiting. Toward this end, a device 753 is provided for alternating between the at least two power levels and/or at least use on other power level.

Though the above examples illustrated cycling between two notch levels to meet a third notch level, more than two notch levels may be used when seeking to meet a specific desired notch level. Therefore three or more notch levels may be included in cycling to achieve a specific desired not level to improve emissions while still meeting speed requirements. Additionally, one of the notch levels that are alternated with may include the desired notch level. Therefore, at a minimum, the desired notch level and another notch level may be the two power levels that are alternated between.

Figure 28:
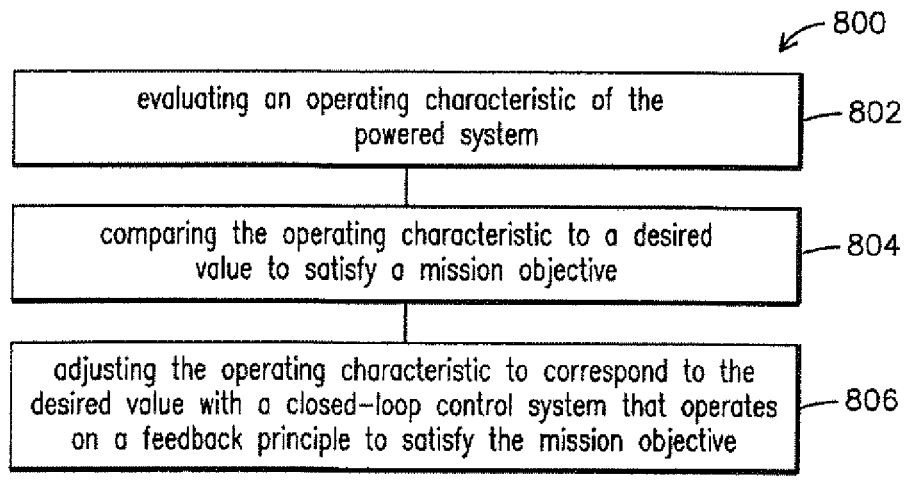
FIG. 28 depicts a method for operating a diesel powered system having at least one diesel-fueled power generating unit.

FIG. 28 discloses one flowchart for operating a diesel powered system having at least one diesel-fueled power generating unit. The mission objective may include consideration of at least one of total emissions, maximum emission, fuel consumption, speed, reliability, wear, forces, power, mission time, time of arrival, time of intermediate points, and braking distance. The mission objective may further include other objectives based on the specific mission of the diesel powered system. For example, as disclosed above, a mission objective of a locomotive is different than that that of a stationary power generating system. Therefore the mission objective is based on the type of diesel powered system the flowchart 800 is utilized with.

The flowchart 800 discloses evaluating an operating characteristic of the diesel powered system, at 802. The operating characteristic may include at least one of emissions, speed, horse power, friction modifier, tractive effort, overall power output, mission time, fuel consumption, energy storage, and/or condition of a surface upon which the diesel powered system operates. Energy storage is important when the diesel powered system is a hybrid system having for example a diesel fueled power generating unit as its primary power generating system, and an electrical, hydraulic or other power generating system as its secondary power generating system. With respect to speed, this operating characteristic may be further subdivided with respect to time varying speed and position varying speed.

The operational characteristic may further be based on a position of the diesel powered system when used in conjunction with at least one other diesel powered system. For example, in a train, when viewing each locomotive as a diesel powered system, a locomotive consist may be utilized with a train. Therefore there will be a lead locomotive and a remote locomotive. For those locomotives that are in a trail position, trail mode considerations are also involved. The operational characteristic may further be based on an ambient condition, such as, but not limited to, temperature and/or pressure.

Also disclosed in the flowchart 800 is comparing the operating characteristic to a desired value to satisfy the mission objective, at 804. The desired value may be determined from at least one of the operational characteristic, capability of the diesel powered system, and/or at least one design characteristic of the diesel powered system. With respect to the design characteristics of the diesel powered system, there are various models of locomotives where the design characteristics vary. The desired value may be determined at least one of at a remote location, such as, but not limited to, a remote monitoring station, and at a location that is a part of the diesel powered system.

The desired value may be based on a location and/or operating time of the diesel powered system. As with the operating characteristic the desired value is further based on at least one of emissions, speed, horse power, friction modifier, tractive effort, ambient conditions including at least one of temperature and pressure, mission time, fuel consumption, energy storage, and/or condition of a surface upon which the diesel powered system operates. The desired value may be further determined based on a number of a diesel-fueled power generating units that are either a part of the diesel powered system and/or a part of a consist, or at the sub-consist level as disclosed above.

Adjusting the operating characteristic to correspond to the desired value with a closed-loop control system that operates in a feedback process to satisfy the mission objective, at 806, is further disclosed. In general, but not to be considered limiting, the feedback process receives information and makes determinations based on the information received. The closed-loop approach allows for the implementation of the flowchart 800 without outside interference. However, if required due to safety issues, a manual override is also provided. The adjusting of the operating characteristic may be made based on an ambient condition. As disclosed above, this flowchart 800 may also be implemented in a computer software code where the computer software code may reside on a computer readable media.

Figure 29:
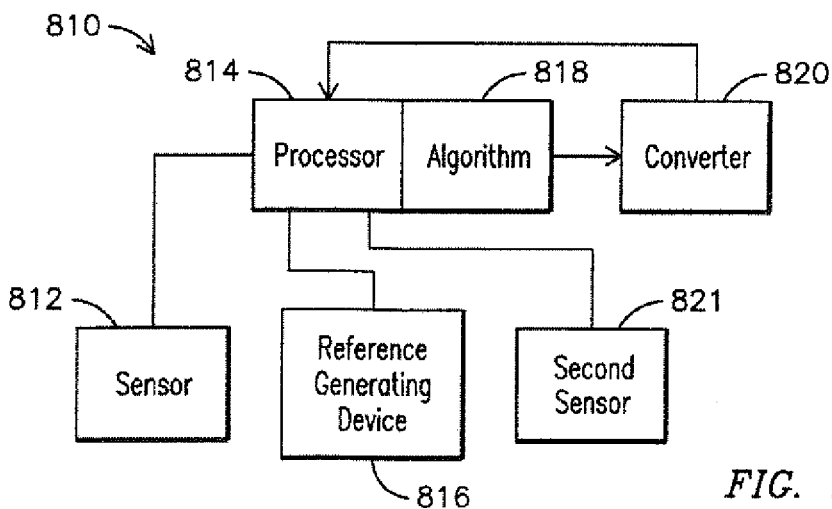
FIG. 29 depicts a block diagram of a system operating a diesel powered system having at least one diesel-fueled power generating unit.

FIG. 29 discloses a block diagram of a system for operating a diesel powered system having at least one diesel-fueled power generating unit. With the system 810, a sensor 812 is configured for determining at least one operating characteristic of the diesel powered system is disclosed. In one or more embodiments, a plurality of sensors 812 are provided to gather information relating to operating characteristics from a plurality of locations on the diesel powered system and/or a plurality of subsystems within the diesel powered system. The sensor 812 may be an operation input device. The sensor 812 can gather information relating to the operating characteristics may be about emissions, speed, horse power, friction modifier, tractive effort, ambient conditions including at least one of temperature and pressure, mission time, fuel consumption, energy storage, and/or condition of a surface upon which the diesel powered system operates. A processor 814 is in communication with the sensor 812. A reference generating device 816 is provided and is configured to identify the desired operating characteristic. The reference generating device 816 is in communication with the processor 814. The form of communication may be facilitated either through a wired and/or wireless communication system and/or device. The reference generating device 816 is at least one of remote from the diesel powered system and a part of the diesel powered system.

An algorithm 818 is within the processor 814 that operates in a feedback process that compares an actual value of the operating characteristic to a desired value of the operating characteristic. A converter 820, in closed loop communication with the processor 814 and/or algorithm 818, is further provided to control operation of the train to achieve the desired value of the operating characteristic. The converter 820 may be at least one of a master controller, a remote control controller, a distributed power controller, and a train line modem. More specifically, when the diesel powered system is a locomotive system, the converter may be a remote control locomotive controller, a distributed power locomotive controller, and a train line modem.

As further illustrated, a second sensor 821 may be included. The second sensor is configured to measure at least one ambient condition that is provided to the algorithm 818 and/or processor 814. As disclosed above, examples of an ambient condition include, but are not limited to temperature and pressure.

With respect to a train, when control of the train is transferred to an automatic, or autonomous, controller, a mission plan, or trip plan profile, is provided. Further a train is typically composed of a plurality of locomotives, called a locomotive consist, and a plurality of load cars. A train may include multiple locomotive consists in which each locomotive consist includes a plurality of locomotives operatively coupled to one another. A locomotive consist is connected by multiple units (MU) cables and is typically operated through a single power command input in the lead locomotive that is then communicated to all of the trailing locomotives. Though the mission plan may be established to operate with traditional throttle or power levels, such as but limited to 8 power levels ranging between notch 1 to notch 8, an improved mission plan may be completed if the controller is not constrained to only adhere to the traditional coupled power levels. These power commands for each locomotive may be decoupled from their traditional coupled levels. A plurality of approaches may be applied to decouple the power levels. Therefore though a few examples are disclosed below, these approaches should not be considered limiting.

Figure 30:
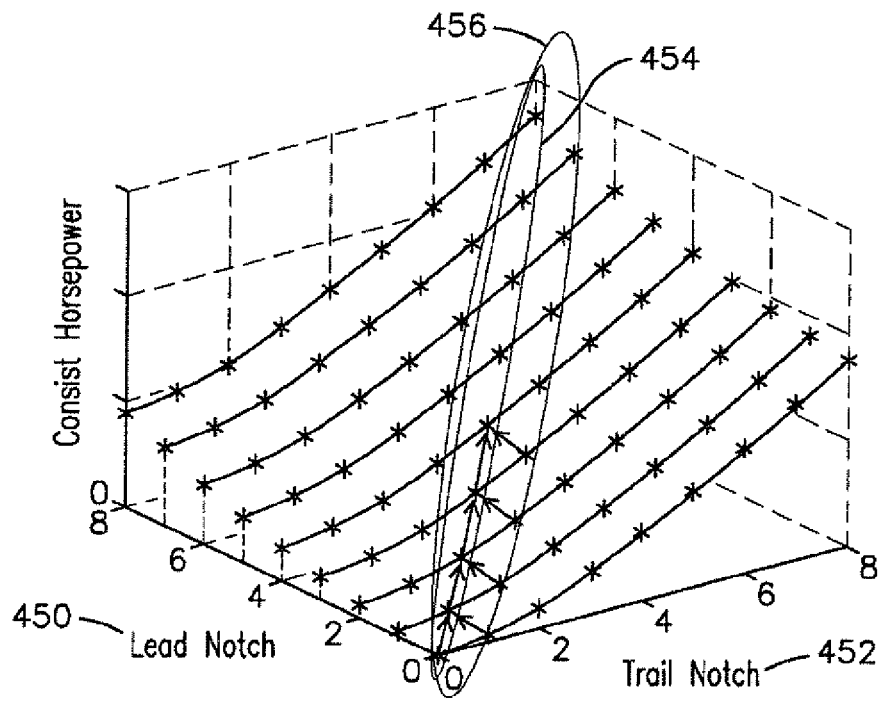
FIG. 30 depicts a three dimensional graph illustrating one embodiment for providing decoupled power settings.

In some embodiments, when there are two or more power generating units (e.g., (a) one lead locomotive of a train consist and one or more remote locomotives of the train consist or (b) a plurality of locomotive consists), the power commands (e.g., notch commands) for the power generating units may differ. For example, when the power commands are notch settings the notch settings may differ by a designated number of notches. More specifically, a lead locomotive and a remote locomotive(s) may have notch settings that differ by one notch. Likewise, a lead locomotive consist and a trailing locomotive consist(s) may have notch setting that differ by one notch. FIG. 30 discloses a three dimensional graph illustrating one embodiment of a variance between a notch 450 of a lead power-generating unit (e.g., a lead locomotive or lead locomotive consist) and a notch 452 of a remote power-generating unit (e.g., a remote locomotive or remote locomotive consist). Thus, the notch 450 may be referred to as the lead notch 450, and the notch 452 may be referred to as the remote notch 452 (or trail notch 452). A first area 454 representing normal operation of the powered system is shown. In the first area 454, the lead and remote notches 450 and 452 may have the same value. When a change in power is requested, the lead and remote notches 450, 452 may simultaneously change to the same value. For example, each of the lead and remote notches 450, 452 may move from notch 2 to notch 3. A second area 456 shown in FIG. 30 represents another embodiment. As one example, if more power is required and the current lead and trail notches are identical, either of the lead notch 450 or the trail notch 452 may be increased by a designated amount, such as, but not limited to, by one notch. The other notch may be subsequently increased by the same or different amount. Similarly, for the case where less power is required, the lead and trail notches 450, 452 may be reduced at different times by the same or different amounts.

Figure 31:
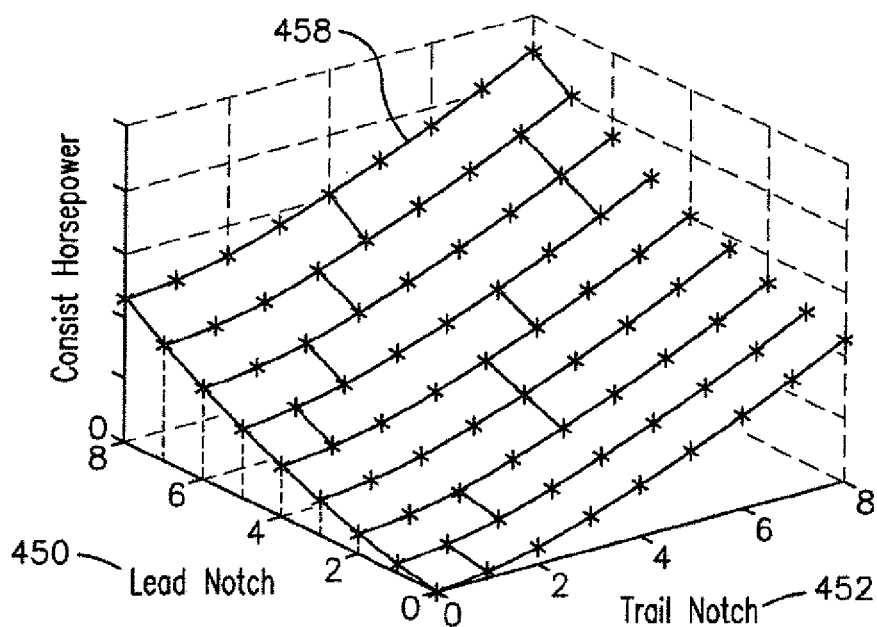
FIG. 31 depicts a three dimensional graph illustrating another embodiment for providing decoupled power settings.

FIG. 31 discloses a three dimensional graph illustrating another embodiment for providing decoupled (or independent) power settings. As illustrated, a power-operating plan, and/or map 458 may be developed, such as in 2-dimensional space. The power-operating plan may be based on (e.g., a function of) one or more operating restrictions or constraints. For example, though not to be considered limiting, the map may be generated by reducing fuel use for each desired power level, emission output for each desired power level, a change in power between notch settings, a maximum notch deviation from the lead command (e.g., lead locomotive or locomotive consist) to the trail notch command, etc. (e.g., trail locomotive or locomotive consist). The power-operating plan may be different for increasing and decreasing power. The power-operating plan may be a function of an operating parameter such as, but not limited to current power setting, current speed, etc. Furthermore, the operating plan may be a function of the expected future power demand. Accordingly, the power-operating plan may be based on at least one of an operating restriction, constraint, characteristic, or parameter.

Figure 32:
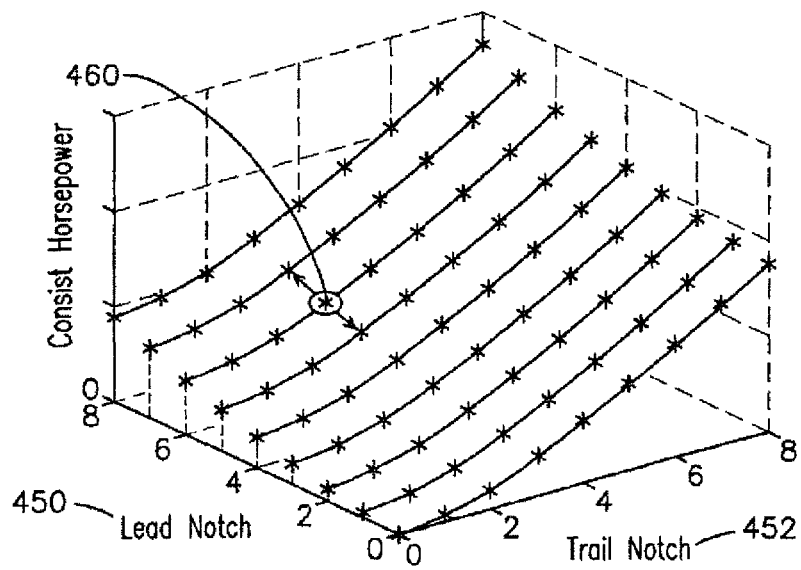
FIG. 32 depicts a three dimensional graph illustrating another embodiment for providing decoupled power settings.

FIG. 32 discloses a three dimensional graph illustrating another embodiment for providing decoupled power settings. Notch combinations 460 may be employed with various restrictions, such as, but not limited to, a reduction in fuel use for a desired power level, a reduction in emission output for a desired power level, a change in power between notch settings, a maximum notch deviation from the lead notch command to the trail notch command, a maximum notch excursion, a minimum time to change power settings, and a desired transient response. The power-operating plan may also be a function of an operating parameter, the mission plan, and the past notch path history.

The examples disclosed in FIG. 30 through FIG. 32 may utilize an additional axis of freedom when distributed power (DP) is used for a consist power management approach. The DP consist command notch may be independent of both the lead and trailing locomotives commands and various constraints, as disclosed above, may be used for load balancing and other train handling considerations.

Additionally, for cases where the trailing locomotives in a given consist are connected to the lead locomotive by independent MU cables or some other form of communications, such as, but not limited to, communications using radio frequency such as used with distributed power units, additional axes of freedom are gained and similar methods employed.

Figure 33:
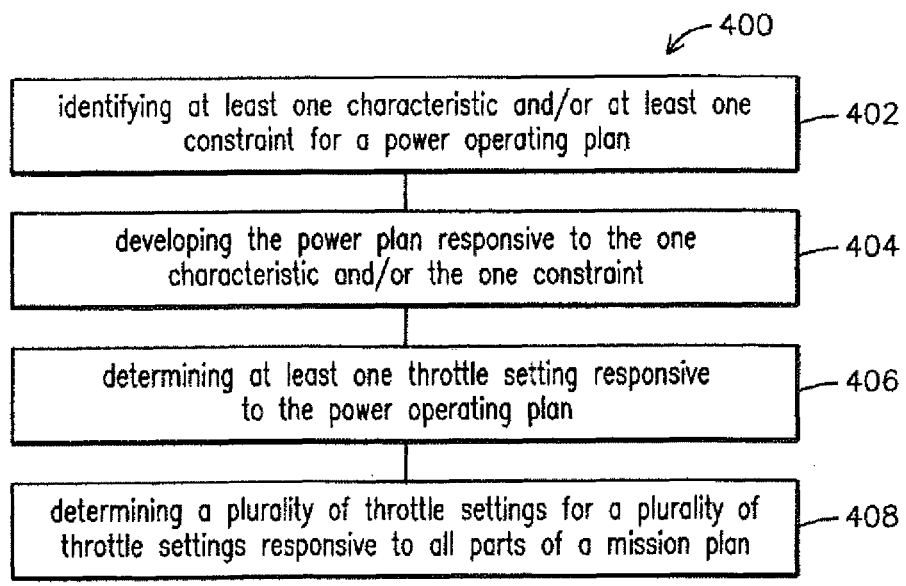
FIG. 33 depicts a flowchart illustrating one embodiment for providing decoupled power settings.

FIG. 33 discloses a flowchart illustrating one embodiment for powering a powered system where throttle commands for the powered system are decoupled from predefined throttle settings. The flowchart 400 illustrates identifying at least one characteristic and/or at least one restriction or constraint for a power-operating plan, at 402. The power-operating plan is developed responsive to the one characteristic and/or the one restriction or constraint, at 404. At least one power setting is determined which is responsive to the power-operating plan, at 406. A plurality of throttle settings may be determined for a plurality of throttle settings responsive to the segments of a mission plan, at 408. As disclosed above, the characteristic may include, but is not limited to, a maximum power setting, a minimum power setting, a fuel burn rate for a desired power level, a maximum change in power setting, a minimum time to change between a first and a second power setting, a desired transient response, etc.

Figure 34:
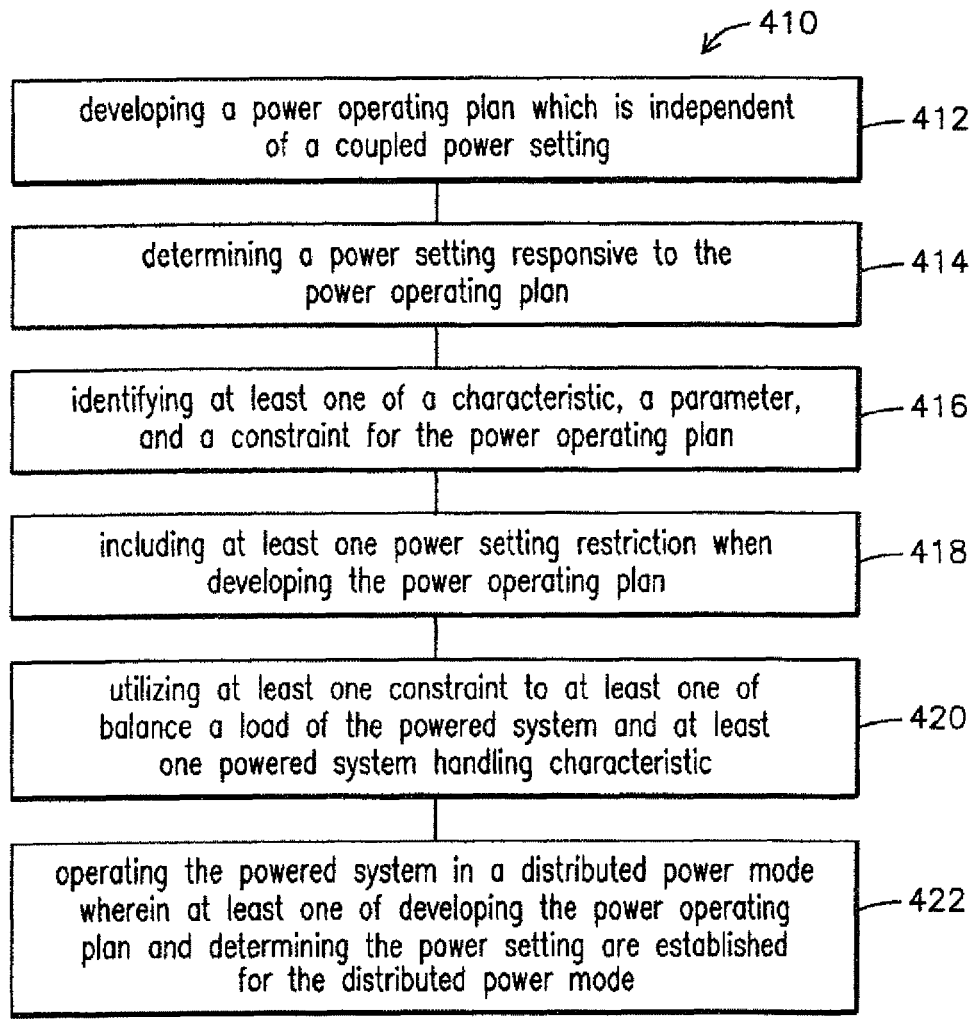
FIG. 34 depicts a flowchart illustrating another embodiment for providing decoupled power settings.

FIG. 34 discloses another flowchart illustrating one embodiment for powering a powered system where throttle commands for the powered system are decoupled from predefined throttle settings. The flowchart 410 discloses developing a power-operating plan which is independent of a coupled power setting, at 412. A power setting is determined responsive to the power operating plan, at 414. The flowchart 410 further discloses identifying one characteristic, parameter, restriction, and/or constraint for the power-operating plan, at 416. When the power-operating plan is static, the throttle or power setting may vary in response to varied power settings, where varying may include increasing and/or decreasing the throttle setting. As disclosed above with respect to FIG. 33, a power setting restriction may be imposed when developing the power-operating plan, at 418. A restriction and/or constraint, may be used to balance a load of the powered system and/or a handling characteristic of the powered system, at 420. When the powered system is a rail transportation system, the rail transportation system may be operated in a distributed power mode wherein developing the power-operating plan and/or determining the power setting are established for the distributed power mode, at 422.

By way of example, a distributed power train may include first and second (or more) locomotive consists, wherein each of the locomotive consists includes a plurality of locomotives that are operatively coupled to one another. For example, the locomotives of a single locomotive consist may operate at a common power setting such that when the power setting is changed in one locomotive consist (e.g., a lead locomotive) the power setting in the other locomotive consist(s) (e.g., remote or trail locomotives) may also be changed.

In some embodiments, a power-operating plan for the distributed-power (DP) train may be developed that dictates operation of the DP train. The power-operating plan may be based on at least one of an operating characteristic, operating parameter, operating restriction, operating constraint, and the like, such as the various characteristics, parameters, restrictions, and constraints described above. In some cases, the operating characteristics, parameters, restrictions, and constraints may be characterized as or considered to be part of train data, track data (or a track database), and trip data.

Train data may include information on the characteristics of the train. For example, train data may include information a number of rail cars, number of locomotives, information relating to an individual locomotive or a consist of locomotives (e.g., model or type of locomotive, weight, power description, performance of locomotive traction transmission, consumption of engine fuel as a function of output power, cooling characteristics), load of a train with effective drag coefficients, train-handling rules (e.g., tractive effort ramp rates, maximum braking effort ramp rates), content of rail cars, etc.

Track data may include information on the track, such as speed limits for designated segments of a track, maximum cumulative and/or instantaneous emissions for a designated segment of the track, locations of railroad crossings, identification grade changes, sidings, depot yards, and fuel stations.

Trip data may include information relating to a designated mission or trip, such as start and end times of the trip, start and end locations, track data that pertains to the designated route (e.g., effective track grade and curvature as function of milepost, speed limits), maximum cumulative and/or instantaneous emissions for the trip, fuel consumption permitted for the trip, historical trip data (e.g., how much fuel was used in a previous trip along the designated route), desired trip time or duration, crew (user and/or operator) identification, crew shift expiration time, minimum and/or maximum power (throttle) settings.

As one example, a controller may receive an operating restriction or constraint and develop a power-operating plan, which may include modifying a previously developed power-operating plan. The controller may analyze the train data, trip data, and track data corresponding to the designated route for a trip. Based on this analysis and the received operating restriction or constraint, the controller may develop the power-operating plan. For instance, if the operating restriction is a limit on fuel consumption of the trip. The controller may develop a plan that includes adjusting the power settings of the different locomotive consists while also satisfying other conditions (e.g., arrival time). As such, different locomotive consists of a single train may operation asynchronously or independent from each other. This may also be referred to as operating according to an asynchronous mode, independent mode, or decoupled mode.

In one or more embodiments, two adjacent railroad railcars or locomotives are linked by a knuckle coupler attached to each railcar or locomotive. Generally the knuckle coupler may include four elements, a cast steel coupler head, a hinged jaw or "knuckle" rotatable relative to the head, a hinge pin about which the knuckle rotates during the coupling or uncoupling process, and a locking pin. When the locking pin on either or both couplers is moved upwardly away from the coupler head, the locked knuckle rotates into an open or released position, effectively uncoupling the two railcars/locomotives. Application of a separating force to either or both of the railcars/locomotives completes the uncoupling process.

When coupling two railcars, at least one of the knuckles may be in an open position to receive the jaw or knuckle of the other railcar. The two railcars are moved toward each other. When the couplers mate, the jaw of the open coupler closes and, responsive thereto, the gravity-fed locking pin automatically drops in place to lock the jaw in the closed condition, locking the couplers closed to link the two railcars.

Even when coupled and locked, the distance between the two linked railcars can increase or decrease due to the spring-like effect of the interaction of the two couplers and due to the open space between the mated jaws or knuckles. The distance by which the couplers can move apart when coupled is referred to as an elongation distance or coupler slack and can be as much as about four to six inches per coupler. A stretched slack condition occurs when the distance between two coupled railcars is about the maximum separation distance permitted by the slack of the two linked couplers. A bunched (compressed) condition occurs when the distance between two adjacent railcars is about the minimum separation distance as permitted by the slack between the two linked couplers.

The distance decreases when coupler bunching forces (e.g., the application of braking effort (BE)) drive the jaw of each coupler into the head of the mating coupler. Excessive bunching forces can damage the coupler, the draft gear, and the railcars. In a completely bunched (compressed) coupler condition, the distance between two adjacent railcars is at a minimum. The coupler is connected to a railcar frame through a draft gear that provides a force-absorbing function to cushion the effect of the bunching (and stretching) forces. The train experiences run-in as the couplers are moving toward the bunched state.

Stretching forces reduce the coupler gap by bringing the jaws into contact Excessive stretching forces can damage the coupler, the draft gear, and the railcars. In a stretched slack condition the distance between two coupled railcars is at a maximum. The train is experiencing run-out as the couplers are moving the stretched state.

Both the bunching forces and the stretching forces are caused by the application of tractive effort and braking effort by the locomotive and by track features (such as track crests, sags, curves, and super-elevations). These forces are also influenced by various train/railcar/track characteristics, e.g., railcar mass, mass distribution along the train, train length, crest height, and sag depth. When the powered system is coupled to another system, such as, but not limited, to a locomotive being coupled to another locomotive and/or a rail car, another characteristic considered in determining the throttle setting is a force exerted where coupling of the vehicles occurs.

Such forces are realized, for example, when the train crosses a crest apex. As the train approaches the crest it is in a stretched coupler condition. The largest coupler forces may be experienced by the railcar crossing the apex. As each railcar behind the lead locomotive crosses the apex, it is subjected to a gravitational force having a component in the same direction as the tractive effort applied by the lead locomotive (or by the lead locomotive consist or the lead and non-lead locomotive consist in a distributed power train). Each railcar (specifically each railcar coupler) on the downward crest slope experiences a force equal to the tractive effort plus the sum of the gravitational forces exerted on each railcar from the railcar of interest to the forward end of the train. The rail cars on the upward slope approaching the crest exert a stretching force on the railcars on the downward slope. Thus the total magnitude of the force exerted on each railcar increases as another railcar crosses the apex until half of the train mass is on the descending side of the crest. The throttle setting is determined so as to reduce this force.

The flowcharts illustrated in FIG. 33 and FIG. 34 are also applicable to a train operating in a distributed power mode as well as a train line. With respect to the train line, the flowchart is applicable to both wired train lines and wireless train lines. As disclosed above with respect to FIG. 30 through FIG. 31, when operating in the distributed power mode, a fourth axis is provided for distributed power notch, thus resulting in one more degrees of freedom. With the automatic controller, a constraint may be used to balance a load of the powered system and/or to control a handling characteristic of the powered system. Furthermore, when under automatic, or autonomous, control, a lead locomotive may operate with an analog throttle control, or more specifically, it may be free to operate at throttle settings decoupled from preset throttle settings. Trail locomotives may still operate using the standard fixed throttle settings. Therefore, the throttle setting for the trail locomotive is in response to the throttle setting of the lead locomotive. However, the throttle setting for the trail locomotive may also be set independent of the lead locomotive.

In one embodiment, such as, but not limited to, a plurality of locomotives operating as a consist and/or being individually part of a train, coupling forces may exist at coupling joints, or connecters, between adjacent locomotives or coupled locomotives and rail cars. When determining throttle settings responsive to the mission, consideration in selecting these settings may be given to the coupling forces expected to be exerted.

One or more embodiments may also be implemented with a computer software code operable with a processor and configured to reside on a computer readable media. Furthermore, though a train is used to explain distributed power mode operations, distributed power may be applicable to other powered systems as disclosed herein.

In one or more embodiments, a system is provided. The system may include a controller that is configured to obtain an operating restriction of a distributed power (DP) system that first and second power generating units. Each of the power-generating units may be, for example, a single locomotive or a single locomotive consist that includes a plurality of locomotives that are linked directly or indirectly to one another. The controller may be operable to receive the operating restriction from a remote system or from an operator who manually enters the restriction through a user interface. Alternatively, the operating restriction may include one or more previously designated restrictions, such as speed limits, emissions limits, fuel/energy storage limits (e.g., on the amount of fuel or electric energy that can be stored onboard or otherwise available during a mission), and the like. The operating restrictions may be similar to the restrictions and constraints described above. By way of example only, the operating restriction may represent at least one of (a) an amount of time that the powered system has to travel to a destination; (b) an amount of fuel available to power the powered system; or (c) a limit on an amount of emissions generated by the powered system. However, other operating restrictions may exist. The operating restriction may be used to at least one of balance a load of the DP system or balance a handling characteristic of the DP system. In particular embodiments in which the system includes or is part of a rail vehicle system, the operating restriction may be used to reduce or control the in-train (or coupling) forces that are experienced by the railcars and/or locomotives.

The controller may be configured to develop a power-operating plan for the DP system that is based on the operating restriction. The power-operating plane may also dictate power requirements of the DP system during a designated trip of the DP system. The power-operating plan may include a decoupled operating mode that dictates that the first and second power generating units are to be operated at different first and second power settings, respectively. In particular embodiments, the first and second power settings include different first and second notch settings, respectively.

The power-operating plan may dictate that a value of the first power setting (e.g., notch setting) and a value of the second power setting be changed at different times during the designated trip. However, the power-operating plan may also dictate that the first and second power settings be changed at different times, but to different values. The power-operating plan may also dictate that at least one of the first power setting or the second power setting be changed a plurality of times during the designated trip. In some embodiments, the power-operating plan is also based on an actual operating characteristic of the powered system. The actual operating characteristic may be, for example, at least one of an actual power setting or actual speed of the powered system. In some cases, the power-operating plan is a function of the geography of the area in which the DP system is traveling.

In one embodiment, the power-operating plan may designate an overall operating characteristic for the powered system. For example, the plan may designate various speeds, accelerations, braking efforts, tractive efforts, power outputs, or the like, for the powered system to produce at associated locations along a trip or during associated time periods during a mission. The controller may determine that, in order for the system to achieve (e.g., actually provide the designated overall operating characteristic), the power generating units are to be asynchronously controlled. For example, the power generating units may operate according to an independent or decoupled operating mode. Different power generating units (e.g., different locomotives or different locomotive consists) can operate according to different operational settings in order to achieve an overall operational setting for the system. For example, in order for the system to travel at a designated speed at a designated location, a first power generating unit or consist can operate at a first notch setting, a second power generating unit or consist can operate at a different, second notch setting, a third power generating unit consist can operate at a different, third notch setting, and the like. Additionally, the designated settings for the different power generating units may change by different amounts and/or at different times or at different locations during the mission. With respect to consists in a vehicle having two or more consists, the powered units in each consist may operate according to the same operational setting, but different consists may operate according to different operational settings to achieve the designated settings for the vehicle (e.g., a speed or braking effort). Alternatively, the powered units within a consist may operate according to different settings.

The designated trip of the DP system may be associated with a trip plan that dictates designated speeds of the DP system at associated different locations along a trip. The controller is configured to determine the first power setting and the second power setting at the different locations in order to match actual speeds of travel of the powered system at the different locations to the designated speeds in the trip plan that are associated with the different locations.

The independent (or decoupled) operating mode may dictate that a first value of the first power setting is changed during the designated trip while the second power setting remains a common value so that the DP system achieves a designated speed. The decoupled operating mode may dictate that a first value of the first power setting is changed before the second power setting is changed to a second value so that the DP system achieves a designated speed.

In one or more embodiments, a method is provided that includes obtaining an operating restriction of a distributed power (DP) system having first and second power generating units and developing a power-operating plan for the DP system that is based on the operating restriction. The power-operating plan may also dictate power requirements of the DP system during a designated trip of the DP system. The power-operating plan may include a decoupled operating mode that dictates that the first and second power generating units are to be operated at different first and second power settings, respectively.

Figure 35:
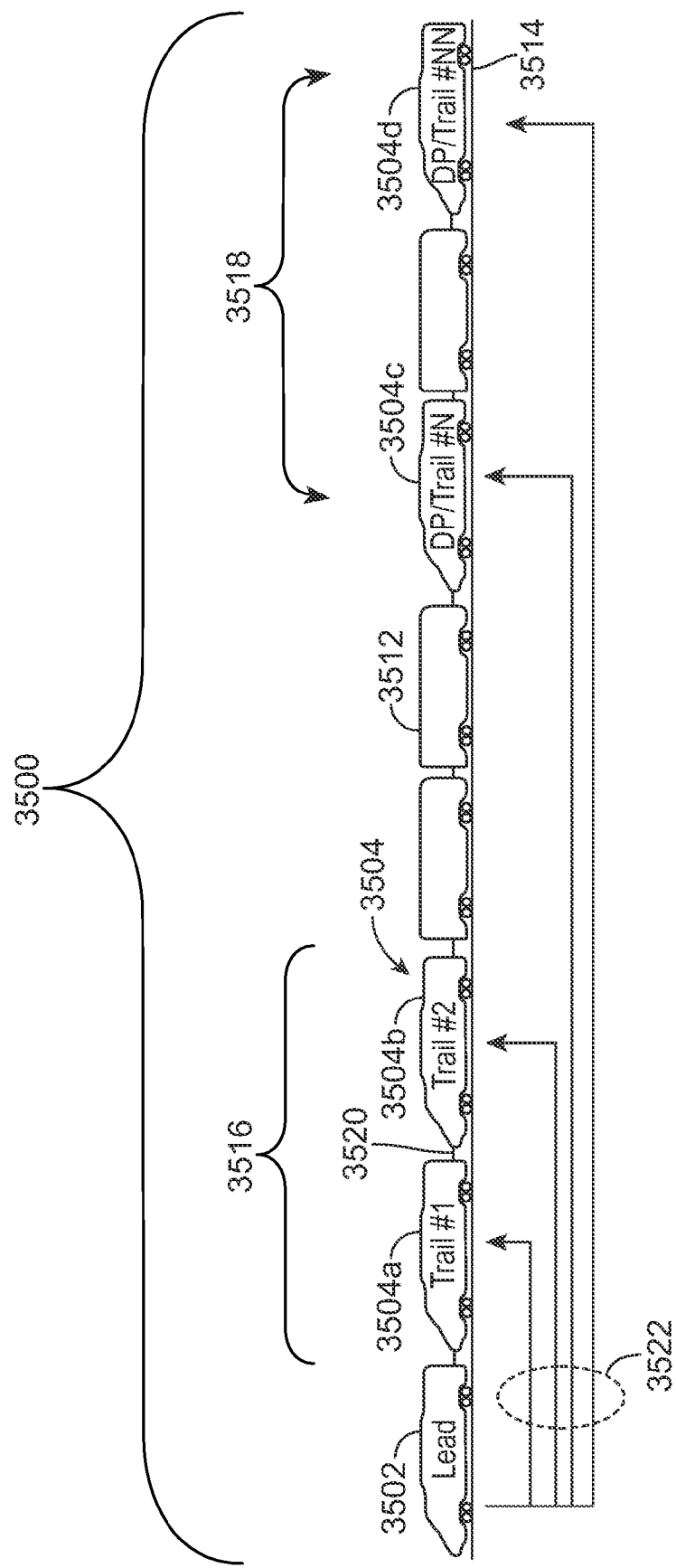
FIG. 35 is a schematic illustration of a rail vehicle system that incorporates an isolation control system constructed in accordance with one embodiment.

FIG. 35 is a schematic illustration of a vehicle system 3500 that incorporates an isolation control system constructed in accordance with one embodiment. The vehicle system 3500 can represent a vehicle system that includes one or more of the consists or trains described above. The vehicle system 3500 includes a lead powered unit or vehicle 3502 (also referred to as a propulsion-generating unit or vehicle) coupled with several remote powered units or vehicles 3504 (e.g., powered units 3504A-D, which also may be referred to as propulsion-generating units or vehicles) and individual non-powered units 3512 (also referred to as non-propulsion-generating vehicles). The propulsion-generating or powered units may be identical or similar to the vehicle 42 (e.g., a locomotive) and the non-powered units may be identical or similar to the vehicle 40 (e.g., a railcar).

The vehicle system 3500 travels along a route 3514, such as a track, road, waterway, and the like. The lead powered unit 3502 and the remote powered units 3504 supply a tractive force or effort to propel the vehicle system 3500 along the route 3514. In one embodiment, the lead powered unit 3502 is a leading locomotive disposed at the front end of the vehicle system 3500 and the remote powered units 3504 are trailing locomotives disposed behind the lead powered unit 3502 between the lead powered unit 3502 and the back end of the vehicle system 3500. The individual non-powered units 3512 may be non-powered storage units (e.g., units that are not capable of providing motive power but that may consume energy such as electric current for one or more purposes) for carrying cargo and/or passengers along the route 3514.

The remote powered units 3504 are remote from the lead powered unit 3502 in that the remote powered units 3504 are not located within the lead powered unit 3502. A remote powered unit 3504 need not be separated from the lead powered unit 3502 by a significant distance in order for the remote powered unit 3504 to be remote from the lead powered unit 3502. For example, a remote powered unit 3504 may be directly adjacent to and coupled with the lead powered unit 3502 and still be remote from the lead powered unit 3502. In one embodiment, the lead powered unit 3502 is not located at the front end of the vehicle system 3500. For example, the lead powered unit 3502 may trail one or more non-powered units 3512 and/or remote powered units 3504 in the vehicle system 3500. Thus, unless otherwise specified, the terms "lead," "remote," and "trailing" are meant to distinguish one vehicle from another, and do not require that the lead powered unit be the first powered unit or other vehicle in a consist or other vehicle system, or that the remote powered units be located far away from the lead powered unit or other particular units, or that a "trailing" unit be behind the lead unit or another unit. The number of powered units 3504 in the vehicle system 3500 may vary from the number shown in FIG. 35.

The remote powered units 3504 may be organized into groups. In the illustrated embodiment, the remote powered units 3504A, 3504B are organized into a consist group 3516. The consist group 3516 may include one or more powered units 3504A, 3504B that are the same or similar models and/or are the same or similar type of powered unit. For example, the consist group 3516 may include remote powered units 3504A, 3504B that are manufactured by the same entity, supply the same or similar tractive force, have the same or similar braking capacity, have the same or similar types of brakes, and the like. Alternatively, one or more of the powered units 3504 in a consist group may differ from one or more other powered units 3504 in the same consist group. The powered units in a consist group may be directly coupled with one another or may be separated from one another but interconnected by one or more other components or units.

The remote powered units 3504C, 3504D are organized into a distributed power group 3518 in the illustrated embodiment. Similar to the consist group 3516, a distributed power group 3518 may include one or more powered units. The powered units in the distributed power group 3518 may be separated from one another but interconnected with one another by one or more other powered units 3502, 3504 and/or non-powered units 3512, as shown in FIG. 35.

In operation of one embodiment of the system 3500, the lead powered unit 3502 remotely controls which of the remote powered units 3504 are turned on and which remote powered units 3504 are turned off. For example, an operator in the lead powered unit 3502 may remotely turn one or more of the remote powered units 3504 on or off while remaining in the lead powered unit 3502. The lead powered unit 3502 may remotely turn on or off individual remote powered units 3504 or entire groups of remote powered units 3504, such as the remote powered units 3504A, 3504B in the consist group 3516 and/or the remote powered units 3504C, 3504D in the distributed power group 3516. The lead powered unit 3502 remotely turns the remote powered units 3504 on or off when the vehicle system 3500 is moving along the route 3514 and/or when the vehicle system 3500 is stationary on the route 3514. For example, prior to leaving on a trip along the route 3514 (e.g., where a trip includes travel from a beginning location to a destination location), the vehicle system 3500 may decide which powered units 3504 can be turned off for the duration of the trip based on calculated or forecasted energy needs of the vehicle system 3500 to travel along the route 3514, as described below. The vehicle system 3500 may turn off one or more powered units 3504 prior to leaving on the trip if the vehicle system 3500 determines that the trip can be accomplished (e.g., the vehicle system 3500 can travel to the destination location) with less than all of the powered units 3504 acting to propel the vehicle system 3500. Turning off one or more of the powered units 3504 may allow the vehicle system 3500 to travel to the destination location of the trip while consuming less fuel and/or generating fewer emissions relative to traveling with all of the powered units 3504 being on for all or at least a portion of the trip.

The remote powered units 3504 supply tractive forces to propel the vehicle system 3500 along the route 3514 when the respective remote powered units 3504 are turned on. Conversely, the individual remote powered units 3504 withhold tractive forces and do not supply a tractive force to propel the vehicle system 3500 along the route 3514 when the respective remote powered units 3504 are turned off. The lead powered unit 3502 may control which of the remote powered units 3504 are turned on and which of the remote powered units 3504 are turned off based on a variety of factors. By way of example only, the lead powered unit 3502 may turn off some remote powered units 3504 while leaving other remote powered units 3504 on if the remote powered units 3504 that remain on are supplying sufficient tractive force to propel the vehicle system 3500 along the route 3514.

The lead powered unit 3502 communicates with the remote powered units 3504 in order to turn the remote powered units 3504 on or off. The lead powered unit 3502 may communicate instructions to the remote powered units 3504 via a wired connection 3520 and/or a wireless connection 3522 between the lead powered unit 3502 and the remote powered units 3504. By way of non-limiting example only, the wired connection 3520 may be a wire or group of wires, such as a trainline, electric multiple unit (eMU) line, MU cables, electrically controlled pneumatic (ECP) brake line, a distributed power (DP) communication line, and the like that extends through the powered units 3502, 3504 and non-powered units 3512 of the vehicle system 3500. The wireless connection 3522 may include radio frequency (RF) communication of instructions between the lead powered unit 3502 and one or more of the remote powered units 3504, such as a communication link provided by 220 data radios.

Figure 36:
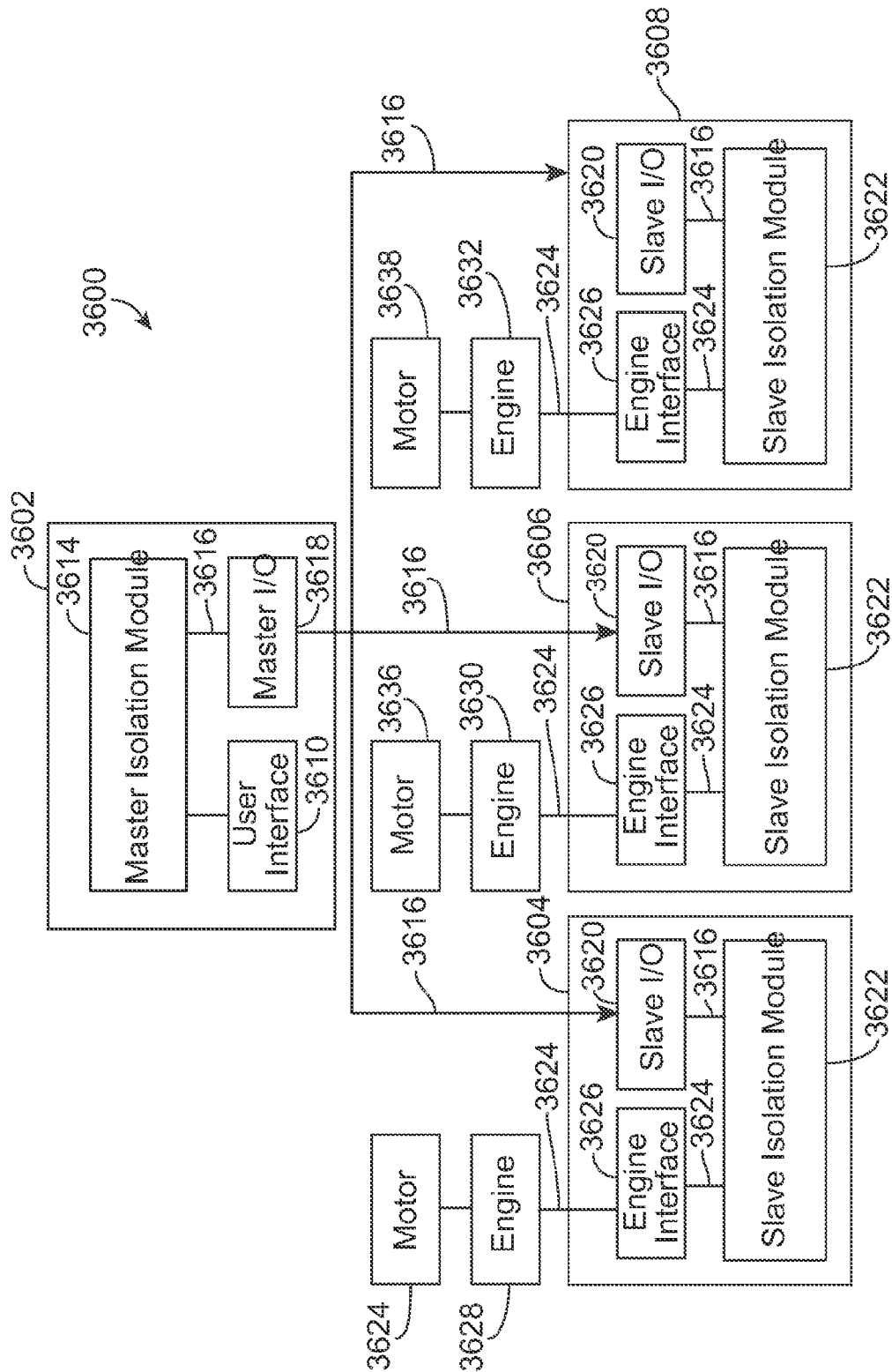
FIG. 36 is a schematic illustration of an isolation control system in accordance with one embodiment.

FIG. 36 is a schematic illustration of the isolation control system 3600 in accordance with one embodiment. The isolation control system 3600 enables an operator in the lead powered unit 3502 (shown in FIG. 35) to remotely change a powered or operational state of one or more of the remote powered units 3504 (shown in FIG. 35). The powered or operational state of one or more of the remote powered units 3504 may be an "on" operational state or mode, or an "off" operational state or mode based on whether power is supplied to (or by) engines 3628, 3630, 3632 of the remote powered units 3504. For example, a remote powered unit 3504 may be turned to an "off" state by shutting off power to the engine 3628 in the remote powered unit 3504. Depending on the type of engine involved, this may include one or more of the following: communicating with an engine controller or control system that the engine is to be turned off; shutting off a supply of electricity to the engine, where the electricity is required by the engine to operate (e.g., spark plug operation, fuel pump operation, electronic injection pump); shutting off a supply of fuel to the engine; shutting off a supply of ambient air or other intake air to the engine; restricting the output of engine exhaust; or the like. Turning the engine 3628, 3630, 3632 of a remote powered unit 3504 off may prevent the engine 3628, 3630, 3632 in the remote powered unit 3504 from generating electricity. (As should be appreciated, this assumes that the engine output is connected to a generator or alternator, as is common in a locomotive or other powered unit; thus, unless otherwise specified, the term "engine" refers to an engine system including an engine and alternator/generator.) If the engine 3628, 3630, 3632 is turned off and does not generate electricity, then the engine 3628, 3630, 3632 cannot generate electricity that is fed to one or more corresponding electric motors 3634, 3636, 3638 in the remote power units 3504, and the motors 3634, 3636, 3638 may be unable to move the axles and wheels of the remote powered unit 3504. (In this configuration, electric motors are connected to the vehicle axles, via a gear set, for moving the powered unit, while the engine is provided for generating electricity for electrically powering the motors.) In one embodiment, a remote powered unit 3504 is turned "off" by directing the engine 3628, 3630, 3632 in the remote powered unit 3504 to cease or stop supplying tractive effort. For example, the remote powered unit 3504 may be turned off by directing the engine 3628, 3630, 3632 of the remote powered unit 3504 to stop supplying electricity to the corresponding motor(s) 3634, 3636, 3638 of the remote powered unit 3504 that provide tractive effort for the remote powered unit 3504.

In another embodiment, a remote powered unit 3504 (shown in FIG. 35) may be turned off by completely shutting down the corresponding engine 3628, 3630, 3632 of the remote powered unit 3504. For example, the engine 3628, 3630, 3632 may be shut down such that the engine 3628, 3630, 3632 is no longer combusting, burning, or otherwise consuming fuel to generate electricity. A remote powered unit 3504 may be changed to an "off" state by temporarily shutting down the engine 3628, 3630, 3632 such that the engine 3628, 3630, 3632 is no longer combusting, burning, or otherwise consuming fuel to generate electricity but for periodic or non-periodic and relatively short time periods where the engine 3628, 3630, 3632 is changed to an "on" state in order to maintain a designated or predetermined engine temperature. The power that is supplied to the engine 3628, 3630, 3632 during the short time periods may be sufficient to cause the engine 3628, 3630, 3632 to combust some fuel while being insufficient to enable the engine 3628, 3630, 3632 to provide tractive effort to the corresponding remote powered unit 3504.

In one embodiment, the state of an engine 3628, 3630, 3632 of a remote powered unit 3504 (shown in FIG. 35) is changed to an "off" state when the power that is supplied by the engine 3628, 3630, 3632 is reduced below a threshold at which an Automatic Engine Start/Stop (AESS) system assumes control of the powered or operating state of the engine 3628, 3630, 3632. For example, the engine 3628 of the remote powered unit 3504 may be shut off by decreasing the power supplied by the engine 3628 to the motor 3634 until the supplied power falls below a predetermined threshold at which the AESS system takes over control of the engine 3628 and determines when to turn the engine 3628 completely off. Alternatively, the engines 3628, 3630, 3632 of the remote powered units 3504 may be individually turned on or off independent of an AESS system. For example, the engine 3628, 3630, 3632 of a remote powered unit 3510 may be turned on or off regardless of whether the engine 3628, 3630, 3632 is susceptible to control by an AESS system.

The isolation control system 3600 may remotely change the powered state of the engine(s) of one or more of the remote powered units 3504 (shown in FIG. 35) in accordance with one or more of the embodiments described above. The isolation control system 3600 includes a master isolation unit 3602 and several slave controllers 3604, 3606, 3608. In one embodiment, the master isolation unit 3602 is disposed in the lead powered unit 3502. Alternatively, only a part or subsection of the master isolation unit 3602 is disposed in the lead powered unit 3502. For example, a user interface 3610 of the master isolation unit 3602 may be located in the lead powered unit 3502 while one or more other components of the master isolation unit 3602 are disposed outside of the lead powered unit 3502. The slave controllers 3604, 3606, 3608 are disposed in one or more of the remote powered units 3504. For example, the slave controller 3604 may be located within the remote powered unit 3504, the slave controller 3606 may be disposed in the remote powered unit 3506, and the slave controller 3608 may be located at the remote powered unit 3508. The number of slave controllers 3604, 3606, 3608 in the isolation control system 3600 may be different from the embodiment shown in FIG. 36. Similar to the master isolation unit 3602, one or more components or parts of the slave controllers 3604, 3606, 3608 may be disposed outside of the corresponding remote powered units 3504. The master isolation unit 3602 and/or slave controllers 3604, 3606, 3608 may be embodied in one or more wired circuits with discrete logic components, microprocessor-based computing systems, and the like. As described below, the master isolation unit 3602 and/or the slave controllers 3604, 3606, 3608 may include microprocessors that enable the lead powered unit 3502 (shown in FIG. 35) to remotely turn the remote powered units 3504 on or off. For example, one or more microprocessors in the master isolation unit 3602 and/or slave controllers 3604, 3606, 3608 may generate and communicate signals between the master isolation unit and the slave controllers 3604, 3606, 3608 that direct one or more of the corresponding engines 3628, 3630, 3632 of the remote powered units 3504 to change the powered state of the engines 3628, 3630, 3632 from an "on" state to an "off" state, as described above.

The master isolation unit 3602 includes the user interface 3610 that accepts input from an operator of the master isolation unit 3602. For example, the user interface 3610 may accept commands or directions from an engineer or other operator of the lead powered unit 3502 (shown in FIG. 35). By way of non-limiting example only, the user interface 3610 may be any one or more of a rotary switch, a toggle switch, a touch sensitive display screen, a keyboard, a pushbutton, a software application or module running on a processor-based computing device, and the like. The operator inputs an isolation command 3612 into the user interface 3610. The isolation command 3612 represents a request by the operator to turn one or more of the remote powered units 3504 on and/or to turn one or more of the remote powered units 3504 off. The user interface 3610 communicates the operator's request to a master isolation module 3614.

The master isolation module 3614 receives the operator's request from the user interface 3610 and determines which ones of the remote powered units 3504 (shown in FIG. 35) are to be turned on and/or which ones of the remote powered units 3504 are to be turned off For example, the isolation command 3612 may request that a single remote powered unit 3506 be turned off or on. Alternatively, the isolation command 3612 may request that a group of the remote powered units 3504 be turned on or off. For example, the isolation command 3612 may select the remote powered units 3504 in a selected consist group 3516 and/or a distributed power group 3518 (shown in FIG. 35) be turned off or on. By way of non-limiting example only, the master isolation module 3614 may be embodied in any one or more of hardwired circuitry, rotary, or other types, of switches, a microprocessor based device, a software application or module running on a computing device, a discrete logic device, and the like. Based on the operator's request communicated via the isolation command 3612, the master isolation module 3614 conveys an isolation instruction 3616 to a master input/output (I/O) device 3618.

The master I/O device 3618 is a device that communicates the isolation instruction 3616 to the remote powered units 3504 (shown in FIG. 35) selected by the master isolation module 3614. For example, if the isolation command 3612 from the operator requests that one or more individual remote powered units 3504 be turned off or on, or that the remote powered units 3504 in a selected consist or distributed power group 3516, 3518 be turned off or on, the master I/O device 3618 communicates the isolation instruction 3616 to at least those remote powered units 3504 selected by the isolation command 3612. By way of non-limiting example only, the master I/O device 3618 may be embodied in one or more of a connector port that is electronically coupled with one or more wires joined with the remote powered units 3504 (such as a trainline), RF transmitter, a wireless transceiver, and the like. In one embodiment, the master I/O device 3618 conveys the isolation instruction 3616 to all of the remote powered units 3504 in the vehicle system 3500 (shown in FIG. 35). While the illustrated embodiment shows the isolation instruction 3616 being communicated in parallel to the slave controllers 3604, 3606, 3608, the isolation instruction 3616 may be serially communicated among the slave controllers 3604, 3606, 3608. For example, the master I/O device 3618 may serially convey the isolation instruction 3616 to the remote powered units 3504 along a trainline. The remote powered units 3504 that are to be turned on or off by the isolation instruction 3616 receive the isolation instruction 3616 and act on the isolation instruction 3616. The remote powered units 3504 that are not to be turned on or off by the isolation instruction 3616 ignore the isolation instruction 3616. For example, the remote powered units 3504 may include discrete logic components that are coupled with a trainline and that receive the isolation instruction 3616 when the isolation instruction 3616 relates to the remote powered units 3504 and ignores the isolation instruction 3616 when the isolation instruction 3616 does not relate to the remote powered units 3504.

In another embodiment, the master I/O device 3618 broadcasts the isolation instruction 3616 to all of the remote powered units 3504 (shown in FIG. 35) in the vehicle system 3500 (shown in FIG. 35). For example, the master I/O device 3618 may include a wireless transceiver that transmits data packets comprising the isolation instruction 3616 to the remote powered units 3504. Alternatively, the master I/O device 3618 may be an RF transmitter that transits a radio frequency signal that includes the isolation instruction 3616. The remote powered units 3504 may be associated with unique identifiers, such as serial numbers, that distinguish the remote powered units 3504 from one another. The isolation instruction 3616 may include or be associated with one or more of the unique identifiers to determine which of the remote powered units 3504 are to receive and act on the isolation instruction 3616. For example, if the unique identifier of a remote powered unit 3504 matches an identifier stored in a header of a data packet of the isolation instruction 3616 or communicated in the RF signal, then the remote powered unit 3504 having the mating unique identifier receives and acts on the isolation instruction 3616.

A slave input/output (I/O) device 3620 receives the isolation instruction 3616 from the master I/O device 3618. By way of non-limiting example only, the slave I/O devices 3620 may be embodied in one or more of a connector port that is electronically coupled with one or more wires joined with the lead powered unit 3502 (such as a trainline), an RF transmitter, a wireless transceiver, and the like. The slave I/O devices 3620 convey the isolation instruction 3616 to a slave isolation module 3622.

The slave isolation module 3622 receives the isolation instruction 3616 from the slave I/O device 3620 and determines if the corresponding remote powered unit 3504 (shown in FIG. 35) is to be turned on or off in response to the isolation instruction 3616. The slave isolation module 3622 may include logic components to enable the slave isolation module 3622 to determine whether the associated remote powered unit 3504 (shown in FIG. 35) is to obey or ignore the isolation instruction 3616. For example, the slave isolation modules 3622 may include one or more of hardwired circuitry, relay switches, a microprocessor based device, a software application or module running on a computing device, and the like, to determine if the associated remote powered unit 3504 is to act on the isolation instruction 3616.

If the slave isolation module 3622 determines that the corresponding remote powered unit 3504 (shown in FIG. 35) is to be turned on or off in response to the isolation instruction 3616, then the slave isolation module 3622 communicates an appropriate command 3624 to an engine interface device 3626. The engine interface device 3626 receives the command 3624 from the slave isolation module 3622 and, based on the command 3624, directs the engine 3628, 3630, 3632 of the corresponding remote powered unit 3504 to turn on or off. For example, the engine interface device 3626 associated with the remote powered unit 3504 may communicate the command 3624 to the engine 3628 of the remote powered unit 3504. By way of non-limiting example only, the engine interfaces 3626 may be embodied in one or more of a connector port that is electronically coupled with the engines 3628, 3630, 3632 via one or more wires. Upon receiving the command 3624 from the engine interfaces 3626, the engines 3628, 3630, 3632 may change operational states from "on" to "off," or from "off" to "on." As described above, in one embodiment, the engines 3628, 3630, 3632 may turn off and cease supplying electricity to a corresponding motor 3634, 3636, 3638 in order to cause the motor 3634, 3636, 3638 to supply or withhold application of tractive force. For example, if the engine 3630 receives a command 3624 directing the engine 3630 to turn off and the engine 3632 receives a command 3624 directing the engine 3632 to turn on, then the engine 3630 shuts down and stops providing electricity to the motor 3636, which in turn stops providing a tractive force to propel the vehicle system 3500 (shown in FIG. 35), while the engine 3632 turns on and begins supplying electricity to the motor 3638 to cause the motor 3638 to provide a tractive force to propel the vehicle system 3500.

In one embodiment, the engine 3628, 3630, 3632 turns on or off within a predetermined time period. For example, an engine 3628 that is used to supply tractive effort may shut off within a predetermined time period after the slave isolation module 3622 receives the isolation instruction 3616. The predetermined time period may be established or set by an operator of the system 3600. The turning on or off of the engine 3628, 3630, 3632 within a predetermined time period after the slave isolation module 3622 receives the isolation instruction 3616 may permit an operator in the lead powered unit 3502 (shown in FIG. 35) to send the isolation instruction 3616 to the remote powered units 3504 (shown in FIG. 35) to turn off the engines 3628, 3630, 3632 immediately, or at least relatively soon after the isolation command 3612 is input into the user interface 3610. For example, the slave isolation modules 3622 may turn off the engines 3628, 3630, 3632 without waiting for the engines 3628, 3630, 3632 to cool down to a threshold temperature.

The master isolation unit 3602 may convey additional isolation instructions 3616 to the slave controllers 3604, 3606, 3608 during a trip. A trip includes a predetermined route between two or more waypoints or geographic locations over which the vehicle system 3500 (shown in FIG. 35) moves. For example, an operator in the lead powered unit 3502 (shown in FIG. 35) may periodically input isolation commands 3612 into the master isolation unit 3602 to vary the total amount of tractive force supplied by the powered units 3502, 3504 (shown in FIG. 35). The operator may vary the number and/or type of powered units 3502, 3504 being used to supply tractive force to propel the vehicle system 3500 during the trip in order to account for various static or dynamically changing factors and parameters, such as, but not limited to, a speed limit of the vehicle system 3500, a changing grade and/or curvature of the route 3514 (shown in FIG. 35), the weight of the vehicle system 3500, a distance of the trip, a distance of a segment or subset of the trip, a performance capability of one or more of the powered units 3502, 3504, a predetermined speed of the vehicle system 3500, and the like.

Figure 37:
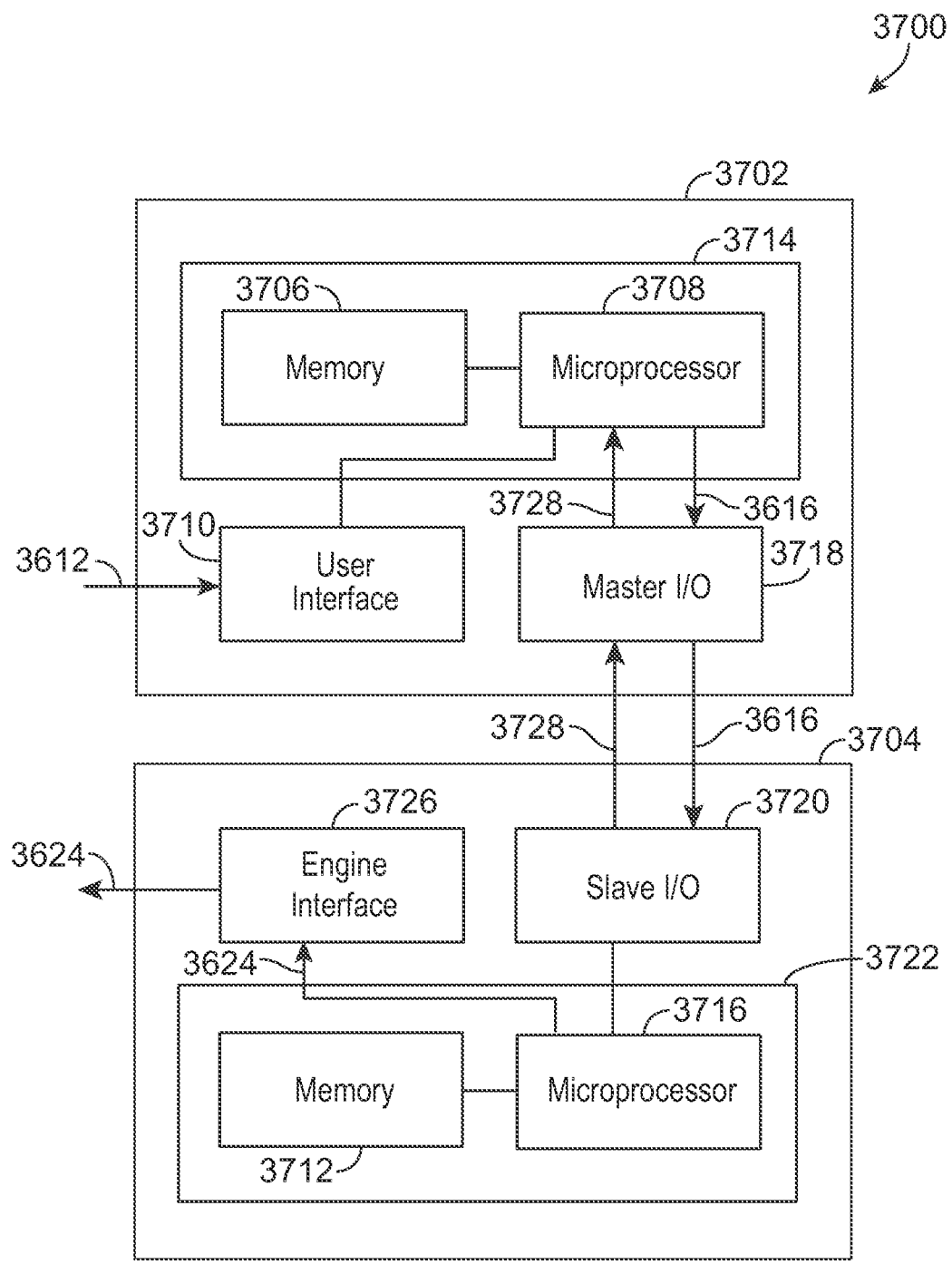
FIG. 37 is a schematic diagram of an isolation control system in accordance with another embodiment.

FIG. 37 is a schematic diagram of an isolation control system 3702 in accordance with another embodiment. The control system 3702 may be similar to the control system 3600 (shown in FIG. 376). For example, the control system 3702 may be used to remotely turn one or more remote powered units 3504 (shown in FIG. 375) on or off from the lead powered unit 3502 (shown in FIG. 375). The control system 3702 is a microprocessor-based control system. For example, the control system 3702 includes one or more microprocessors 3708, 3720 that permit an operator to manually turn one or more of the remote powered units 3504 on or off. Additionally, the control system 3702 may be utilized to automatically turn one or more of the remote powered units 3504 on or off.

The control system 3702 includes a master isolation unit 3704 and a slave controller 3704. The master isolation unit 3704 may be similar to the master isolation unit 3602 (shown in FIG. 376). For example, the master isolation unit 3704 includes a master isolation module 3714, a user interface 3710, and a master I/O device 3718. The user interface 3710 may be the same as, or similar to, the user interface 3610 (shown in FIG. 376) and the master I/O device 3718 may be the same as, or similar to, the master I/O device 3618 (shown in FIG. 376). The master isolation module 3714 includes a memory 3706 and a microprocessor 3708. The memory 3706 represents a computer readable storage device or medium. The memory 3706 may include sets of instructions that are used by the microprocessor 3708 to carry out one or more operations. By way of example only, the memory 3706 may be embodied in one or more of an electrically erasable programmable read only memory (EEPROM), a read only memory (ROM), a programmable read only memory (PROM), an erasable programmable read only memory (EPROM), or FLASH memory. The microprocessor 3708 represents a processor, microcontroller, computer, and/or other electronic computing or control device (e.g., a circuit or circuitry) that is configured to execute executing instructions stored on the memory 3706. (Thus, unless otherwise specified, the term "microprocessor" includes any of the aforementioned devices.)

The slave controller 3704 may be similar to one or more of the slave controllers 3604, 3606, 3608 (shown in FIG. 376). For example, the slave controller 3704 includes a slave isolation module 3722, an engine interface 3726, and a slave I/O device 3720. The engine interface 3726 may be the same as, or similar to, the engine interface 3626 (shown in FIG. 376) and the slave I/O device 3720 may be the same as, or similar to, the slave I/O device 3620 (shown in FIG. 376). The slave isolation module 3722 may include a memory 3712 and a microprocessor 3716. Alternatively, one or more of the slave controllers 3704 in the remote powered units 3504 (shown in FIG. 375) does not include memories 3712 and/or microprocessors 3716. The memory 3712 may be the same as, or similar to, the memory 3706 in the master isolation module 3714 and the microprocessor 3716 may be the same as, or similar to, the microprocessor 3708 in the master isolation module 3714.

In operation, the master isolation unit 3704 remotely turns the engines 3628, 3630, 3632 (shown in FIG. 376) on or off in a manner similar to the master isolation unit 3602 (shown in FIG. 376). The user interface 3710 receives the isolation command 3612 and communicates the isolation command 3612 to the microprocessor 3708 of the master isolation module 3714. The master isolation module 3714 receives the isolation command 3612 and determines which remote powered units 3504 (shown in FIG. 375) are to be turned on or off based on the isolation command 3612. The master isolation module 3714 may query the memory 3706 to determine which remote powered units 3504 to turn on or off. For example, if the isolation command 3612 requests that the remote powered units 3504 in a selected consist or distributed power group 3516, 3518 (shown in FIG. 375) be turned off, the microprocessor 3708 may request a list of the remote powered units 3504 that are in the selected consist or distributed power group 3516, 3518. The master isolation module 3714 then sends the isolation instruction 3616 to the master I/O device 3718, which conveys the isolation instruction 3616 to the selected remote powered units 3504. For example, the microprocessor 3708 may direct the master I/O device 3718 to communicate the isolation instruction 3616 only to the remote powered units 3504 selected by the isolation command 3612. In another example, the microprocessor 3708 may embed identifying information in the isolation command 3612. As described above, the identifying information may be compared to a unique identifier associated with each remote powered unit 3504 to determine which of the remote powered units 3504 are to act on the isolation instruction 3616.

In one embodiment, the master isolation module 3714 automatically generates the isolation instruction 3616 and communicates the isolation instruction 3616 to one or more of the remote powered units 3504 (shown in FIG. 375). For example, the master isolation module 3714 may determine a tractive effort needed or required to propel the vehicle system 3500 (shown in FIG. 375) along a trip or a segment of the trip. The microprocessor 3708 may calculate the required tractive effort from information and data stored in the memory 3706. By way of example only, the microprocessor 3708 may obtain and determine the required tractive effort based on the distance of the trip, the distance of one or more of the trip segments, the performance capabilities of one or more of the powered units 3502, 3504 (shown in FIG. 375), the curvature and/or grade of the route 3514 (shown in FIG. 375), transit times over the entire trip or a trip segment, speed limits, and the like.

As the vehicle system 3500 (shown in FIG. 375) moves along the route 3514 (shown in FIG. 375) during the trip, the microprocessor 3708 of the master isolation module 3714 may adaptively generate and communicate isolation instructions 3616 to the slave controllers 3704 of the remote powered units 3504 (shown in FIG. 375) to vary which of the remote powered units 3504 are turned on or off. During some segments of a trip, the required tractive effort may increase. For example, if the grade of the route 3514 or the speed limit increases, the microprocessor 3708 may determine that additional remote powered units 3504 need to be turned on to increase the total tractive force provided by the powered units 3502, 3504 (shown in FIG. 375). The microprocessor 3708 may automatically generate an isolation instruction 3616 that turns on one or more remote powered units 3504 that previously were turned off. Alternatively, during other segments of a trip, the required tractive effort may decrease. For example, if the grade of the route 3514 or the speed limit decreases, the microprocessor 3708 may determine that fewer remote powered units 3504 are needed to propel the vehicle system 3500. The microprocessor 3708 may automatically generate an isolation instruction 3616 that turns off one or more remote powered units 3504 that previously were turned on. The selection of which remote powered units 3504 are turned on or off may be based on the performance capabilities of the remote powered units 3504. The performance capabilities may include the tractive force provided by the various remote powered units 3504, the rate at which the remote powered units 3504 burn fuel, an exhaust emission of the remote powered units 3504, an EPA Tier level of the remote powered units 3504, the horsepower to weight ratio of the remote powered units 3504, and the like.

The slave controllers 3704 of one or more of the remote powered units 3504 (shown in FIG. 375) receive the isolation instruction 3616 and, based on the isolation instruction 3616, turn the corresponding engines 3628, 3630, 3632 (shown in FIG. 376) on or off, similar to as described above. In one embodiment, the microprocessors 3716 in the slave controllers 3704 receive the isolation instruction 3616 and determine if the isolation instruction 3616 applies to the corresponding remote powered unit 3504. For example, the microprocessor 3716 may compare identifying information in the isolation instruction 3616 to a unique identifier stored in the memory 3712 and associated with the corresponding remote powered unit 3504. If the identifying information and the unique identifier match, the microprocessor 3716 generates and communicates the command 3624 to the engine interface 3726. As described above, the engine interface 3726 receives the command 3624 and turns the associated engine 3628, 3630, 3632 on or off based on the command 3624.

In one embodiment, the slave controller 3704 of one or more of the remote powered units 3504 (shown in FIG. 375) provides feedback 3728 to the master isolation unit 3704. Based on the feedback 3728, the master isolation unit 3704 may automatically generate and communicate isolation instructions 3616 to turn one or more of the remote powered units 3504 on or off. Alternatively, the master isolation unit 3704 may determine a recommended course of action based on the feedback 3728 and report the recommended course of action to an operator. For example, the master isolation unit 3704 may display several alternative courses of action on a display device that is included with or communicatively coupled with the user interface 3710. An operator may then use the user interface 3710 to select which of the courses of action to take. The master isolation module 3714 then generates and communicates the corresponding isolation instruction 3616 based on the selected course of action.

The feedback 3728 may include different amounts of fuel that are consumed or burned by the remote powered units 3504 (shown in FIG. 375). For example, the microprocessor 3716 in at least one of the remote powered units 3504 may calculate the various amounts of fuel that will be consumed by the powered units 3502, 3504 (shown in FIG. 375) of the vehicle system 3500 (shown in FIG. 375) over a time period with different combinations of the powered units 3502, 3504 turned on or off. In one embodiment, a microprocessor 3716 in each consist group 3516 (shown in FIG. 375) and/or distributed power group 3518 (shown in FIG. 375) calculates the amount of fuel that will be consumed by the vehicle system 3500 with the remote powered units 3504 in the corresponding consist or distributed power group 3516, 3518 turned on and the amount of fuel that will be consumed by the vehicle system 3500 with the remote powered units 3504 in the consist or distributed power group 3516, 3518 turned off. The calculated amounts of fuel are conveyed to the slave I/O device 3720 and reported to the master isolation unit 3704 as the feedback 3728. Based on the feedback 3728, the master isolation unit 3704 determines whether to turn on or off one or more of the remote powered units 3504. For example, each consist group 3516 and/or distributed power group 3518 may provide feedback 3728 that notifies the master isolation unit 3704 of the different amounts of fuel that will be consumed if the various groups 3516, 3518 are turned on or off. The microprocessor 3708 in the master isolation unit 3704 examines the feedback 3728 and may generate automated isolation instructions 3616 to turn one or more of the remote powered units 3504 on or off based on the feedback 3728.

As described above and as an alternative to microprocessor-based remote control of which remote powered units 3504 (shown in FIG. 375) are turned on or off, the control system 3600 (shown in FIG. 376) may use various circuits and switches to communicate the isolation instructions 3616 (shown in FIG. 376) and to determine whether particular remote powered units 3504 are to act on the isolation instructions 3616. By way of example only, the powered units 3502, 3504 (shown in FIG. 375) may include rotary switches that are joined with a trainline extending through the vehicle system 3500. Based on the positions of the rotary switches, the remote powered units 3504 may be remotely turned on or off from the lead powered unit 3502. For example, if the rotary switches in each of the lead powered unit 3502 and the remote powered units 3504, 3506 are in a first position while the rotary switches in the remote powered units 3508, 3510 are in a second position, then the isolation instruction 3616 is acted on by the remote powered units 3504, 3506 while the remote powered units 3508, 3510 ignore the isolation instruction 3616.

Figure 38:
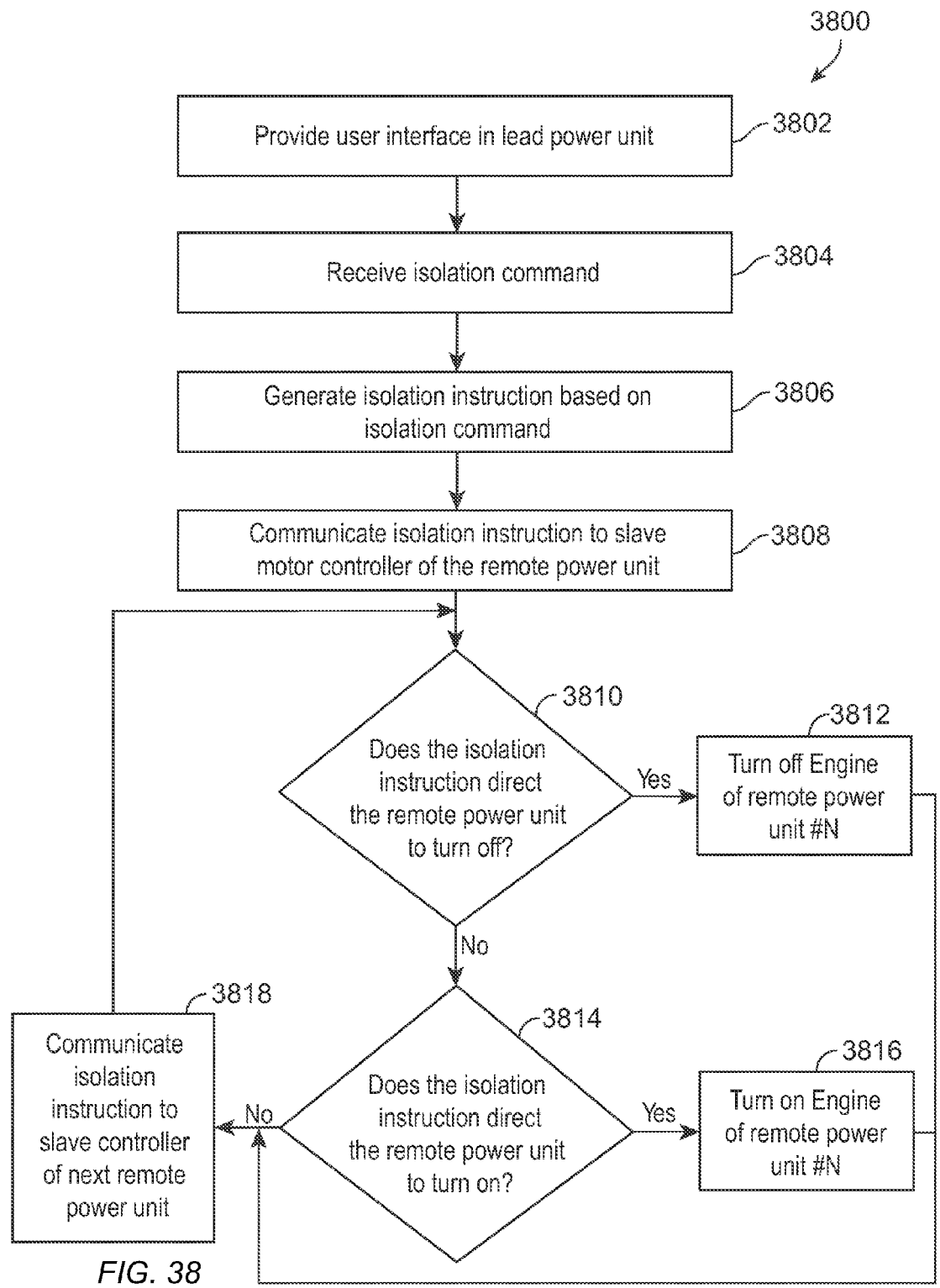
FIG. 38 is a flowchart for a method of controlling a rail vehicle system that includes a lead powered unit and a remote powered unit in accordance with one embodiment.

FIG. 38 is a flowchart for a method 3800 of controlling a train that includes a lead powered unit and a remote powered unit in accordance with one embodiment. For example, the method 3800 may be used to permit an operator in the lead powered unit 3502 (shown in FIG. 35) to remotely turn one or more of the remote powered units 3504 (shown in FIG. 35) on or off.

At 3802, a user interface is provided in the lead powered unit. For example, the user interface 3610, 3710 (shown in FIGS. 36 and 27) may be provided in the lead powered unit 3502. The master isolation unit 3602, 3704 (shown in FIGS. 36 and 37) also may be provided in the lead powered unit 3502. At 3804, an isolation command is received by the user interface. For example, the isolation command 3612 may be received by the user interface 3610 or 3710.

At 3806, an isolation instruction is generated based on the isolation command. For example, the isolation instruction 3616 (shown in FIG. 36) may be generated by the master isolation module 3614, 3714 (shown in FIGS. 36 and 37) based on the isolation command 3612. At 3808, 3810, 3812, 3814, 3816, 3818, the isolation instruction is communicated to the slave controllers of the remote powered units in a serial manner. For example, the isolation instruction 3616 is serially communicated among the remote powered units 3504 (shown in FIG. 35). Alternatively, the isolation instruction 3616 is communicated to the slave controllers 3604, 3606, 3608, 3704 (shown in FIGS. 36 and 37) of the remote powered units 3504 in parallel.

At 3808, the isolation instruction is communicated to the slave controller of one of the remote powered units. For example, the isolation instruction 3616 (shown in FIG. 36) may be communicated to the slave controller 3604, 3704 (shown in FIGS. 36 and 37) of the remote powered unit 3504 (shown in FIG. 35). At 3810, the isolation instruction is examined to determine if the isolation instruction directs the slave controller that received the isolation instruction to turn off the engine of the corresponding remote powered unit. If the isolation instruction does direct the slave controller to turn off the engine, flow of the method 3800 continues to 3812. At 3812, the engine of the remote powered unit is turned off and flow of the method 3800 continues to 3818. On the other hand, if the isolation instruction does not direct the slave controller to turn the engine off, flow of the method 3800 continues to 3814. For example, the isolation instruction 3616 may be examined by the slave isolation module 3622, 3722 (shown in FIGS. 36 and 37) of the remote powered unit 3504 to determine if the isolation instruction 3616 directs the remote powered unit 3504 to turn off. If the isolation instruction 3616 directs the remote powered unit 3504 to turn off, the slave controller 3604, 3704 directs the engine 3628 (shown in FIG. 376) of the remote powered unit 3504 to turn off. Otherwise, the slave controller 3604, 3704 does not direct the engine 3628 to turn off.

At 3814, the isolation instruction is examined to determine if the isolation instruction directs the slave controller that received the isolation instruction to turn on the engine of the corresponding remote powered unit. If the isolation instruction does direct the slave controller to turn on the engine, flow of the method 3800 continues to 3816. At 3816, the engine of the remote powered unit is turned on. For example, the isolation instruction 3616 (shown in FIG. 36) may be examined by the slave isolation module 3622, 3722 (shown in FIGS. 36 and 37) of the remote powered unit 3504 (shown in FIG. 35) to determine if the isolation instruction 3616 directs the remote powered unit 3504 to turn on. If the isolation instruction 3616 directs the remote powered unit 3504 to turn on, the slave controller 3604, 3704 directs the engine 3628 (shown in FIG. 36) of the remote powered unit 3504 to turn on. On the other hand, if the isolation instruction does not direct the slave controller to turn the engine on, flow of the method 3800 continues to 3818.

At 3818, the isolation instruction is communicated to the slave controller of the next remote powered unit. For example, after being received and examined by the slave controller 3604, 3704 (shown in FIGS. 36 and 37) of the remote powered unit 3504 (shown in FIG. 35), the isolation instruction 3616 is conveyed to the slave controller 3604, 3704 of the remote powered unit 3506 (shown in FIG. 35). Flow of the method 3800 may then return to 3810, where the isolation instruction is examined by the next remote powered unit in a manner similar to as described above. The method 3800 may continue in a loop-wise manner through 3810-3818 until the remote powered units have examined and acted on, or ignored, the isolation instruction.

In another embodiment, the method 3800 does not communicate and examine the isolation instructions in a serial manner through the remote powered units. Instead, the method 3800 communicates the isolation instruction to the remote powered units in a parallel manner. For example, each of the remote powered units 3504 (shown in FIG. 35) may receive the isolation instruction 3616 (shown in FIG. 36) in parallel and act on, or ignore, the isolation instruction 3616 in a manner described above in connection with 3810, 3812, 3814.

Figure 39:
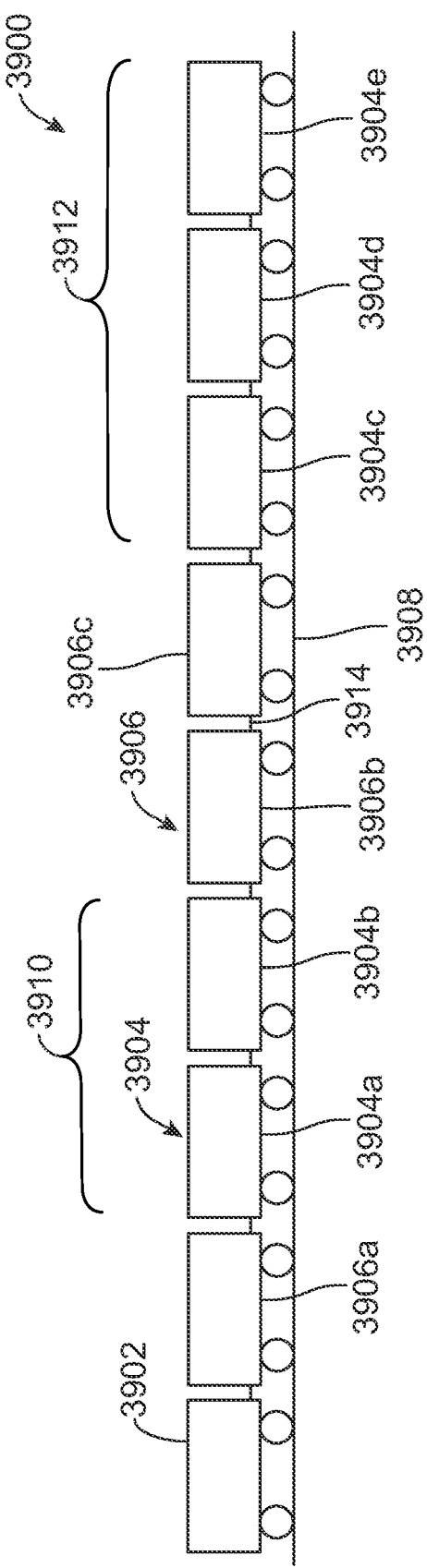
FIG. 39 is a schematic illustration of another embodiment of a vehicle system.

FIG. 39 is a schematic illustration of another embodiment of a vehicle system 3900. The vehicle system 3900 is shown as being a train, but alternatively may be formed from one or more other types of vehicles. The vehicle system 3900 may be similar or identical to one or more of the other vehicle systems or consists described herein, such as the vehicle system 3500 shown in FIG. 35, and can include a lead vehicle or powered unit 3902 coupled with several remote vehicles or powered units 3904 (e.g., 3904*a-e*) and non-powered vehicles or units 3906 (e.g., 3906*a-c*). The lead vehicle 3902 and remote vehicles 3904 may be referred to as powered vehicles or powered units as the lead vehicle 3902 and remote vehicles 3904 are capable of generating tractive efforts for self propulsion. For example, the lead vehicle 3902 and remote vehicles 3904 may be locomotives traveling along a route 3908 (e.g., a track). The non-powered vehicles 3906 may be incapable of generating tractive efforts for self propulsion. For example, the non-powered vehicles 3906 may be cargo cars that carry goods and/or persons along the route 3908. The number of vehicles 3902, 3904, 3906 shown in FIG. 39 is provided as an example and is not intended to limit all embodiments of the subject matter described herein.

The remote vehicles 3904 are arranged in motive power groups to define vehicle consists 3910, 3912. The remote vehicles 3904 in a consist 3910 and/or 3912 may be mechanically and/or logically linked together to provide tractive effort and/or braking effort to propel and/or stop movement of the vehicle system 3900. In one embodiment, the lead vehicle 3902 coordinates control of the remote vehicles 3904 in the consists 3910, 3912 to control a net or total tractive effort and/or braking effort of the vehicle system 3900. For example, the vehicle system 3900 may operate in a distributed power (DP) mode of operation where the lead vehicle 3902 remotely directs the tractive efforts and/or braking efforts of the remote vehicles 3904 in the consists 3910, 3912 from the lead vehicle 3902. In the illustrated embodiment, the lead vehicle 3902 is interconnected with, but spaced apart from, the consists 3910, 3912 by one or more non-powered vehicles 3906.

The lead vehicle 3902 and the remote vehicles 3904 are communicatively coupled with each other by one or more wired and/or wireless connections or communication links. As used herein, the term "communicatively coupled" means that two components are able to communicate (e.g., transmit and/or receive) data with each other by wired and/or wireless connections. For example, the lead vehicle 3902 may communicate with one or more of the remote vehicles 3904 via a wireless network. Alternatively, or additionally, the lead vehicle 3902 may be conductively coupled with the remote vehicles 3904 by one or more tangible communication pathways 3914, such as conductive wires or cables (e.g., multiple unit or MU cable bus), fiber optic cables, and the like. As described below, the lead vehicles 3902 and the remote vehicles 3904 may communicate with each other using electrically powered communication devices. The communication devices can include transceivers and/or antennas that communicate data (e.g., network or packetized data or non-network data) between each other through one or more of the communication links between the communication devices.

One or more of the communication devices in the consists 3910, 3912 may be powered by the remote vehicles 3904. For example, each of the remote vehicles 3904 in the consists 3910, 3912 can include a propulsion subsystem that generates electric current to, among other things, power traction motors to propel the vehicle system 3900 and/or power communication devices disposed on-board the remote vehicles 3904. Alternatively, one or more of the communication devices in the consists 3910, 3912 may be powered from an off-board power source, such as a source of electric current that is not located on the vehicle system 3900. For example, the communication devices may receive electric current from a utility power grid via an overhead catenary, a powered third rail, or the like.

During travel of the vehicle system 3900 along the route 3914 for a trip, the vehicle system 3900 may demand less tractive effort than can be provided by the coordinated efforts of the lead powered unit 3902 and the remote powered units 3904. For example, the vehicle system 3900 may be traveling ahead of a schedule and may need to slow down to be back on schedule, the vehicle system 3900 may be traveling down a decline in the route 3914, the vehicle system 3900 may have burned fuel and/or dropped off cargo such that the weight of the vehicle system 3900 is less and less tractive effort is required to propel the vehicle system 3900, and the like. In order to provide less tractive effort, one or more of the remote powered units 3904 may turn off, such as by deactivating the propulsion subsystem on the remote powered unit 3904 so that the propulsion subsystem is not generating electric current to power traction motors and/or a communication device on the remote powered unit 3904.

In one embodiment, one or more of the remote powered units 3904 may switch from an ON mode of operation to an OFF mode of operation while the vehicle system 3900 is moving along the route 3914. In the ON mode, the propulsion subsystem of a remote powered unit 3904 is turned on and activated such that the propulsion subsystem generates electric current to power propulsion devices (e.g., traction motors) that provide tractive effort and/or a communication device disposed on-board the remote powered unit 3904. In the OFF mode, the propulsion subsystem of the remote powered unit 3904 may be turned off and deactivated such that the propulsion subsystem does not generate electric current to power the propulsion devices and/or the communication device. As a result, a communication link between the communication device of the remote powered unit 3904 that is in the OFF mode and the lead powered unit 3902 may be broken or interrupted.

Alternatively, in the OFF mode of operation, the propulsion subsystem of a remote powered unit 3904 may be placed into idle instead of turned off and deactivated. By "idle," it is meant that the propulsion subsystem remains active to produce electric current to power a communication device such that a communication link between the consist that includes the remote powered unit 3904 and the lead powered unit 3902 remains active, but the propulsion subsystem does not produce electric current to propel the remote powered unit 3904. For example, the propulsion subsystem may not produce sufficient electric current to power traction motors that propel the remote powered unit 3904.

As described above, the lead powered unit 3902 may control or direct the tractive efforts of the remote powered units 3904 in the consists 3910, 3912 by sending instructions to the communication devices of one or more of the remote powered units 3904 in the consists 3910, 3912. When one or more of the remote powered units 3904 in a consist 3910 and/or 3912 are switched to the OFF mode of operation, at least one of the communication devices of the remote powered units 3904 in the consist 3910 and/or 3912 remains on and powered such that the lead powered unit 3902 can continue to communicate with the remote powered units 3904 in the consists 3910, 3912 that are operating in the ON mode of operation.

For example, if the remote powered unit 3904A of the consist 3910 switches to the OFF mode of operation, the other remote powered unit 3904B in the consist 3910 may remain in the ON mode of operation so that the communication device of the remote powered unit 3904B can continue to communicate with the lead powered unit 3902 and the lead powered unit 3902 can continue to control the tractive efforts and/or braking efforts of the remote powered unit 3904B. In another example, if the remote powered units 3904C and 3904E of the consist 3912 switch to the OFF mode of operation, the other remote powered unit 3904D in the consist 3912 may remain in the ON mode of operation so that the communication device of the remote powered unit 3904D can continue to communicate with the lead powered unit 3902 and the lead powered unit 3902 can continue to control the tractive efforts and/or braking efforts of the remote powered unit 3904D.

In one embodiment, when one or more remote powered units 3904 of the vehicle system 3900 switch to the OFF mode of operation, at least one remote powered unit 3904 in each consist 3910, 3912 remains in the ON mode of operation to power at least one communication device in each consist 3910, 3912. For example, at least one communication device continues to receive electric current generated by a remote powered unit 3904 such that the lead powered unit 3902 can continue to issue control instructions to the remote powered units 3904 in the ON mode of operation. The remote powered unit 3904 in each consist 3910, 3912 that remains in the ON mode of operation may be the same remote powered unit 3904 that has the communication device that communicates with the lead powered unit 3902 to receive the control instructions from the lead powered unit 3902 to remotely control tractive efforts and/or braking efforts of the remote powered unit 3904. For example, if the remote powered unit 3904C has the communication device that is configured to receive control instructions from the lead powered unit 3902, then the remote powered unit 3904C may remain in the ON mode of operation while the remote powered unit 3904D and/or the remote powered unit 3904E turn to the OFF mode of operation. By "remotely control," it is meant that the lead powered unit 3902 controls the remote powered units 3904 from a location that is disposed off-board the remote powered units 3904.

Alternatively, the remote powered unit 3904 in each consist 3910, 3912 that remains in the ON mode of operation may be a different remote powered unit 3904 that has the communication device that communicates with the lead powered unit 3902 to receive the control instructions from the lead powered unit 3902 to remotely control tractive efforts and/or braking efforts of the remote powered unit 3904. For example, if the remote powered unit 3904C has the communication device that is configured to receive control instructions from the lead powered unit 3902, then the remote powered unit 3904D and/or the remote powered unit 3904E may remain in the ON mode of operation and supply electric current to the communication device to power the communication device (e.g., through one or more conductive pathways extending between the remote vehicles) while the remote powered unit 3904C switches to the OFF mode of operation.

In one embodiment, by keeping at least one communication device of each consist 3910, 3912 on and activated, one or more remote powered units 3904 in the consist 3910 and/or 3912 may switch to the OFF mode of operation while the communication device can continue to receive control instructions from the lead powered unit 3902 for the remote powered units 3904 that are in the ON mode of operation. The vehicle system 3900 can continue to travel along the route 3914 with different remote powered units 3904 switching between ON and OFF modes of operation to, among other things, reduce the fuel consumed by the vehicle system 3900.

Figure 40:
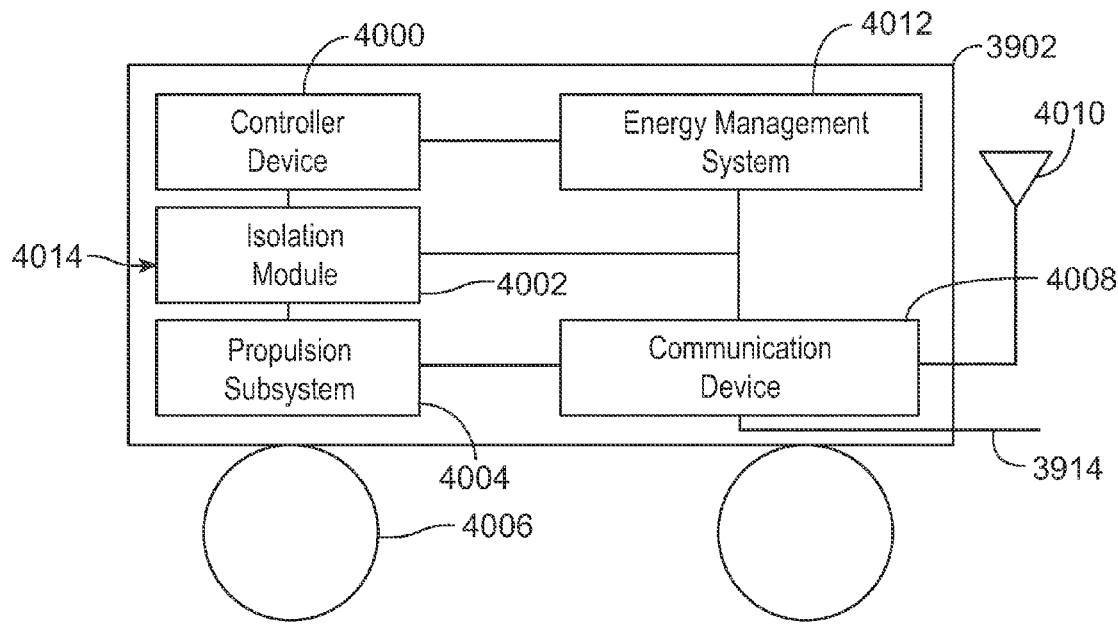
FIG. 40 is a schematic illustration of one embodiment of a lead powered unit in the vehicle system shown in FIG. 39.

FIG. 40 is a schematic illustration of one embodiment of the lead powered unit 3902 in the vehicle system 3900 shown in FIG. 39. The lead powered unit 3902 includes a controller device 4000 that forms the control instructions used to direct the tractive efforts and/or braking efforts of the remote powered units 3904 (shown in FIG. 39). For example, in a DP operation of the vehicle system 3900, the controller device 4000 can form data messages that are communicated to the remote powered units 3904 and that direct the remote powered units 3904 to change the tractive efforts and/or braking efforts provided by the remote powered units 3904. The controller device 4000 can include one or more input/output devices that enable a human operator to manually control the tractive efforts and/or braking efforts of the lead powered unit 3902 and/or remote powered units 3904.

The lead powered unit 3902 includes an isolation control system 4014 that can be used to electrically isolate one or more remote powered units 3904 (shown in FIG. 39) in the consist 3910 and/or 3912 (shown in FIG. 39). In one embodiment, the isolation control system 4014 may be similar to the isolation control systems shown in FIGS. 36 and 27. In the illustrated embodiment, the isolation control system 4014 includes an isolation module 4002 and a communication device 4008. The isolation module 4002 determines which remote powered units 3904 (shown in FIG. 39) to switch between the ON mode of operation and OFF mode of operation and/or when to switch the mode of operation of the remote powered units 3904. The isolation module 4002 can make this determination based on a variety of factors. In one embodiment, the isolation module 4002 can decide to turn one or more of the remote powered units 3904 to the OFF mode of operation based on an amount of fuel carried by the vehicle system 3900. For example, the isolation module 4002 may determine that a first remote powered unit 3904 is to be turned to the OFF mode of operation while at least a second remote powered unit 3904 remains in the ON mode of operation such that the first remote powered unit 3904 maintains at least a threshold volume or amount of fuel for use by the propulsion subsystem on the first remote powered unit 3904. The isolation module 4002 may keep the second remote powered unit 3904 in the ON mode of operation until the volume or amount of fuel carried by the second remote powered unit 3904 reaches the same or a different threshold volume or amount of fuel. The isolation module 4002 can then switch the first remote powered unit 3904 to the ON mode of operation and the second remote powered unit 3904 to the OFF mode of operation.

The isolation module 4002 can continue to switch which remote powered units 3904 are in the ON mode of operation and which remote powered units 3904 are in the OFF mode of operation to achieve a desired distribution of fuel being carried by the remote powered units 3904 along the length of the vehicle system 3900. For example, the isolation module 4002 can vary which remote powered units 3904 are in the different modes of operation for different periods of time such that the amount of fuel carried by each remote powered unit 3904 is within a predetermined percentage or fraction of each other (e.g., and the distribution of fuel being carried is approximately equal or balanced throughout the length of the vehicle system 3900). Alternatively, the isolation module 4002 may change the modes of operation over time such that a subset of the remote powered units 3904 located in a particular area of the vehicle system 3900 (e.g., the consist 3910) carry a different amount of fuel relative to a different subset of the remote powered units 3904 in a different area of the vehicle system 3900 (e.g., the consist 3912). A distribution of fuel being carried by the remote powered units 3904 along the length of the vehicle system 3900 may be expressed as a volume or amount of fuel carried by the remote powered units 3904 at each location of the remote powered units 3904 in the vehicle system 3900. For example, such a distribution may be expressed as "First Remote Powered Unit 3904A carrying 5,000 pounds of fuel; Second Remote Powered Unit 3904B carrying 3,000 pounds of fuel; Third Remote Powered Unit 3904C carrying 4,000 pounds of fuel" and so on.

The lead powered unit 3902 includes a propulsion subsystem 4004 that provides tractive effort and/or braking effort of the lead powered unit 3902. As described below in connection with the remote powered units 3904 (shown in FIG. 39), the propulsion subsystem 4004 can include an engine that consumes fuel to rotate a shaft connected to an electrical alternator or generator, which generates electric current to power traction motors of the lead powered unit 3902. The traction motors can rotate axles and/or wheels 4006 of the lead powered unit 3902 to propel the lead powered unit 3902. The propulsion subsystem 4004 can include brakes (e.g., air brakes or regenerative/resistive brakes) that slow or stop movement of the lead powered unit 3902.

The lead powered unit 3902 includes the communication device 4008 that communicates with one or more of the remote powered units 3904 (shown in FIG. 39). For example, the communication device 4008 may transmit the control instructions from the controller device 4000 to the remote powered units 3904 so that the lead powered unit 3902 can control the tractive efforts and/or braking efforts of the remote powered units 3904. The communication device 4008 may include a transceiver device or transmitter that is conductively coupled with the communication pathway 3914 (e.g., a cable bus or MU cable bus). The communication device 4008 can communicate the control instructions to the remote powered units 3904 through the communication pathway 3914. Alternatively or additionally, the communication device 4008 may be coupled with an antenna 4010 to wirelessly transmit the control instructions to the remote powered units 3904, such as over a wireless network between the antenna 4010 and the remote powered units 3904.

In one embodiment, the controller device 4000 may cause a responsive action to be taken when a communication interruption event occurs. A communication interruption event can occur when a communication link between the communication device 4008 and one or more of the consists 3910, 3912 (shown in FIG. 39) is interrupted or broken. For example, if the communication device 4008 loses or is otherwise unable to communicate control instructions with communication devices of the consists 3910, 3912 such that the controller device 4000 is unable to continue remotely controlling the remote powered units 3904 in the consists 3910, 3912, then the controller device 4000 may cause a responsive action to be taken. A "broken" or "interrupted" communication link may be more than a temporary or transient interruption in communication. For example, a broken or interrupted communication link may exist when the lead powered unit 3902 transmits one or more control instructions to a remote powered unit 3904 and does not receive a confirmation or response from the remote powered unit 3904 within a predetermined period of time, such as within one second, ten seconds, one minute, four minutes, or the like.

The responsive action that is taken may be a penalty or an emergency response, such as to apply brakes of the lead powered unit 3902, remote powered units 3904, and/or non-powered powered units 3906 (shown in FIG. 39) to stop or slow movement of the vehicle system 3900. The responsive action can be taken to avoid an accident if the controller device 4000 loses the ability to communicate with one or more of the remote powered units 3904 in the consists 3910, 3912.

In the illustrated embodiment, the lead powered unit 3902 includes an energy management system 4012 that determines operational settings of the vehicle system 3900 (e.g., the tractive efforts and/or braking efforts of one or more of the powered units 3902, 3904 shown in FIG. 39) during a trip of the vehicle system 3900. Alternatively, the energy management system 4012 may be disposed off-board the powered unit 3902, such as on another powered unit of the vehicle system, a non-powered unit of the vehicle system, or at a dispatch facility or other location. These operational settings may be designated as a function of one or more of distance along the route 3914 and/or time elapsed during the trip. A trip of the vehicle system 3900 includes the travel of the vehicle system 3900 along the route 3914 (shown in FIG. 39) from a starting location to a destination location, as described above. The trip may dictate or establish various tractive efforts and/or braking efforts of the different vehicles in a vehicle system for different portions or segments of the trip of the vehicle system. For example, the trip plan may include different throttle settings and/or brake settings for the lead vehicle and remote vehicles of the vehicle system during various segments of the trip. The trip plan may be based on a trip profile that includes information related to the vehicle system 3900, the route 3914, the geography over which the route 3914 extends, and other information in order to control the tractive efforts and/or braking efforts of one or more of the lead powered unit 3902 and/or remote powered units 3904.

The energy management system 4012 can communicate the trip plan with the controller device 4000 and/or the isolation module 4002 to change the tractive efforts and/or braking efforts provided by the remote powered units 3904 as the vehicle system 3900 travels according to the trip plan. For example, if the vehicle system 3900 is approaching a steep incline and the trip profile indicates that the vehicle system 3900 is carrying significantly heavy cargo, then the trip plan of the energy management system 4012 may direct one or more of the lead powered unit 3902 and/or the remote powered units 3904 to increase the tractive efforts supplied by the respective vehicle. Conversely, if the vehicle system 3900 is carrying a smaller cargo load based on the trip profile, then the trip plan of the energy management system 4012 may direct the lead powered unit 3902 and/or remote powered units 3904 to increase the supplied tractive efforts by a smaller amount than the tractive efforts would otherwise be increased if the data indicated a heavier cargo load.

In one embodiment, the trip plan may be used to automatically and/or manually control actual operational settings of the vehicle system. For example, the energy management system can generate control signals that are based on the operational settings designated by the trip plan. These control signals may be communicated to the propulsion subsystem of the powered units of the vehicle system to cause the powered units to autonomously follow the operational settings of the trip plan. Alternatively or additionally, the control signals may be communicated to an output device onboard one or more of the powered units. The control signals may cause the output device to inform an operator of the one or more powered units of the designated operational settings of the trip plan. The operator may then manually implement the designated operational settings.

The trip plan formed by the energy management system 4012 can be based on the trip profile, which can include information and factors such as changes in the route 3914 (shown in FIG. 39) that the vehicle system 3900 (shown in FIG. 39) travels along, regulatory requirements (e.g., emission limits) of the regions through which the vehicle system 3900 travels, and the like, and based on the trip profile. In one embodiment, the energy management system 4012 includes a software application such as the Trip Optimizer™ software system provided by General Electric Company, to control propulsion operations of the vehicle system 3900 during the trip in order to reduce fuel consumption of the vehicles and/or to reduce wear and tear on the vehicle system 3900.

The trip profile can be based on, or include, trip data, vehicle data, route data, and/or updates to the trip data, the vehicle data, and/or the route data. Vehicle data includes information about the powered units 3902, 3904 (shown in FIG. 39) and/or cargo being carried by the vehicle system 3900 (shown in FIG. 39). For example, vehicle data may represent cargo content (such as information representative of cargo being transported by the vehicle system 3900) and/or vehicle information (such as model numbers, fuel efficiencies, manufacturers, horsepower, and the like, of locomotives and/or other railcars in the vehicle system 3900).

Trip data includes information about an upcoming trip by the vehicle system 3900 (shown in FIG. 39). By way of example only, trip data may include a trip profile of an upcoming trip of the vehicle system 3900 (such as information that can be used to control one or more operations of the powered units 3902, 3904, such as tractive and/or braking efforts provided during an upcoming trip), station information (such as the location of a beginning station where the upcoming trip is to begin, the location of refueling stops or locations, and/or the location of an ending station where the upcoming trip is to end), restriction information (such as work zone identifications, or information on locations where the route is being repaired or is near another route being repaired and corresponding speed/throttle limitations on the vehicle system 3900), and/or operating mode information (such as speed/throttle limitations on the vehicle system 3900 in various locations, slow orders, and the like).

Route data includes information about the route 3914 (shown in FIG. 39) upon which the vehicle system 3900 (shown in FIG. 39) travels. The route data may alternatively be referred to as map data. For example, the route data can include information about locations of damaged sections of the route 3914, locations of sections of the route 3914 that are under repair or construction, the curvature and/or grade of the route 3914, GPS coordinates of the route 3914, and the like. The route data is related to operations of the vehicle system 3900 as the route data includes information about the route 3914 that the vehicle system 3900 is or will be traveling on.

The energy management system 4012 can determine which of the remote powered units 3904 (shown in FIG. 39) to turn to the OFF mode of operation when the vehicle system 3900 (shown in FIG. 39) is traveling along the route 3914 (shown in FIG. 39) based on the trip plan. The energy management system 4012 may examine an upcoming portion of the route 3914 and the associated trip plan and, based on the upcoming portion and/or the trip plan, determine that one or more of the remote powered units 3904 can be switched from the ON mode of operation to the OFF mode of operation. For example, if the energy management system 4012 examines the trip profile and determines that an upcoming portion of the route 3914 includes a decline and, as a result, less tractive effort is required to travel down the decline, the energy management system 4012 may decide to at least temporarily turn one or more of the remote powered units 3904 to the OFF mode of operation when the vehicle system 3900 traverses the decline. The one or more remote powered units 3904 can be turned to the OFF mode of operation to conserve fuel that would otherwise be consumed by the one or more remote powered units 3904.

As another example, the energy management system 4012 may determine that an upcoming portion of the route 3914 (shown in FIG. 39) includes an incline and that additional weight of the vehicle system 3900 (shown in FIG. 39) may assist in the wheels 4006 (shown in FIG. 40) of the lead powered unit 3902 and remote powered units 3904 (shown in FIG. 39) gripping the surface of the route 3914 (e.g., the rails of a track). The energy management system 4012 can decide to turn one or more of the remote powered units 3904 to the OFF mode of operation prior to the vehicle system 3900 reaching the incline. The one or more remote powered units 3904 may be turned off such that less fuel is consumed by the remote powered units 3904 and the one or more remote powered units 3904 will be carrying the weight of the fuel that otherwise would be consumed when the one or more remote powered units 3904 reach the incline. This weight of the fuel that otherwise would be consumed can assist the wheels 4006 of the vehicle system 3900 in gripping the surface of the route 3914 during the incline in order to reduce slippage of the wheels 4006 on the route 3914. For example, the energy management system 4012 may keep one or more of the remote powered units 3904 in the OFF mode of operation such that one or more of the remote powered units 3904 has sufficient fuel weight to provide at least a threshold grip on a surface that is traversed by the vehicle system 3900. One or more of the remote powered units 3904 may be later switched to the ON mode of operation to provide additional tractive effort to the vehicle system 3900 to traverse the incline.

As another example, the energy management system 4012 can determine which of the remote powered units 3904 (shown in FIG. 39) to turn to the ON mode and which of the remote powered units 3904 to turn to the OFF mode over time to balance or alternate fuel usage by different ones of the remote powered units 3904. The energy management system 4012 may control or alternate which remote powered units 3904 are in the different modes of operation so that at least a subset or fraction of the remote powered units 3904 has sufficient fuel to propel the vehicle system 3904 when needed for an upcoming portion of the trip.

As another example, the energy management system 4012 can determine which of the remote powered units 3904 (shown in FIG. 39) to turn to the ON mode and which of the remote powered units 3904 to turn to the OFF mode based on a fuel efficiency of one or more of the remote powered units 3904. The term "fuel efficiency" can mean a fuel economy or thermal efficiency of a remote powered unit 3904. For example, a first remote powered unit 3904 that has a greater fuel efficiency than a second remote powered unit 3904 may consume less fuel than the second remote powered unit 3904 to provide the same amount of horsepower or electric energy (e.g., as measured in terms of watts).

The energy management system 4012 may determine which remote powered units 3904 (shown in FIG. 39) to turn to the ON mode and/or OFF mode based on the fuel efficiency of one or more of the remote powered units 3904 by examining the fuel efficiencies of the remote powered units 3904 recorded within the energy management system 4012, a remaining distance left to a destination location of the trip of the vehicle system 3900 (shown in FIG. 39), and/or horsepower of one or more of the remote powered units 3904. For example, a trip may include flat terrain (e.g., terrain having undulations or peaks that rise above sea level of no greater than 300 meters or 984 feet), hilly terrain (e.g., terrain having undulation or peaks that rise above sea level more than 300 meters or 984 feet but less than 600 meters or 2,001 feet), and/or mountainous terrain (e.g., terrain having undulations or peaks that rise above sea level more than 600 meters or 2,001 feet). The energy management system 4012 may change which remote powered units 3904 are turned ON or OFF based on the type of terrain, the fuel efficiencies of the remote powered units 3904, and how far the vehicle system 3900 is to the end of the trip.

Table 1 below provides an example of how the energy management system 4012 may turn different remote powered units 3904 (shown in FIG. 39) ON or OFF during a trip. The first column of Table 1 indicates the different numbered segments, or portions, of the trip. The second column of Table 1 indicates the type of terrain in the corresponding segment (e.g., flat, hilly, or mountainous). The third column of Table 1 indicates the miles or kilometers of the trip encompassed by the corresponding segment. The fourth column indicates the operating state of a first remote powered unit 3904 (e.g., ON for operating in the ON mode of operation and OFF for operating in the OFF mode of operation) for the corresponding segment. The fifth column indicates the operating state of a second remote powered unit 3904 for the corresponding segment. In this example, the first remote powered unit 3904 may have a greater fuel efficiency than the second remote powered unit 3904, but produces one half of the horsepower of the second remote powered unit 3904 (e.g., 2,000 HP versus 4,000 HP) and only has enough fuel to propel the vehicle system 3900 for 800 miles (or 1,287 kilometers).

TABLE 1

| Segment No. | Terrain Type | Miles (Kilometers) of Trip | First Remote Vehicle Mode | Second Remote Vehicle Mode |
|---|---|---|---|---|
| 1 | Flat | 0 to 500 miles (0 to 805 km) | ON | OFF |
| 2 | Hilly | 501 miles to 510 miles (806 km to 820 km) | OFF | ON |
| 3 | Mountainous | 511 miles to 520 miles (822 km to 836 km) | ON | ON |
| 4 | Flat | 521 miles to 900 miles (838 km to 1,448 km) | ON until low on fuel, then OFF | OFF until first remote vehicle is low on fuel, then ON |
| 5 | Mountainous | 901 miles to 920 miles (1,450 km to 1,480 km) | ON | ON |
| 6 | Flat | 921 miles to 1,000 miles (1,482 km to 1,609 km) | OFF or out of fuel | ON |

In the example illustrated in Table 1, the energy management system 4012 changes which of the remote powered units 3904 (shown in FIG. 39) is turned ON or OFF during different segments of the trip. During the first relatively long, and flat, segment, only the more efficient first remote powered unit 3904 is turned ON. During the second relatively short, hilly segment, the first remote powered unit 3904 may be turned OFF to conserve fuel of the first remote powered unit 3904 while the second remote powered unit 3904 generates tractive effort to propel the vehicle system 3900. During the relatively short and mountainous third segment, both the first and second remote powered units 3904 are turned ON. During the long fourth and flat segment, the first remote vehicle is ON until the first remote vehicle is low on fuel (e.g., the fuel reserves on the first remote vehicle fall to or below a threshold amount), at which point the first remote vehicle is turned OFF and the second remote vehicle is turned ON. The first remote vehicle can be turned back on during the short fifth segment that traverses mountainous terrain. During the final sixth segment, the first remote vehicle may be turned OFF or may be out of fuel. The second remote vehicle can remain ON to propel the vehicle system to the destination of the trip.

Additionally or alternatively, the energy management system 4012 may identify which powered units 3902, 3904 may be turned OFF during the entire duration of the trip prior to the vehicle system 3900 embarking on the trip. For example, the vehicle system 3900 may include more tractive effort capability than what is needed to propel the vehicle system 3900 through the trip to the destination location of the trip. Such an excess of tractive effort capability may be represented by an excess of available horsepower that can be provided by the powered units 3902, 3904 relative to the horsepower that is demanded to traverse the route 3914 during the trip.

In order to identify the excess of tractive effort capability of the vehicle system 3900, the energy management system 4012 may use the trip data, vehicle data, and/or route data to calculate a demanded tractive effort. The demanded tractive effort can represent the amount of tractive effort (e.g., horsepower) that is calculated to be needed to propel the vehicle system 3900 over the route 3914 to the destination location of the trip. The demanded tractive effort for a trip can increase for trips that include more inclined segments of the route 3914 and/or segments of the route 3914 having steeper inclines than other trips, for trips being traveled by vehicle systems 3900 that are heavier than other vehicle systems 3900, for trips that involve more periods of acceleration (e.g., such as after coming out of a curved segment of the route 3914 and entering a more straight segment of the route 3914) than other trips, and the like. Conversely, the demanded tractive effort for a trip can decrease for trips that include less inclined segments of the route 3914 and/or segments of the route 3914 having smaller inclines than other trips, for trips being traveled by lighter vehicle systems 3900, for trips that involve fewer periods of acceleration than other trips, and the like.

The energy management system 4012 may calculate the demanded tractive effort of a trip based on the physics of the vehicle system 3900 traveling along the route 3914, taking into account the size (e.g., length and/or weight) of the vehicle system 3900, the distribution (e.g., location) of the powered units 3902, 3904 along the length of the vehicle system 3900, the curvature and/or grade of the route 3914, a scheduled time of arrival at the destination location of the trip, and the like. In one embodiment, the energy management system 4012 uses one or more of the techniques described in U.S. patent application Ser. No. 11/750,716, which was filed on 18 May 2007 (the "'716 Application). For example, the energy management system 4012 can determine the demanded tractive effort using one or more of the equations and objective functions of the optimal control formulations described in the '716 Application. The entire disclosure of the '716 Application is incorporated by reference.

The energy management system 4012 may calculate the operational settings that are to be used to get the vehicle system 3900 to travel over the route 3914 and arrive at the destination location at or before the scheduled time of arrival, or within a designated time period of the scheduled time of arrival. For example, although the vehicle system 3900 may be able to travel to the destination location using less tractive effort, doing so may cause the vehicle system 3900 to be late or significantly late to arrive at the destination location. As a result, the energy management system 4012 can restrict the trip plan to cause the vehicle system 3900 to use sufficient tractive effort to arrive at the destination location on time.

The energy management system 4012 can calculate the demanded tractive effort based on previous runs of the vehicle system 3900 over the route 3914. For example, if the same or similar vehicle system 3900 traveled over the route 3914 for a previous trip, then the tractive efforts used to propel the vehicle system 3900 that were logged (e.g., recorded) for the previous trip may be examined and used to generate the demanded tractive effort for the present trip. Alternatively, the demanded tractive effort for a trip may be a designated amount or several designated amounts associated with different segments of the trip.

The energy management system 4012 also can determine the tractive effort capability of the vehicle system 3900. The tractive effort capability of the vehicle system 3900 represents the available tractive effort (e.g., horsepower) that can be provided by the powered units 3902, 3904 of the vehicle system 3900 to propel the vehicle system 3900 for the trip. For example, a vehicle system 3900 including three locomotives that each are capable of producing 4,000 horsepower, then the tractive effort capability of the vehicle system 3900 can be 12,000 horsepower. The tractive effort capability of the vehicle system 3900 may be modified by one or more factors such as the age of one or more of the powered units 3902, 3904 (e.g., with the tractive effort capability being decreased by one or more designated or variable amounts with increasing age of one or more of the powered units 3902, 3904), the health of one or more of the powered units 3902, 3904 (e.g., the with tractive effort capability being decreased by designated or variable amounts based on damage, wear and tear, or other deterioration to the propulsion subsystems of the powered units 3902, 3904), and the like.

The energy management system 4012 compares the demanded tractive effort of the trip with the tractive effort capability of the vehicle system 3900 to determine if an excess of available tractive effort exists. For example, if the tractive effort capability exceeds the demanded tractive effort, then such an excess is identified. If the tractive effort capability does not exceed the demanded tractive effort, then no excess tractive effort capability may exist.

When an excess in tractive effort capability exists, the energy management system 4012 can compare the excess to the tractive effort capabilities of the powered units 3902, 3904. For example, the energy management system 4012 can compare the excess to the tractive effort capability (e.g., horsepower) of each individual powered unit 3902, 3904 or of groups of two or more of the individual powered units 3902, 3904. If the tractive effort capability of an individual powered unit 3902, 3904 or a group of powered units 3902, 3904 is less than or equal to the excess of tractive effort capability of the vehicle system 3900, then the energy management system 4012 may select that individual powered unit 3902, 3904 or group as a selected powered unit 3902, 3904 or group of powered units 3902, 3904.

The selected powered unit 3902, 3904 or the selected group of powered units 3902, 3904 represents the powered unit or units 3902, 3904 that can be turned (as described above) to the of state or mode of operation for the duration of the trip while still allowing the vehicle system 3900 to have sufficient tractive effort capability to complete the trip (e.g., reach the destination location at a scheduled time of arrival or within a designated time period of the scheduled time of arrival). As described above (e.g., in connection with the system 3500 and the system 3900), the turning OFF of the selected powered unit 3902, 3904 or group of powered units 3902, 3904 may be performed remotely, such as from the lead powered unit 3502, 3902. For example, the energy management system 4012 can automatically generate the isolation command 3612 (shown in FIG. 36) that identifies the selected powered unit 3902, 3904 or group of powered units 3902, 3904.

As described above, upon receipt of the isolation command 3612, the isolation control system 4014 may remotely turn OFF the selected powered units 3902, 3904 or the selected group of powered units 3902, 3904. For example, the isolation control system 4014 may communicate the isolation instruction 3616 (shown in FIG. 36) that is transmitted to the selected powered units 3902, 3904 and/or the selected group of powered units 3902, 3904 in order to turn those powered units 3902, 3904 to an OFF state or mode. The communication of the isolation instruction 3616 may occur automatically or manually, such as by notifying the operator of the vehicle system of the selected powered unit 3902, 3904 or group of powered units 3902, 3904 and directing the operator to turn the selected powered unit 3902, 3904 or group of powered units 3902, 3904 to the OFF state or mode. This may occur prior to the vehicle system leaving on the trip so that the selected powered units 3902, 3904 or selected group of powered units 3902, 3904 are OFF for all or substantially all of the trip. As a result, the vehicle system may travel according to the operational settings designated by the trip plan with the selected powered units 3902, 3904 or the selected group of powered units 3902, 3904 being OFF, which can result in savings in fuel and/or reductions in emissions generated by the vehicle system.

One or more of the controller device 4000, the isolation module 4002, and/or the energy management system 4012 may represent a hardware and/or software system that operates to perform one or more functions. For example, the controller device 4000, the isolation module 4002, and/or the energy management system 4012 may include one or more circuits or circuitry that includes and/or is coupled with one or more computer processors, controllers, or other logic-based devices that perform operations based on instructions stored on a tangible and non-transitory computer readable storage medium, such as a computer memory. Alternatively, the controller device 4000, the isolation module 4002, and/or the energy management system 4012 may include a hard-wired device that performs operations based on hard-wired logic of the device. The controller device 4000, the isolation module 4002, and/or the energy management system 4012 shown in FIG. 40 may represent the hardware that operates based on software or hardwired instructions, the software that directs hardware to perform the operations, or a combination thereof.

Figure 41:
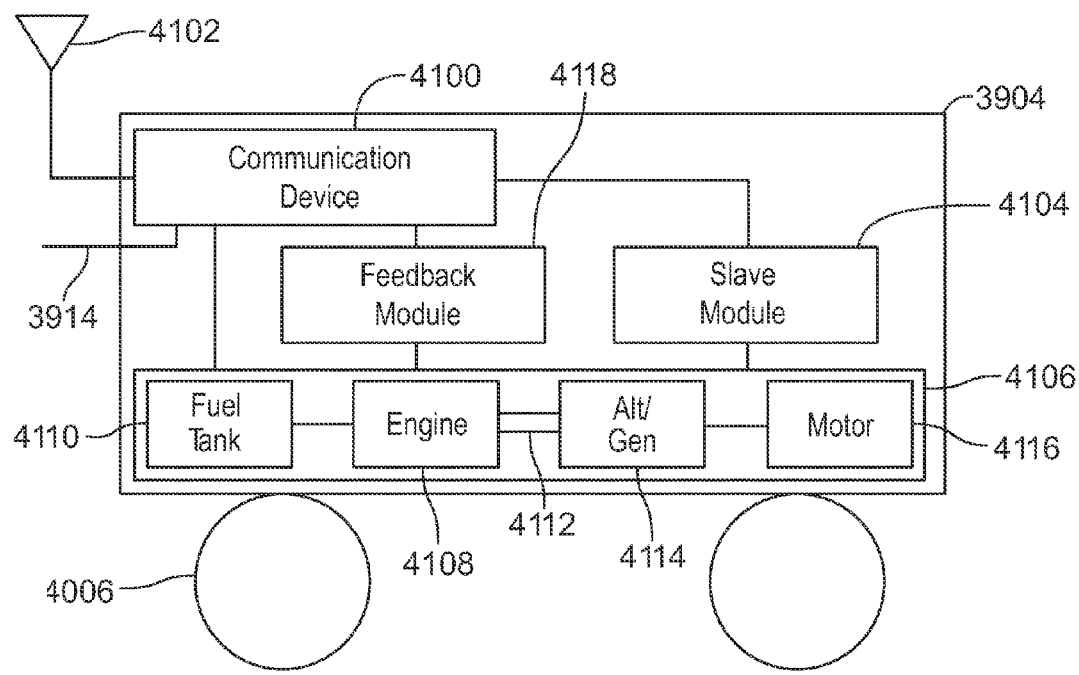
FIG. 41 is a schematic illustration of one embodiment of a remote powered unit.

FIG. 41 is a schematic illustration of one embodiment of a remote powered unit 3904. The remote powered unit 3904 may represent one or more of the remote powered units 3904A, 3904B, 3904C, and so on, shown in FIG. 39. The remote powered unit 3904 includes a communication device 4100 that communicates with the lead powered unit 3902 (shown in FIG. 39). For example, the communication device 4100 may receive the control instructions transmitted from the lead powered unit 3902 so that the lead powered unit 3902 can control the tractive efforts and/or braking efforts of the remote powered unit 3904. The communication device 4100 may include a transceiver device or transmitter that is conductively coupled with the communication pathway 3914 (e.g., a cable bus or MU cable bus). The communication device 4100 can receive the control instructions from the lead powered unit 3902 through the communication pathway 3914. Alternatively or additionally, the communication device 4100 may be coupled with an antenna 4102 to wirelessly receive the control instructions from the lead powered unit 3902.

As described above, the communication device 4100 may be turned off (e.g., not be powered by the propulsion subsystem of the remote vehicle) when the remote vehicle is in the OFF mode of operation. However, in one embodiment, the communication device 4100 or one or more components of the communication device 4100 may remain powered when the remote vehicle is in the OFF mode of operation. For example, the communication device 4100 may remain powered up, or ON, and continue to allow for communication through the pathway 3914 with other communication devices 4100 on other remote powered units 3904 that remain powered up, or ON, when the remote powered units 3904 are in the OFF mode of operation. As another example, the communication device 4100 may include a network interface module, such as a network card and/or processor that allows for communication through the pathway 3914 with other devices 4100, that remains powered when the remote powered unit 3904 is in the OFF mode of operation. The communication device 4100 or network interface module can remain powered by a battery or other electrical energy storage device. The network interface module can allow for communications with the communication device 4100 when the propulsion subsystem initially switches from the OFF mode to the ON mode.

The remote powered unit 3904 includes a slave module 4104 that receives the control instructions from the lead powered unit 3902 (e.g., via the communication device 4100) and implements the control instructions. For example, the slave module 4104 may communicate with a propulsion subsystem 4106 of the remote powered unit 3904 to change tractive efforts and/or braking efforts provided by the propulsion subsystem 4106 based on the control instructions received from the lead powered unit 3902. The slave module 4104 also may implement control instructions received from the isolation module 4002 (shown in FIG. 40) of the lead powered unit 3902. For example, the isolation module 4002 may transmit an isolation command to the remote powered unit 3904 (e.g., via the communication devices 4008, 4100). The slave module 4104 can receive the isolation command and turn the propulsion subsystem 4106 to the OFF mode of operation from the ON mode of operation. Alternatively, the isolation module 4002 may transmit an activation command to the remote powered unit 3904. The slave module 4104 can receive the activation command and turn the propulsion subsystem 4106 to the ON mode of operation from the OFF mode of operation.

The propulsion subsystem 4106 of the remote powered unit 3904 provides tractive effort and/or braking effort of the remote powered unit 3904. The propulsion subsystem 4106 can include an engine 4108 that is fluidly coupled with a fuel tank 4110. Additionally or alternatively, the propulsion subsystem 4106 may include an energy storage device (such as a battery that may be represented by the fuel tank 4110) that powers the propulsion subsystem 4106. The engine 4108 consumes fuel from the fuel tank 4110 to rotate a shaft 4112 that is coupled with an electrical alternator or generator 4114 ("ALT/GEN 4114" in FIG. 41). The alternator or generator 4114 generates electric current based on rotation of the shaft 4112. The electric current is supplied to one or more components of the remote powered unit 3904 (and/or one or more other remote powered units 3904 or other vehicles in the vehicle system 3900) to power the components. For example, the propulsion subsystem 4106 may include one or more traction motors 4116 that are powered by the electric current from the alternator or generator 4114. Alternatively, the traction motors 4116 may be powered by an onboard energy storage device and/or an off-board energy source, such as a powered rail or overhead catenary. The traction motors 4116 can rotate axles and/or wheels 4006 of the remote powered unit 3904 to propel the remote powered unit 3904. The propulsion subsystem 4106 can include brakes (e.g., air brakes or regenerative/resistive brakes) that slow or stop movement of the remote powered unit 3904.

The electric current from the propulsion subsystem 4106 may be used to power the communication device 4100. For example, the communication device 4100 may be conductively coupled with the alternator or generator 4114 to receive electric current that powers the communication device 4100. In one embodiment, if energy of the electric current supplied to the communication device 4100 drops below a threshold energy level, then the communication device 4100 may turn off, such as by switching to an OFF mode of operation. In the OFF mode of operation for the communication device 4100, the communication device 4100 is unable to communicate with other communication devices, such as the communication device 4008 (shown in FIG. 40) of the lead powered unit 3902 (shown in FIG. 39) in one embodiment. The threshold energy level may represent a voltage level or current level that is sufficient to power the communication device 4100 so that the communication device 4100 can receive the control instructions from the lead powered unit 3902 and/or transmit feedback data (as described below) to the lead powered unit 3902. When the electric current has a voltage or other energy that drops below the threshold energy level, the communication device 4100 may turn off. When the electric current rises above the threshold, the communication device 4100 may turn on, or switch to an ON mode of operation, to re-commence communication with the communication device 4008 of the lead powered unit 3902.

In one embodiment, a communication device 4100 located on-board a first remote powered unit 3904 may be powered by electric current generated by the propulsion subsystem 4106 of a different, second remote powered unit 3904. For example, a communication device 4100 disposed onboard a remote powered unit 3904 in a consist 3910 or 3912 may be powered by electric current received from one or more other remote powered units 3904 in the same consist 3910 or 3912. The communication device 4100 may be powered by at least one remote powered unit 3904 in the consist 3910 or 3912 that is operating in the ON mode of operation when one or more other remote powered units 3904 are in the OFF mode of operation. For example, if the remote powered unit 3904 on which the communication device 4100 is disposed switches to the OFF mode of operation, then another remote powered unit 3904 can supply electric current to the communication device 4100 in order to power the communication device 4100 and maintain a communication link with the lead powered unit 3902 and the consist that includes the communication device 4100. The communication device 4100 disposed on-board one remote powered unit 3904 may be conductively coupled with the propulsion subsystem 4106 of another remote powered unit 3904 by one or more wires, cables (e.g., MU cable bus), pathway 3914, and the like, to receive the electric current.

The remote powered unit 3904 may include a feedback module 4118 that generates feedback data for use by the lead powered unit 3902 (shown in FIG. 39). The feedback data can include a variety of information related to operation of the remote powered unit 3904. For example, the feedback data can include a volume or amount of fuel being carried by the remote powered unit 3904 (e.g., in the fuel tank 4110). The feedback module 4118 can include or represent one or more sensors (e.g., fuel gauge sensors) that obtain the feedback data. As described above, the lead powered unit 3902 can use the volume or amount of fuel carried by the remote powered unit 3904 to determine which of the remote powered units 3904 to switch to the OFF mode of operation or the ON mode of operation. The lead powered unit 3902 may use the feedback data to determine the tractive efforts and/or braking efforts of the remote powered units 3904. The lead powered unit 3902 may base the tractive efforts, braking efforts, and/or determination of which remote powered units 3904 are in the ON mode or OFF mode of operation based on the feedback data received from a subset or all of the remote powered units 3904 in the vehicle system 3900 (shown in FIG. 39). As described above, one or more of the controller device 4000 (shown in FIG. 40), the isolation module 4002 (shown in FIG. 40), and/or the energy management system 4012 (shown in FIG. 40) of the lead powered unit 3902 can use the feedback data to control tractive efforts, braking efforts, and/or modes of operation of the remote powered units 3904.

One or more of the slave module 4104 and/or the feedback module 4118 may represent a hardware and/or software system that operates to perform one or more functions. For example, the slave module 4104 and/or the feedback module 4118 may include one or more computer processors, controllers, or other logic-based devices that perform operations based on instructions stored on a tangible and non-transitory computer readable storage medium, such as a computer memory. Alternatively, the slave module 4104 and/or the feedback module 4118 may include a hard-wired device that performs operations based on hard-wired logic of the device. The slave module 4104 and/or the feedback module 4118 shown in FIG. 41 may represent the hardware that operates based on software or hardwired instructions, the software that directs hardware to perform the operations, or a combination thereof.

Figure 42:
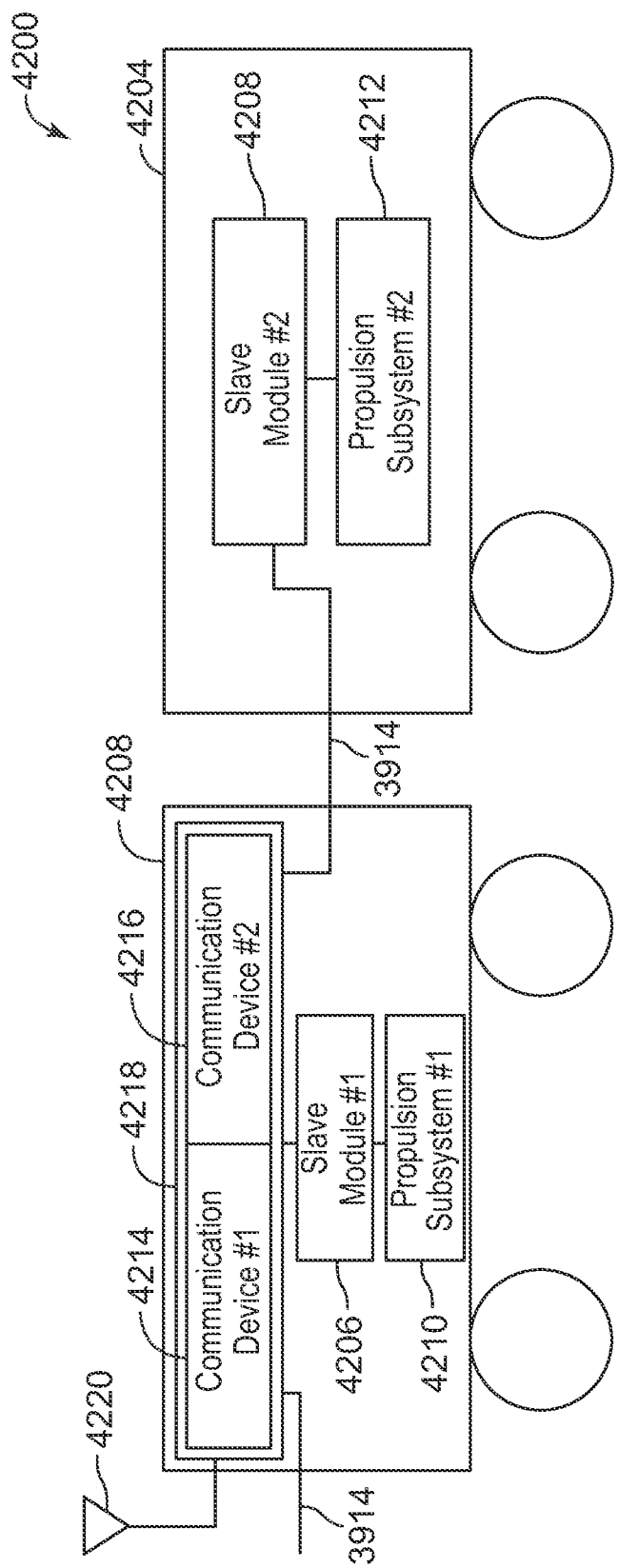
FIG. 42 is a schematic illustration of a consist of remote vehicles in accordance with another embodiment.

FIG. 42 is a schematic illustration of a consist 4200 of remote vehicles 4202, 4204 in accordance with another embodiment. The consist 4200 may be similar to one or more of the consists 3910, 3912 (shown in FIG. 39). For example, the consist 4200 may include one or more remote vehicles that are mechanically and/or logically connected with each other. The remote vehicles 4202, 4204 may be similar to one or more of the remote powered units 3904 (shown in FIG. 39). For example, the remote vehicles 4202, 4204 may be vehicles of a vehicle system and be capable of generating tractive effort for self-propulsion.

In the illustrated embodiment, the remote vehicles 4202, 4204 include slave modules 4206, 4208 (e.g., "Slave Module #1" and "Slave Module #2") that may be similar to the slave module 4104 (shown in FIG. 41). For example, the slave modules 4206, 4208 may receive control instructions from the lead powered unit 3902 (shown in FIG. 39) and implement the control instructions to change the mode of operation, tractive efforts, and/or braking efforts of propulsion subsystems 4210, 4212 of the remote vehicles 4202, 4204 (e.g., "Propulsion Subsystem #1" and "Propulsion Subsystem #2"), as described above. Although not shown in FIG. 4, the remote vehicles 4202, 4204 can include feedback modules that are similar to the feedback module 4118 (shown in FIG. 41).

The remote vehicles 4202, 4204 include communication devices 4214, 4216 (e.g., "Communication Device #1" and "Communication Device #2") that communicate with the communication device 4008 (shown in FIG. 376) of the lead powered unit 3902 (shown in FIG. 39). The communication devices 4214, 4216 may be similar to the communication device 4100 (shown in FIG. 41). In one embodiment, the communication device 4214 may receive control instructions, isolation commands, activation commands, and the like, and/or transmit feedback data for the remote vehicle 4202 while the communication device 4216 receives control instructions, isolation commands, activation commands, and the like, and/or transmit feedback data for the remote vehicle 4204.

One difference between the remote vehicles 4202, 4204 shown in FIG. 42 and the remote powered unit 3904 shown in FIG. 41 is that the communication device 4216 for the remote vehicle 4204 is disposed off-board the remote vehicle 4204 and is disposed on-board the remote vehicle 4202. For example, the communication device for one remote vehicle may be located on-board another remote vehicle in the same consist. The communication devices 4214, 4216 can be parts of a common communication module 4218. For example, the communication devices 4214, 4216 may be contained within a common (e.g., the same) housing located on the remote vehicle 4202. While only two communication devices 4214, 4216 are shown as being part of the common communication module 4218, alternatively, three or more communication devices 4214, 4216 may be part of the same communication module 4218. For example, one remote vehicle in a consist may include the communication devices for a plurality of the remote vehicles in the consist. Alternatively, the communication module 4218 may include only a single communication device of a single remote vehicle.

The communication module 4218 communicates with the communication device 4008 (shown in FIG. 40) of the lead powered unit 3902 (shown in FIG. 39) through a wired communication link (e.g., the pathway 3914, another conductive wire or cable, a fiber optic cable, and the like) and/or using an antenna 4220 (e.g., via a wireless network). The communication module 4218 may act as a single communication device for plural remote vehicles in the same consist. The communication module 4218 may maintain a communication link with the lead powered unit 3902 to continue communications with the lead powered unit 3902 when one or more of the remote vehicles 4202, 4204 switch to the OFF mode of operation. For example, if the remote vehicle 4204 switches to the OFF mode of operation, the communication module 4218 may continue to receive electric current from the propulsion subsystem 4210 of the other remote vehicle 4202 in the consist 4200 and may continue to communicate with the lead powered unit 3902. On the other hand, if the remote vehicle 4202 switches to the OFF mode of operation, the communication module 4218 may continue to receive electric current from the propulsion subsystem 4212 of the other remote vehicle 4204 in the consist 4200 and may continue to communicate with the lead powered unit 3902.

Returning to the discussion of the vehicle system 3900 shown in FIG. 39, in order to prevent a break or interruption in communication between the lead powered unit 3902 and one or more remote powered units 3904 in each of the consists 3910 and 3912, the isolation module 4002 (shown in FIG. 40) of the lead powered unit 3902 may coordinate the timing at which the remote powered units 3904 switch between modes of operation. In one embodiment, the isolation module 4002 may direct the remote powered units 3904 in a consist 3910 and/or 3912 to switch between modes of operation such that at least one communication device 4100, 4214, 4216 (shown in FIGS. 41 and 42) of the remote powered units 3904 in each consist 3910, 3912 maintains a communication link with the lead powered unit 3902. For example, at least one communication device 4100, 4214, 4216 of each consist 3910, 3912 may remain powered and configured to communicate with the lead powered unit 3902 such that the communication device 4100, 4214, 4216 can receive control instructions from the lead powered unit 3902 during the switching of modes of operation.

Figure 43:
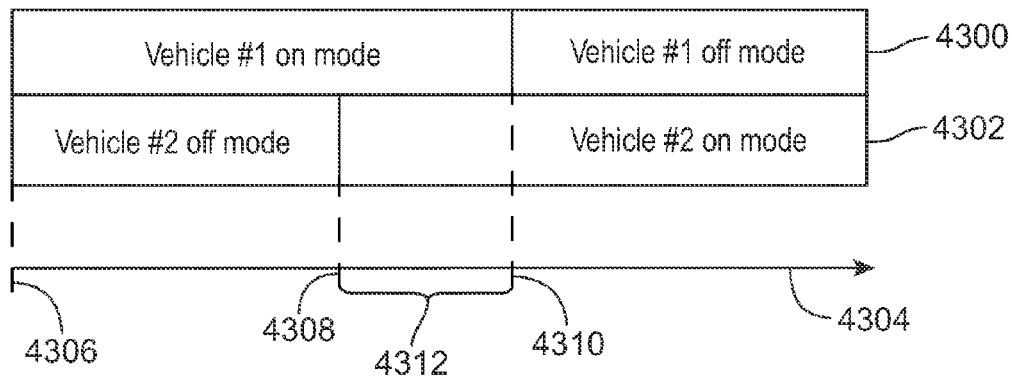
FIG. 43 illustrates example timelines of a switching procedure for changing modes of operation in a consist.

FIG. 43 illustrates example timelines 4300, 4302 of a switching procedure for changing modes of operation in a consist. The timelines 4300, 4302 represent one example of a procedure for two remote powered units 3904 (shown in FIG. 39) switching between ON and OFF modes of operation such that at least one communication device 4100, 4214, 4216 (shown in FIGS. 7 and 8) remains on and powered for each consist 3910, 3912 (shown in FIG. 39).

The timelines 4300, 4302 are shown alongside a horizontal axis 4304 that represents time. The timeline 4300 represents the modes of operation for a first remote vehicle ("Vehicle #1"), such as the remote powered unit 3904A (shown in FIG. 39) and the timeline 4302 represents the modes of operation for a different, second remote vehicle ("Vehicle #2") in the same consist as the first remote vehicle, such as the remote powered unit 3904B (shown in FIG. 39). At a first time 4306, the first remote vehicle is operating in the ON mode of operation ("Vehicle #10N Mode") while the second remote vehicle is operating in the OFF mode of operation ("Vehicle #2 OFF Mode"). For example, the propulsion subsystem of the first remote vehicle may be on and active to generate electric current to power a communication device disposed on the first remote vehicle or the second remote vehicle. The propulsion subsystem of the second remote vehicle may be off and deactivated such that the propulsion subsystem does not generate electric current to power a communication device disposed on the first remote vehicle or the second remote vehicle. As described above, the powered communication device can continue to receive control instructions from the lead vehicle to control operations of the first remote vehicle.

The isolation module 4002 (shown in FIG. 40) of the lead powered unit 3902 (shown in FIG. 39) may decide to switch the first remote vehicle from the ON mode of operation to the OFF mode of operation. Prior to switching the mode of operation of the first remote vehicle, however, the isolation module 4002 may direct at least one other remote vehicle in the same consist to remain in the ON mode of operation or to switch to the ON mode of operation to ensure that the communication device of the consist remains powered and able to communicate with the lead powered unit 4302. For example, at a subsequent time 4308, the isolation module 4002 may direct the second remote vehicle to switch from the OFF mode of operation to the ON mode of operation. After the second time 4308, both the first remote vehicle and the second remote vehicle are in the ON mode of operation and the propulsion subsystem of at least one of the first remote vehicle and the second remote vehicle may power one or more communication devices of the consist.

At a subsequent third time 4310, the isolation module 4002 (shown in FIG. 40) of the lead powered unit 3902 (shown in FIG. 39) may direct the first remote vehicle to switch to the OFF mode of operation. In the illustrated embodiment, the first remote vehicle switches to the OFF mode of operation after the second remote vehicle switches to the ON mode of operation. The isolation module 4002 can monitor electrical output from the propulsion subsystem 4106 of the second remote vehicle that is switched from the OFF mode of operation to the ON mode of operation to determine when to switch the first remote vehicle from the ON mode of operation to the OFF mode of operation. For example, the isolation module 4002 can measure one or more energy characteristics (e.g., total energy, voltage, or the like) of the electric current generated by the alternator or generator 4114 (shown in FIG. 41) of the second remote vehicle. The isolation module 4002 may directly measure the one or more energy characteristics via the pathway 3914 (shown in FIG. 39) and/or may receive measurements of the energy characteristics from the second remote vehicle, such as by measured by one or more sensors (e.g., current or voltage sensors) on the second remote vehicle and communicated to the isolation module 4002 using the communication device 4100 (shown in FIG. 41). Once the one or more energy characteristics exceed one or more associated thresholds, the isolation module 4002 may proceed to direct the first remote vehicle to switch from the ON mode of operation to the OFF mode of operation.

As shown in FIG. 43, both the first remote vehicle and the second remote vehicle are in the ON mode of operation for an overlapping time period 4312 that extends from the second time 4308 to the third time 4310. The overlapping time period 4312 indicates that at least one remote vehicle in the consist remains in the ON mode of operation to continue supplying power to one or more communication devices in the consist during the switching procedure. As a result, the lead powered unit 3902 may continue to communicate with the remote vehicles of the consist without an interruption or break in the communication link.

In one embodiment, the isolation module 4002 (shown in FIG. 40) may control the switching of the propulsion subsystems of the remote vehicles in a consist so as to reduce or eliminate a voltage drop in the supply of electrical energy to a communication module or device of the consist during a defined electro-mechanical event. For example, multiple remote vehicles in a consist may be conductively coupled with each other such that cranking of an engine in a first remote vehicle of the consist causes a voltage drop in one or more electrical circuits of the first remote vehicle and/or one or more other remote vehicles in the consist. The drop in voltage can cause the electrical energy that is supplied to one or more communication devices in the consist to drop below a threshold energy required to power the communication devices. As a result, the communication devices may turn off and/or electrically reset themselves. The communication devices may not turn back on for communication or complete the reset for a significant time period, such as several seconds or minutes. This delay can cause a break or interruption in the communication link between the lead vehicle and the consist and can cause the vehicle system to take responsive action, as described above.

In order to prevent such a voltage drop from breaking or interrupting the communication link, one or more of the propulsion subsystems in the consist remain on and activated to produce electrical energy and power the communication device during the electro-mechanical event. The propulsion subsystems may remain in the ON mode of operation such that the electric current supplied to the communication device (s) of the consist do not drop below the threshold energy needed to power the communication device during the electro-mechanical event. As a result, the communication link between the lead vehicle and the communication device(s) in the consist is not broken or interrupted during the electro-mechanical event.

For example, when a communication device 4100 (shown in FIG. 41) on-board a first remote powered unit 3904 (shown in FIG. 39) is turned on or activated, the communication device 4100 may not have sufficient communication parameters for receiving control instructions from the lead powered unit 3902 (shown in FIG. 39) to allow the lead powered unit 3902 to control operations of the first remote powered unit 3904 in a DP operation. The communication parameters may include settings, addresses, and the like, that are needed to communicate with the lead powered unit 3902 via the communication link between the lead powered unit 3902 and the first remote powered unit 3904. When the communication device 4100 is turned on or activated, the communication device 4100 may acquire or set up the communication parameters used to communicate with the lead powered unit 3902. The communication parameters may be acquired from the lead powered unit 3902 or from a local memory. The communication parameters may be specific to that remote powered unit 3904 and/or that communication device 4100, and may differ from the communication parameters used by another remote powered unit 3904 in the same consist and/or another communication device 4100.

In order to ensure that the communication device 4100 (shown in FIG. 41) that is turned on has the communication parameters for communicating with the lead powered unit 3902 (shown in FIG. 39) before one or more other communication devices 4100 in the same consist are turned off, the remote powered unit 3904 (shown in FIG. 39) that is turning to the OFF mode may way until the communication parameters are transferred to the remote powered unit 3904 being turned to the ON mode. For example, with respect to the timelines 4300, 4302 shown in FIG. 43, at the time 4308, both the first and second remote powered units 3904 are in the ON mode and the communication parameters used by the first remote powered unit 3904 to communicate with the lead powered unit 3902 are used to communicate with the lead powered unit 3902. For at least a period of time following the time 4308, the second remote powered unit 3904 may not have the communication parameters needed to communicate with the lead powered unit 3902. As a result, the second remote powered unit 3904 may be unable to communicate with the lead powered unit 3902 for at least the period of time. During the overlapping time period that extends from the time 4308 to the time 4310, the communication device of the first remote powered unit 3904 can transfer the communication parameters to the second remote powered unit 3904, such as by transmitting the communication parameters through the pathway 3914 (shown in FIG. 39) or a wireless communication link. At or prior to the time 4310, the transfer of the communication parameters to the second remote powered unit 3904 is complete such that the second remote powered unit 3904 can communicate with and receive control instructions from the lead powered unit 3902. The first remote powered unit 3904 may then deactivate and turn to the OFF mode without interrupting or breaking the communication link between the lead powered unit 3902 and the consist that includes the first and second remote powered units 3904.

One or more components disposed on the lead powered unit 3902 and/or remote powered units 3904 described herein can be provided in a retrofit kit or assembly. For example, the lead powered unit 3902 may be originally manufactured or sold to a customer without the isolation module 4002 installed or disposed on the lead powered unit 3902. A retrofit kit or assembly can include the isolation module 4002, such as a kit or assembly having hardware components (e.g., a computer processor, controller, or other logic-based device), software components (e.g., software applications), and/or a combination of hardware components and software components (e.g., a computer processor or other logic-based device and associated software application, a computer processor, controller, or other logic-based device having hard-wired control instructions, or the like). The kit or assembly may be purchased or provided to the current owner and/or user of the lead powered unit 3902 so that the owner and/or user can install (or have installed) the isolation module 4002 on the lead powered unit 3902. The isolation module 4002 may then be used in accordance with one or more embodiments described herein. While the above discussion of the retrofit kit or assembly focuses on the isolation module 4002, the kit or assembly may also or alternatively include the energy management system 4012 and/or one or more components disposed on the remote powered unit 3904, such as the slave module 4104 and/or the feedback module 4118 described above in connection with FIG. 41.

Figure 44:
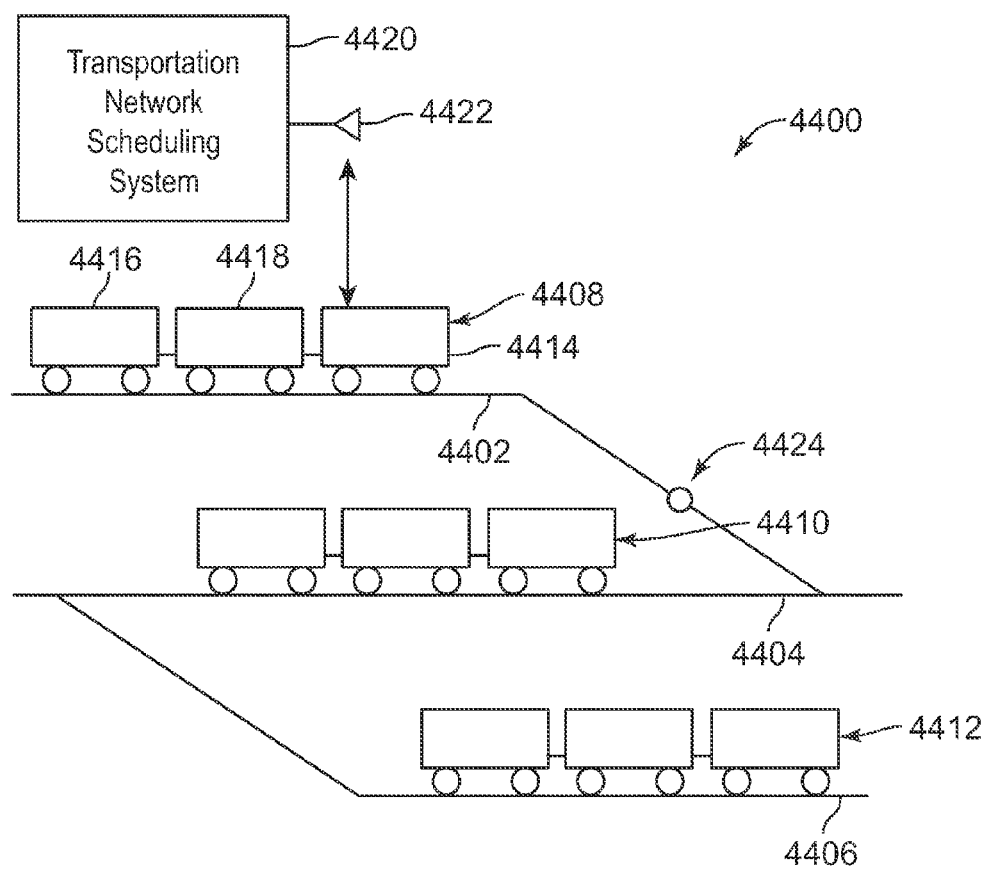
FIG. 44 is a schematic view of a transportation network in accordance with one embodiment.

FIG. 44 is a schematic view of a transportation network 4400 in accordance with one embodiment. The transportation network 4400 includes a plurality of interconnected routes 4402, 4404, 4406, such as interconnected railroad tracks. The transportation network 4400 may extend over a relatively large area, such as hundreds of square miles or kilometers of land area. The number of routes 4402, 4404, 4406 shown in FIG. 40 is meant to be illustrative and not limiting on embodiments of the described subject matter. Plural separate vehicle systems 4408, 4410, 4412 may concurrently travel along the routes 4402, 4404, 4406.

One or more of the vehicle systems 4408, 4410, 4412 may be similar or identical to one or more other vehicle systems described herein. For example, the vehicle system 4408 may include a lead vehicle 4414 interconnected with one or more consists (e.g., a motive power group of one or more mechanically and/or logically connected remote vehicles) by one or more non-powered vehicles 4418. The consists can include remote vehicles (e.g., remote powered units 3904, 4202, 4204 shown in FIGS. 39 and 42) that are remotely controlled by the lead vehicle, as described above. Also as described above, the lead vehicle may direct the remote vehicles in the consist to alternate between operating in ON modes of operation and OFF modes of operation, while keeping a communication link with the consist open to continue controlling the remote vehicles that are in the ON mode of operation.

In one embodiment, the vehicle systems travel along the routes according to a movement plan of the transportation network. The movement plan is a logical construct of the movement of the vehicle systems moving through the transportation network. For example, the movement plan may include a movement schedule for each of the vehicle systems, with the schedules directing the vehicle systems to move along the routes at associated times. The movement schedules can include one or more geographic locations along the routes and corresponding times at which the vehicle systems are to arrive at or pass the geographic locations.

The movement plan may be determined by a transportation network scheduling system 4420. The scheduling system may represent a hardware and/or software system that operates to perform one or more functions. For example, the scheduling system may include electronic circuits or circuitry that include and/or are coupled with one or more computer processors, controllers, or other logic-based devices that perform operations based on instructions stored on a tangible and non-transitory computer readable storage medium, such as a computer memory. Alternatively, the scheduling system may include a hard-wired device that performs operations based on hard-wired logic of the device. The scheduling system shown in FIG. 44 may represent the circuitry hardware that operates based on software or hardwired instructions, the software that directs hardware to perform the operations, or a combination thereof. As shown in FIG. 44, the scheduling system can be disposed off-board (e.g., outside) the vehicle systems. For example, the scheduling system may be disposed at a central dispatch office for a railroad company. The scheduling system can include an antenna 4422 that wirelessly communicates with the vehicle systems.

In one embodiment, the scheduling system determines whether to change a mode of operation of one or more remote vehicles in the vehicle systems. For example, the scheduling system may direct one or more of the remote vehicles in one or more of the vehicle systems to switch from the ON mode of operation to the OFF mode of operation, and vice-versa, as described above. The scheduling system can transmit instructions to an isolation module disposed on the lead vehicle, which directs the remote vehicles to change the mode of operation as indicated by the scheduling system. Also as described above, the remote vehicles may change modes of operation without interrupting or breaking a communication link between the lead vehicle and one or more of the remote vehicles in the consist.

The scheduling system may direct one or more remote vehicles in the vehicle systems based on movement schedules of the vehicle systems. For example, if one or more vehicle systems are running ahead of schedule, the scheduling system may direct one or more remote vehicles in the vehicle systems to turn to the OFF mode of operation (e.g., to slow down the vehicle system running ahead of schedule) or to turn to the ON mode of operation (e.g., to speed up the vehicle system running behind schedule).

In one embodiment, the scheduling system may direct one or more remote vehicles in a vehicle system to turn to the OFF mode of operation in order to allow the vehicle system to skip or pass a refueling location 4424 in the transportation network. The refueling location represents a station or depot where the vehicle systems may stop to acquire additional fuel to be added to the fuel tanks of the lead vehicles and/or remote vehicles. In order to reduce the time required to travel along a trip between a starting location and a destination location, the scheduling system may control which remote vehicles in a vehicle system are in the ON mode of operation and/or the OFF mode of operation to conserve fuel and allow the vehicle system to skip one or more refueling locations. For example, if all or a substantial number of the remote vehicles in the vehicle system were continually operating in the ON mode of operation during a trip, the vehicle system may need to stop and refuel at the refueling location 339024 in order to ensure that the vehicle system has sufficient fuel to reach the destination location of the trip.

The scheduling system may direct one or more of the remote vehicles to turn to the OFF mode of operation to conserve fuel and allow other remote vehicles to remain in the ON mode of operation such that the vehicle system can pass the refueling location without stopping to refuel. The scheduling system can examine a geographic distance between a location of the vehicle system 4408, 4410, and/or 4412, and the refueling location 4424, along with an amount of remaining fuel carried by one or more of the lead vehicles and/or remote vehicles in the vehicle system 4408, 4410, and/or 4412 to determine if the corresponding vehicle system 4408, 4410, and/or 4412 can proceed past the refueling location without stopping to acquire additional fuel (e.g., skip the refueling location). The location of the vehicle system 4408, 4410, and/or 4412 may be a current geographic location as determined by one or more location sensors, such as one or more Global Positioning System (GPS) receivers disposed on the vehicle system 4408, 4410, and/or 4412 that is reported back to the scheduling system.

Figure 45:
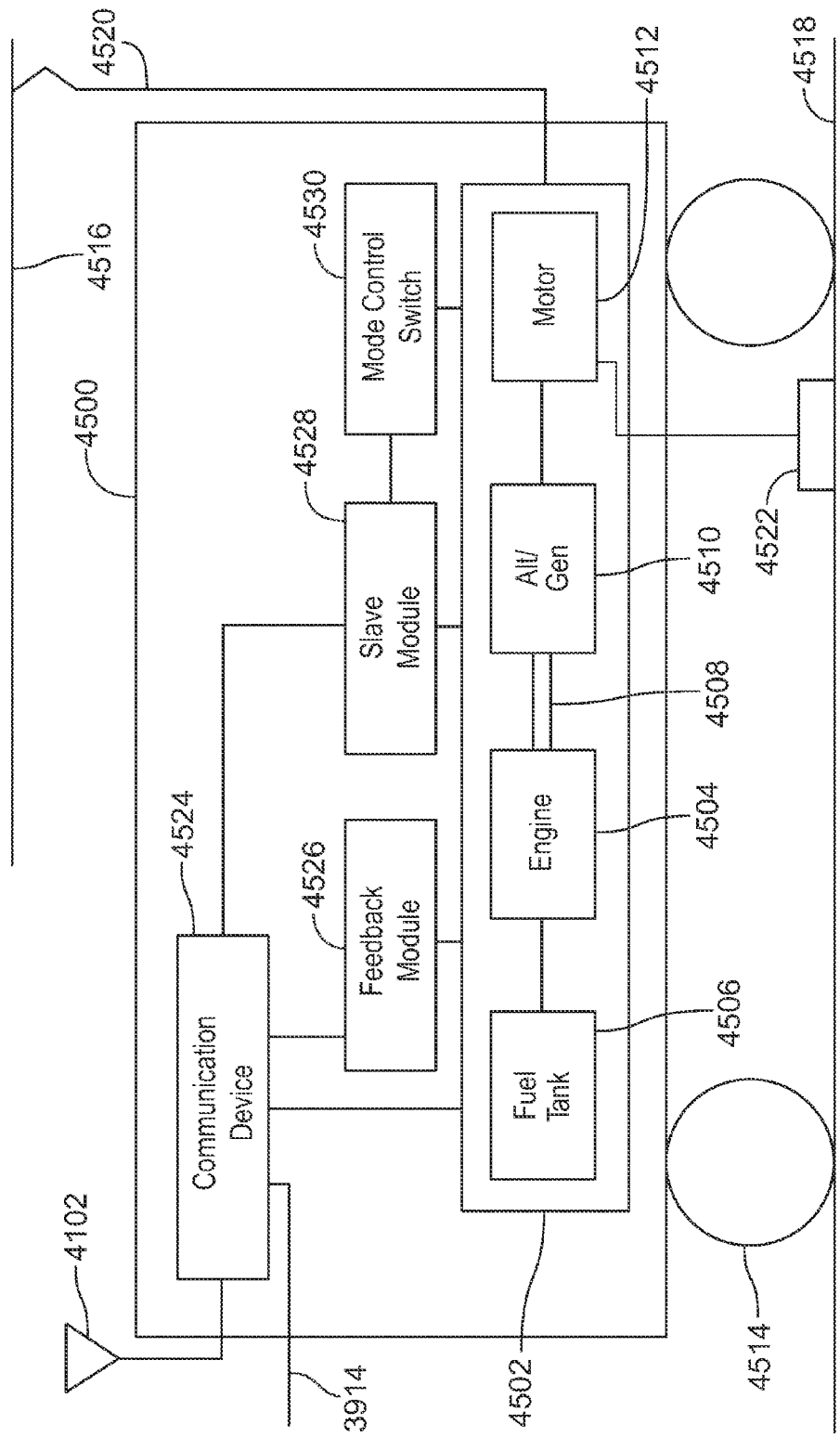
FIG. 45 is a schematic illustration of a remote vehicle in accordance with another embodiment.

FIG. 45 is a schematic illustration of a remote vehicle 4500 in accordance with another embodiment. The remote vehicle may be used in place of one or more of the other remote vehicles described herein. For example, the remote vehicle may be included in one or more of the vehicle systems shown and described above.

The remote vehicle 4500 is a multiple-mode powered vehicle. By "multiple-mode," it is meant that the remote vehicle can generate tractive efforts for propulsion from a plurality of different sources of energy. In the illustrated embodiment, the remote vehicle includes a propulsion subsystem 4502 that can be powered from an on-board source of energy and an off-board source of energy. The on-board source of energy can be provided by an engine 4504 that consumes fuel stored in an on-board fuel tank 4506 to rotate a shaft 4508. The shaft is joined to an alternator or generator 4510 ("ALT/GEN 4510") that creates electric current based on rotation of the shaft, similar to the propulsion subsystem shown and described in connection with FIG. 41. The electric current is supplied to one or more motors 4512, such as traction motors, to power the motors and cause the motors to rotate axles and/or wheels 4514 of the remote vehicle. Similar to the engine 4108 shown in FIG. 41, the engine 4504 can be an engine that consumes a combustible fuel, such as diesel fuel, hydrogen, water/steam, gas, and the like, in order to generate electric current that is used for movement of the remote vehicle.

The off-board source of energy can be obtained from a conductive pathway that extends along the route (e.g., the route 3914 shown in FIG. 39) of the remote vehicle. As one example, the conductive pathway can include an overhead line or catenary 4516 that extends along and above the route of the remote vehicle. As another example, the conductive pathway can include a powered rail 4518 that extends along the route of the remote vehicle below or to the side of the remote vehicle. For example, the conductive pathway can be a third rail that conveys electric current.

The propulsion subsystem of the remote vehicle includes a conductive extension 4520 and/or 4522 that engages the overhead line 4516 or the powered rail 4518 to convey the electric current from the overhead line or powered rail to the propulsion subsystem. The conductive extension can include a pantograph device, a bow collector, trolley pole, a brush, or the like, and associated circuitry that engages the overhead line to acquire and deliver electric current to the propulsion subsystem. The conductive extension can include a conductive contact box, brush, or "shoe" that engages the powered rail to acquire and deliver electric current to the propulsion subsystem. The overhead line and/or powered rail may receive the electric current that is supplied to the propulsion subsystem from an off-board power source, such as a utility power grid, power station, feeder station, or other location that generates and/or supplies electric current that is not located on the remote vehicle or the vehicle system that includes the remote vehicle. The electric current is delivered from the conductive extension 4516 and/or 4522 to the traction motors 4512 of the propulsion subsystem to power the fraction motors for rotation of the axles and/or wheels of the remote vehicle. The electric current from the conductive extension also may be used to power a communication device 4524 (described below).

Similar to the remote powered unit 3904 shown in FIG. 39, the remote vehicle shown in FIG. 45 may include a communication device 4524 that is similar to the communication device 4100 (shown in FIG. 41), a feedback module 4526 that is similar to the feedback module 4118 (shown in FIG. 41), and/or a slave module 4528 that is similar to the slave module 4104 (shown in FIG. 41). The communication device, the feedback module, and/or the slave module may perform the functions described above and associated with the respective communication device 4100, feedback module 4118, and/or slave module 4104.

The remote vehicle includes a mode control switch 4530 in the illustrated embodiment. The mode control switch is used to control where the propulsion subsystem receives electric current to propel the remote vehicle. The mode control switch may represent a hardware and/or software system that operates to switch between the propulsion subsystem receiving electric current from an on-board source (e.g., the engine and alternator or generator) or from on off-board source (e.g., the overhead line or powered rail). For example, the mode control switch may include one or more electronic circuits or circuitry that include and/or are connected to one or more computer processors, controllers, or other logic-based devices that alternately open or close conductive circuits that prevent or allow, respectively, electric current to flow from the conductive extensions to the motors and/or from the alternator or generator to the motors. The processors, controllers, or other logic-based devices may open or close the circuits based on instructions stored on a tangible and non-transitory computer readable storage medium, such as a computer memory. Alternatively, the mode control switch may include a hard-wired device that performs operations based on hard-wired logic of the device. In another embodiment, the mode control switch may include a manual switch that is manually actuated by a human operator.

The mode control switch is communicatively coupled with the slave module 4528 in order to determine when the isolation module 4002 (shown in FIG. 40) of the lead powered unit

3902 (shown in FIG. 39) directs the remote vehicle to switch from the ON mode of operation to the OFF mode of operation. In one embodiment, if the isolation module directs the remote vehicle to switch to the OFF mode of operation, the mode control switch may prevent the propulsion subsystem from switching to the OFF mode of operation if the propulsion subsystem is receiving electric current from the off-board source (e.g., via the overhead line or powered rail). For example, the mode control switch may not allow the propulsion subsystem to turn off when the propulsion subsystem is powered from the off-board source and/or is not consuming fuel from the fuel tank to produce electric current. The mode control switch may prevent the propulsion subsystem from switching to the OFF mode of operation based on the circuitry of the mode control switch, or based on software and/or hard-wired logic of the mode control switch.

In another embodiment, the mode control switch may not permit the propulsion subsystem to switch to the OFF mode of operation if the vehicle system that includes the remote vehicle is providing electric current in a Head End Power (HEP) configuration. A HEP configuration includes the vehicle system having electrical power distribution circuits that extend throughout all or a substantial portion of the vehicle system and that supplies electric current generated in one vehicle to one or more, or all, of the other vehicles. For example, a HEP-configured vehicle system may include a lead vehicle that generates electric current for powering one or more components of the remote vehicles. The electric current may be used to power non-propulsion electric loads, such as loads used for lighting various vehicles, cooling or heating the air of the vehicles, and the like.

Alternatively, the slave module may prohibit the propulsion subsystem from switching to the OFF mode of operation when the propulsion subsystem is receiving electric current from an off-board source. For example, the slave module may monitor the mode control switch to determine from where the propulsion subsystem is receiving electric current. Based on this determination, the slave module may ignore an instruction from the isolation module to switch the propulsion subsystem to the OFF mode of operation. For example, if the slave module determines that the mode control switch is directing current from the off-board source to the propulsion subsystem, the slave module may not turn the propulsion subsystem to the OFF mode of operation, even when the isolation module transmits an instruction to turn the propulsion subsystem to the OFF mode of operation.

In one embodiment, the mode control switch and/or the slave module do not permit the propulsion subsystem to switch to the OFF mode of operation if one or more parameters of the remote vehicle are outside of or otherwise exceed one or more associated ranges or thresholds. For example, the mode control switch and/or the slave module may monitor a number of times that the propulsion subsystem has been turned to the OFF mode of operation over a time window, an amount of electric current flowing through a battery regulator that is coupled with a rechargeable battery on the remote vehicle, an ambient temperature of the interior of the remote vehicle (e.g., where the operator, passengers, and/or cargo are located), a temperature of the engine, a position or setting of one or more throttle controls and/or brake controls of the propulsion subsystem, an air pressure of an air brake reservoir, or the like.

If one or more of the parameters exceed thresholds or are outside of associated ranges, then the mode control switch and/or the slave module may not permit the propulsion subsystem to switch to the OFF mode of operation. For example, if the number of times that the propulsion subsystem has been turned off recently exceeds a threshold, then the mode control switch and/or the slave module may not permit the propulsion subsystem to switch to the OFF mode of operation. If the current flowing through the battery regulator, the ambient temperature, or the engine temperature exceed associated thresholds or fall outside of associated ranges, then the mode control switch and/or the slave module may not permit the propulsion subsystem to switch to the OFF mode of operation. If one or more propulsion control switches or settings are set to an engine start position, an engine isolate position, a run (e.g., active propulsion) position, or dynamic braking only position, then the mode control switch and/or the slave module may not permit the propulsion subsystem to switch to the OFF mode of operation.

Figure 46:
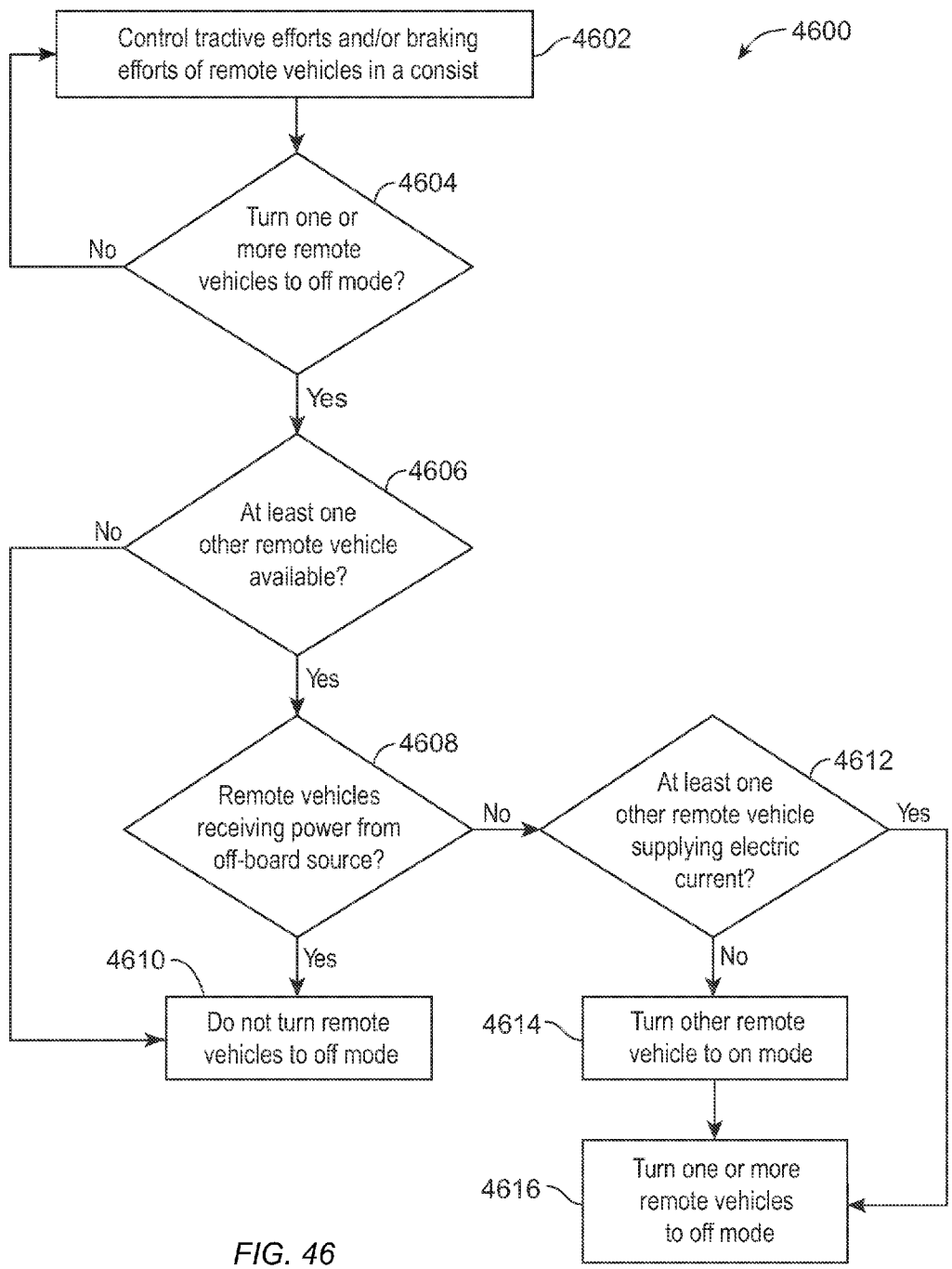
FIG. 46 is a flowchart of one embodiment of a method for remotely changing a mode of operation of one or more remote vehicles in a vehicle system.

FIG. 46 is a flowchart of one embodiment of a method 4600 for remotely changing a mode of operation of one or more remote vehicles in a vehicle system. The method 4600 may be used in conjunction with operation of one or more of the vehicle systems described above. For example, the method 4600 may be used to determine whether to switch one or more remote vehicles in a consist of a vehicle system to the OFF mode of operation, which remote vehicles to switch to the OFF mode of operation, and to switch the one or more remote vehicles to the OFF mode of operation.

At 4602, tractive efforts and/or braking efforts of remote vehicles in a consist of a vehicle system are remotely controlled. For example, the lead powered unit 3902 (shown in FIG. 39) can direct the tractive efforts and/or braking efforts of the remote powered units 3904 (shown in FIG. 39) of the consist 3910 and/or 3912 (shown in FIG. 39). As described above, the lead powered unit 3902 can control the tractive efforts and/or braking efforts in a DP configuration of the vehicle system 3900 (shown in FIG. 39), based on instructions from the energy management system 4012 (shown in FIG. 40), based on instructions from the scheduling system shown in FIG. 44, and/or based on manual control from an operator.

At 4604, a determination is made as to whether one or more of the remote vehicles in a consist of the vehicle system is to be turned to the OFF mode of operation from the ON mode of operation. For example, the energy management system 4012 (shown in FIG. 40) and/or the scheduling system shown in FIG. 44 may determine that a first remote powered unit 3904 (shown in FIG. 39) in the consist 3910 and/or 3912 (shown in FIG. 39) can be turned to the OFF mode of operation to conserve fuel, put the vehicle system 3900 (shown in FIG. 39) back on a schedule of the transportation network, to skip an upcoming refueling location, or the like, as described above.

If one or more of the remote vehicles in a consist can be switched to the OFF mode of operation, then flow of the method 4600 may proceed to 4606. On the other hand, if none of the remote vehicles are to be turned to the OFF mode of operation, then flow of the method 4600 may return to 4602.

At 4606, a determination is made as to whether at least one other remote vehicle in the consist is available to continue supplying power to a communication device of the consist when the one or more remote vehicles are turned to the OFF mode of operation. For example, the consist 3910 and/or 3912 (shown in FIG. 39) may include one or more communication devices 4100 (shown in FIG. 41) that communicate with the lead powered unit 3902 (shown in FIG. 39) to allow the lead powered unit 3902 to control the remote powered units 3904 (shown in FIG. 39) of the consist 3910 and/or 3912. At least a second remote powered units 3904 may be configured to continue supplying electric current to one or more of the communication devices 4100 of the consist 3910 and/or 3912 to power the communication devices 34102 when the first remote powered unit 3904 is switched to the OFF mode of operation.

If the second remote powered unit 3904 is available in the consist 3910 and/or 3912 to continue supplying the electric current to the communication devices 34102 to power the communication devices 34102 when the first remote powered unit 3904 is turned to the OFF mode of operation, then the first remote powered unit 3904 may be turned to the OFF mode of operation without interrupting or breaking the communication link between the lead powered unit 3902 and the consist 3910 and/or 3912, as described above. As a result, flow of the method 4600 may continue to 4608.

On the other hand, if there is not another remote powered unit 3904 (shown in FIG. 39) in the consist 3910 and/or 3912 (shown in FIG. 39) to continue supplying the electric current to the communication devices 4100 (shown in FIG. 41) to power the communication devices 34102 when the first remote powered unit 3904 is turned to the OFF mode of operation, then the first remote powered unit 3904 may not be turned to the OFF mode of operation without interrupting or breaking the communication link between the lead powered unit 3902 and the consist 3910 and/or 3912 (shown in FIG. 39), as described above. As a result, flow of the method 4600 may continue to 4610.

At 4608, a determination is made as to whether the remote vehicle(s) that can be turned to the OFF mode of operation are receiving electric current from an off-board source. For example, the first remote powered unit 3904 (shown in FIG. 39) can be examined to determine if the first remote vehicle is receiving electric current to power one or more communication devices of the consist and/or the traction motors of the first remote vehicle from an off-board source, such as the overhead line and/or the powered rail shown in FIG. 45, as described above.

If the remote vehicle(s) to be turned to the OFF mode of operation are receiving electric current from an off-board source, then the remote vehicle(s) may not be turned to the OFF mode of operation. As a result, flow of the method 4600 may proceed to 4610. On the other hand, if the remote vehicle(s) to be turned to the OFF mode of operation are not receiving electric current from an off-board source, such as by producing electric current from an on-board engine and alternator or generator, then the remote vehicle(s) may be turned to the OFF mode of operation. As a result, flow of the method 4600 may proceed to 4612.

At 4610, the remote vehicle(s) in the consist are not turned to the OFF mode of operation. For example, the first remote vehicle may not be turned to the OFF mode of operation described above because the communication link between the lead vehicle and the consist that includes the first remote vehicle may be interrupted or broken if the propulsion subsystem of the first remote vehicle were turned off. Alternatively, the first remote vehicle may not be turned to the OFF mode of operation because the first remote vehicle is receiving electric current from an off-board source, also as described above.

At 4612, a determination is made as to whether at least one other remote vehicle in the consist is currently in the ON mode of operation to supply electric current to one or more communication devices of the consist. For example, the electric current that is supplied by one or more other remote powered units 3904 (shown in FIG. 39) of the consist 3910 and/or 3912 (shown in FIG. 39) to one or more communication devices 4100 (shown in FIG. 41) of the consist 3910 and/or 3912 may be examined. If the one or more other remote powered units 3904 are operating in the ON mode of operation and supplying sufficient electric current to the communication device(s) 4100 of the consist 3910 and/or 3912 such that turning the first remote powered unit 3904 to the OFF mode of operation will not break or interrupt the communication link between the lead powered unit 3902 (shown in FIG. 39) and the consist 3910 and/or 3912, then the first remote powered unit 3904 may be switched to the OFF mode of operation without breaking or interrupting the communication link. As a result, flow of the method 4600 proceeds to 4616.

On the other hand, if no other remote vehicles in the consist are in the ON mode of operation and/or are supplying insufficient electric current to power communication device(s) of the consist, then the first remote vehicle may not be turned to the OFF mode of operation without acquiring a source of electric current to power the communication device(s) and maintain the communication link. As a result, flow of the method 4600 proceeds to 4614.

At 4614, one or more other remote vehicles are switched to the ON mode of operation. For example, one or more other remote powered units 3904 (shown in FIG. 39) of the same consist 3910 and/or 3912 (shown in FIG. 39) as the first remote powered unit 3904 may be switched to the ON mode of operation before switching the first remote powered unit 3904 to the OFF mode of operation, as described above. In one embodiment, the first remote powered unit 3904 is only switched to the OFF mode of operation after at least one other remote powered unit 3904 is in the ON mode of operation and supplying sufficient electric current to the communication device(s) of the consist to maintain the communication link with the lead powered unit 3902 (shown in FIG. 39).

At 4616, the remote vehicle in the consist is turned to the OFF mode of operation. For example, the propulsion subsystem 4102 (shown in FIG. 41) of the first remote powered unit 3904 (shown in FIG. 39) of the consist 3910 and/or 3912 (shown in FIG. 39) may be turned to the OFF mode of operation, as described above. The propulsion subsystem 4102 may be turned off while at least one communication device 4100 (shown in FIG. 41) on the consist 3910 and/or 3912 remains on and powered to receive control instructions from the lead powered unit 3902 (shown in FIG. 39) for control of operations of one or more other remote powered units 3904 in the same consist 3910 and/or 3912.

In another embodiment, a control system includes an energy management system and an isolation control system. The energy management system is configured to generate a trip plan that designates operational settings of a vehicle system having plural powered units interconnected with one another that generate tractive effort to propel the vehicle system along a route for a trip. The energy management system also is configured to determine a tractive effort capability of the vehicle system and a demanded tractive effort of the trip. The tractive effort capability is representative of the tractive effort that the powered units are capable of providing to propel the vehicle system. The demanded tractive effort is representative of the tractive effort that is calculated to be used for actually propelling the vehicle system along the route for the trip according to the trip plan. The isolation control system is configured to be communicatively coupled with the energy management system and to remotely turn one or more of the powered units to an OFF mode. The energy management system also is configured to identify a tractive effort difference between the tractive effort capability of the vehicle system and the demanded tractive effort of the trip and to select at least one of the powered units as a selected powered unit based on the tractive effort difference. The isolation module also is configured to remotely turn the selected powered unit to the OFF mode such that the vehicle system is propelled along the route during the trip by the powered units other than the selected powered unit.

In one aspect, the isolation control system is configured to be disposed onboard a first powered unit of the powered units in the vehicle system and to remotely turn the selected powered unit that is located remote from the first powered unit in the vehicle system to the OFF mode.

In one aspect, the energy management system is configured to determine respective portions of the tractive effort capability that are provided by the powered units and to select the selected powered unit to be turned to the OFF mode based on a comparison between the tractive effort difference and the portions of the tractive effort capability that are provided by the powered units.

In one aspect, the tractive effort difference represents an excess tractive effort by which the tractive effort capability is greater than the demanded tractive effort.

In one aspect, the energy management system is configured to select the selected powered unit and the isolation control system is configured to remotely turn the selected powered unit to the OFF mode prior to the vehicle system starting the trip such that the selected powered unit is in the OFF mode from the start of the trip through at least until the trip is completed.

In one aspect, the trip plan designates the operational settings of the vehicle system as a function of at least one of distance along the route or time elapsed during the trip such that at least one of emissions generated or fuel consumed by the vehicle system is reduced by operating according to the trip plan during the trip relative to the vehicle system operating according to other operational settings of another, different trip plan.

In one aspect, the selected powered unit continues to operate to generate electric current for one or more electric loads of the at least one of the powered units without producing tractive effort when in the OFF mode.

In one aspect, the operational settings of the trip plan include at least one of throttle settings, speeds, brake settings, or power output settings of the powered units.

In another embodiment, a method (e.g., for controlling a vehicle system) comprises determining a tractive effort capability of a vehicle system having plural powered units that generate tractive effort to propel the vehicle system and a demanded tractive effort of a trip. The tractive effort capability is representative of the tractive effort that the powered units are capable of providing to propel the vehicle system. The demanded tractive effort is representative of the tractive effort that is calculated to be used for actually propelling the vehicle system along a route for the trip according to a trip plan. The trip plan designates operational settings of the vehicle system to propel the vehicle system along the route for the trip. The method also includes identifying a tractive effort difference between the tractive effort capability of the vehicle system and the demanded tractive effort of the trip, selecting at least one of the powered units as a selected powered unit based on the tractive effort difference, and remotely turning the selected powered unit to an OFF mode such that the vehicle system is propelled along the route during the trip by the powered units other than the selected powered unit.

In one aspect, remotely turning the selected powered unit to the OFF mode is performed by an isolation control system disposed onboard a first powered unit of the powered units in the vehicle system to remotely turn off the selected powered unit that is located remote from the first powered unit in the vehicle system.

In one aspect, the method also includes determining respective portions of the tractive effort capability that are provided by the powered units. The selected powered unit is selected based on a comparison between the tractive effort difference and the portions of the tractive effort capability that are provided by the powered units.

In one aspect, the tractive effort difference represents an excess tractive effort by which the tractive effort capability is greater than the demanded tractive effort.

In one aspect, selecting the at least one of the powered units and remotely turning the selected powered unit to the OFF mode is performed prior to the vehicle system starting the trip such that the selected powered unit is in the OFF mode from the start of the trip through at least until the trip is completed.

In one aspect, the trip plan designates the operational settings of the vehicle system as a function of at least one of distance along the route or time elapsed during the trip such that at least one of emissions generated or fuel consumed by the vehicle system is reduced by operating according to the trip plan during the trip relative to the vehicle system operating according to other operational settings of another, different trip plan.

In one aspect, the operational settings of the trip plan include at least one of throttle settings, speeds, brake settings, or power output settings of the powered units.

In another embodiment, another control system includes an energy management system and an isolation control system. The energy management system is configured to generate a trip plan that designates operational settings of a vehicle system having plural powered units interconnected with one another that generate tractive effort to propel the vehicle system along a route for a trip. Each of the powered units is associated with a respective tractive effort capability representative of a maximum horsepower that can be produced by the powered unit during travel. The isolation control system is configured to be communicatively coupled with the energy management system and to remotely turn one or more of the powered units to an OFF mode. The energy management system also is configured to determine a total tractive effort capability of the powered units in the vehicle system and a demanded tractive effort representative of the tractive effort that is calculated to be used for actually propelling the vehicle system along the route for the trip according to the trip plan. The energy management system is configured to select a first powered unit from the powered units based on an excess of the total tractive effort capability of the powered units over the demanded tractive effort of the trip. The isolation control system is configured to remotely turn the first powered unit to an OFF mode such that the vehicle system is propelled along the route during the trip without tractive effort from the first powered unit.

In one aspect, the energy management system is configured to select the first powered unit from the powered units of the vehicle system based on a comparison between the excess of the tractive effort capability and the tractive effort capability of each of the powered units.

In one aspect, the energy management system is configured to select the first powered unit and the isolation control system is configured to remotely turn the first powered unit to the OFF mode prior to the vehicle system starting the trip.

In one aspect, the trip plan designates the operational settings of the vehicle system as a function of at least one of distance along the route or time elapsed during the trip such that at least one of emissions generated or fuel consumed by the vehicle system is reduced by operating according to the trip plan during the trip relative to the vehicle system operating according to other operational settings of another, different trip plan.

In one aspect, the operational settings of the trip plan include at least one of throttle settings, speeds, brake settings, or power output settings of the powered units.

In another embodiment of a method (e.g., a method for controlling a vehicle consist), the method comprises, in a vehicle consist comprising plural powered units, controlling one or more of the powered units to an OFF mode of operation. The one or more powered units are controlled to the OFF mode of operation from a start of a trip of the vehicle consist along a route at least until a completion of the trip. During the trip when the one or more powered units are in the OFF mode of operation, the one or more powered units would be capable of providing tractive effort to help propel the vehicle consist. (For example, the powered units controlled to the OFF mode are not disabled or otherwise incapable of providing tractive effort.) In another embodiment of the method, in the OFF mode of operation, engine(s) of the one or more powered units are deactivated.

In another embodiment, a control system comprises an energy management system configured to generate a trip plan for controlling a vehicle system having plural powered units along a route for a trip. The energy management system is further configured to determine a tractive effort difference between a tractive effort capability of the vehicle system and a demanded tractive effort of the trip. The tractive effort capability is representative of the tractive effort that the powered units are capable of providing to propel the vehicle system, and the demanded tractive effort is representative of the tractive effort that is calculated to be used for actually propelling the vehicle system along the route for the trip according to the trip plan. The energy management system is further configured to generate the trip plan such that according to the trip plan, at least one of the powered units is to be controlled to an OFF mode during at least part of the trip. (That is, the trip plan is configured such that when the trip plan is executed, the at least one of the powered units is designated to be in the OFF mode of operation.) The energy management system is configured to select the at least one of the powered units based on the tractive effort difference.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person skilled in the art to practice the embodiments of invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A control system comprising:
   an energy management system configured to generate a trip plan that designates operational settings of a vehicle system having plural powered units interconnected with one another that generate tractive effort to propel the vehicle system along a route for a trip, the energy management system also configured to determine a tractive effort capability of the vehicle system and a demanded tractive effort of the trip, the tractive effort capability representative of the tractive effort that the powered units are capable of providing to propel the vehicle system, the demanded tractive effort representative of the tractive effort that is calculated to be used for actually propelling the vehicle system along the route for the trip according to the trip plan; and
   an isolation control system configured to be communicatively coupled with the energy management system and to remotely turn one or more of the powered units to an OFF mode,
   wherein the energy management system also is configured to identify a tractive effort difference between the tractive effort capability of the vehicle system and the demanded tractive effort of the trip and to select at least one of the powered units as a selected powered unit based on the tractive effort difference, and
   wherein the isolation control system also is configured to remotely turn the selected powered unit to the OFF mode such that the vehicle system is propelled along the route during the trip by the powered units other than the selected powered unit.

2. The control system of claim 1, wherein the isolation control system is configured to be disposed onboard a first powered unit of the powered units in the vehicle system and to remotely turn the selected powered unit that is located remote from the first powered unit in the vehicle system to the OFF mode.

3. The control system of claim 1, wherein the energy management system is configured to determine respective portions of the tractive effort capability that are provided by the powered units and to select the selected powered unit to be turned to the OFF mode based on a comparison between the tractive effort difference and the portions of the tractive effort capability that are provided by the powered units.

4. The control system of claim 1, wherein the tractive effort difference represents an excess tractive effort by which the tractive effort capability is greater than the demanded tractive effort.

5. The control system of claim 1, wherein the energy management system is configured to select the selected powered unit and the isolation control system is configured to remotely turn the selected powered unit to the OFF mode prior to the vehicle system starting the trip such that the selected powered unit is in the OFF mode from the start of the trip through at least until the trip is completed.

6. The control system of claim 1, wherein the trip plan designates the operational settings of the vehicle system as a function of at least one of distance along the route or time elapsed during the trip such that at least one of emissions generated or fuel consumed by the vehicle system is reduced by operating according to the trip plan during the trip relative to the vehicle system operating according to other operational settings of another, different trip plan.

7. The control system of claim 1, wherein the selected powered unit continues to operate to generate electric current for one or more electric loads of the at least one of the powered units without producing tractive effort when in the OFF mode.

8. The control system of claim 1, wherein the operational settings of the trip plan include at least one of throttle settings, speeds, brake settings, or power output settings of the powered units.

9. A method comprising:
  determining a tractive effort capability of a vehicle system having plural powered units that generate tractive effort to propel the vehicle system and a demanded tractive effort of a trip, the tractive effort capability representative of the tractive effort that the powered units are capable of providing to propel the vehicle system, the demanded tractive effort representative of the tractive effort that is calculated to be used for actually propelling the vehicle system along a route for the trip according to a trip plan, the trip plan designating operational settings of the vehicle system to propel the vehicle system along the route for the trip;
  identifying a tractive effort difference between the tractive effort capability of the vehicle system and the demanded tractive effort of the trip;
  selecting at least one of the powered units as a selected powered unit based on the tractive effort difference; and
  remotely turning the selected powered unit to an OFF mode such that the vehicle system is propelled along the route during the trip by the powered units other than the selected powered unit.

10. The method of claim 9, wherein remotely turning the selected powered unit to the OFF mode is performed by an isolation control system disposed onboard a first powered unit of the powered units in the vehicle system to remotely turn off the selected powered unit that is located remote from the first powered unit in the vehicle system.

11. The method of claim 9, further comprising determining respective portions of the tractive effort capability that are provided by the powered units, wherein the selected powered unit is selected based on a comparison between the tractive effort difference and the portions of the tractive effort capability that are provided by the powered units.

12. The method of claim 9, wherein the tractive effort difference represents an excess tractive effort by which the tractive effort capability is greater than the demanded tractive effort.

13. The method of claim 9, wherein selecting the at least one of the powered units and remotely turning the selected powered unit to the OFF mode is performed prior to the vehicle system starting the trip such that the selected powered unit is in the OFF mode from the start of the trip through at least until the trip is completed.

14. The method of claim 9, wherein the trip plan designates the operational settings of the vehicle system as a function of at least one of distance along the route or time elapsed during the trip such that at least one of emissions generated or fuel consumed by the vehicle system is reduced by operating according to the trip plan during the trip relative to the vehicle system operating according to other operational settings of another, different trip plan.

15. The method of claim 9, wherein the operational settings of the trip plan include at least one of throttle settings, speeds, brake settings, or power output settings of the powered units.

16. A control system comprising:
  an energy management system configured to generate a trip plan that designates operational settings of a vehicle system having plural powered units interconnected with one another that generate tractive effort to propel the vehicle system along a route for a trip, each of the powered units associated with a respective tractive effort capability representative of a maximum horsepower that can be produced by the powered unit during travel;
  an isolation control system configured to be communicatively coupled with the energy management system and to remotely turn one or more of the powered units to an OFF mode,
  wherein the energy management system also is configured to determine a total tractive effort capability of the powered units in the vehicle system and a demanded tractive effort representative of the tractive effort that is calculated to be used for actually propelling the vehicle system along the route for the trip according to the trip plan, and
  wherein the energy management system is configured to select a first powered unit from the powered units based on an excess of the total tractive effort capability of the powered units over the demanded tractive effort of the trip, and the isolation control system is configured to remotely turn the first powered unit to an OFF mode such that the vehicle system is propelled along the route during the trip without tractive effort from the first powered unit.

17. The control system of claim 16, wherein the energy management system is configured to select the first powered unit from the powered units of the vehicle system based on a comparison between the excess of the tractive effort capability and the tractive effort capability of each of the powered units.

18. The control system of claim 16, wherein the energy management system is configured to select the first powered unit and the isolation control system is configured to remotely turn the first powered unit to the OFF mode prior to the vehicle system starting the trip.

19. The control system of claim 16, wherein the trip plan designates the operational settings of the vehicle system as a function of at least one of distance along the route or time elapsed during the trip such that at least one of emissions generated or fuel consumed by the vehicle system is reduced by operating according to the trip plan during the trip relative to the vehicle system operating according to other operational settings of another, different trip plan.

20. The control system of claim 16, wherein the operational settings of the trip plan include at least one of throttle settings, speeds, brake settings, or power output settings of the powered units.

* * * * *